United States Patent
Lee et al.

(10) Patent No.: US 8,978,083 B2
(45) Date of Patent: Mar. 10, 2015

(54) METHOD FOR TRANSMITTING A BROADCAST SERVICE, METHOD FOR RECEIVING A BROADCAST SERVICE, AND APPARATUS FOR RECEIVING A BROADCAST SERVICE

(75) Inventors: Joonhui Lee, Seoul (KR); Kwansuk Kim, Seoul (KR); Gomer Thomas, Princeton Junction, NJ (US); Dongwan Seo, Seoul (KR); Sanghyun Kim, Seoul (KR); Jongyeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/980,335

(22) PCT Filed: Jan. 19, 2012

(86) PCT No.: PCT/KR2012/000511
§ 371 (c)(1),
(2), (4) Date: Jul. 18, 2013

(87) PCT Pub. No.: WO2012/099427
PCT Pub. Date: Jul. 26, 2012

(65) Prior Publication Data
US 2013/0305308 A1    Nov. 14, 2013

Related U.S. Application Data

(60) Provisional application No. 61/433,974, filed on Jan. 19, 2011.

(51) Int. Cl.
*H04N 7/173* (2011.01)
*H04N 7/16* (2011.01)
(Continued)

(52) U.S. Cl.
CPC .............. *H04N 21/43* (2013.01); *H04H 20/28* (2013.01); *H04H 20/40* (2013.01); *H04H 60/40* (2013.01)
USPC .......................................... 725/109; 725/136

(58) Field of Classification Search
CPC ............ H04N 21/434; H04N 21/4345; H04N 21/435; H04N 21/462; H04N 21/4622
USPC ................... 725/105, 109, 112, 136
See application file for complete search history.

(56) References Cited

U.S. PATENT DOCUMENTS 7,568,214 B2 *   7/2009   Leak et al. .................... 725/110
8,595,783 B2 *  11/2013   Dewa ............................ 725/116

(Continued)

FOREIGN PATENT DOCUMENTS

KR    10-2008-0102316 A    11/2008
KR    10-2009-0021111 A    2/2009

(Continued)

*Primary Examiner* — James R Sheleheda
(74) *Attorney, Agent, or Firm* — McKenna Long & Aldridge LLP

(57) ABSTRACT

According to the invention, a broadcast receiver receives a packetized stream. The broadcast receiver extracts display time information from a header of the packetized stream, and extracts trigger information including a target object identifier from a payload of the packetized stream. The broadcast receiver recognizes the type of the trigger information. If the trigger information is of the preparation trigger type, the broadcast receiver acquires information on the location of the file which belongs to the target object identifier. The broadcast receiver downloads the file which belongs to the target object identifier from the time corresponding to the extracted display time information via said acquired information on the location of the file.

17 Claims, 57 Drawing Sheets

(51) Int. Cl.
*H04N 21/43* (2011.01)
*H04H 20/28* (2008.01)
*H04H 20/40* (2008.01)
*H04H 60/40* (2008.01)

(56) References Cited

U.S. PATENT DOCUMENTS

| | | | |
|---|---|---|---|
| 2011/0177774 A1* | 7/2011 | Gupta et al. | 455/3.06 |
| 2012/0050619 A1* | 3/2012 | Kitazato et al. | 348/723 |
| 2012/0050620 A1* | 3/2012 | Kitazato | 348/723 |
| 2012/0054235 A1* | 3/2012 | Kitazato et al. | 707/770 |
| 2012/0054816 A1* | 3/2012 | Dewa | 725/116 |
| 2012/0060197 A1* | 3/2012 | Kitahara et al. | 725/131 |
| 2012/0081607 A1* | 4/2012 | Kitazato | 348/552 |
| 2012/0137339 A1* | 5/2012 | Lee et al. | 725/132 |
| 2012/0253826 A1* | 10/2012 | Kitazato et al. | 704/500 |
| 2013/0031569 A1* | 1/2013 | Kitazato et al. | 719/320 |
| 2013/0167171 A1* | 6/2013 | Kitazato et al. | 725/32 |
| 2013/0191860 A1* | 7/2013 | Kitazato et al. | 725/32 |
| 2013/0201399 A1* | 8/2013 | Kitazato et al. | 348/553 |
| 2013/0305308 A1* | 11/2013 | Lee et al. | 725/116 |
| 2014/0013379 A1* | 1/2014 | Kitazato et al. | 725/118 |
| 2014/0020038 A1* | 1/2014 | Dewa | 725/110 |

FOREIGN PATENT DOCUMENTS

| | | |
|---|---|---|
| KR | 10-2009-0103182 A | 10/2009 |
| KR | 10-2009-0122256 A | 11/2009 |

* cited by examiner file.

FIG.5

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for)i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG.6

| service_type | Meaning |
|---|---|
| 0x00 | [Reserved] |
| 0x01 | analog_television – The virtual channel carries analog television programming |
| 0x02 | ATSC_digital_television – The virtual channel carries television programming (audio, video and optional associated data) conforming to ATSC standards |
| 0x03 | ATSC_audio – The virtual channel carries audio programming (audio service and optional associated data) conforming to ATSC standard s. |
| 0x04 | ATSC_data_only_service – The virtual channel carries a data service conforming to ATSC standards, but no video of stream_type 0x02 or audio of stream_type 0x81. |
| 0x05-0x3F | [Reserved for future ATSC use] |

FIG.7

| Value | Meaning |
|---|---|
| 0x00 | [ Reserved ] |
| 0x01 | Analog_television-The virtual channel carries analog television programming |
| 0x02 | ATSC_digital_television-The virtual channel carries television programming (audio, video and optional data) conforming to ATSC standards. |
| 0x03 | ATSC_audio-The virtual channel carries audio programming (audio service and optional data) conforming to ATSC standards. |
| 0x04 | ATSC_data_only_service-The virtual channel carries a data service conforming to ATSC standards, but no video of stream_type 0x02 or audio of stream_type 0x81. |
| 0x05 | Software Download Data Service see A/97 |
| 0x06 | Unassociated/small screen service see A/65C Amendment 1 |
| 0x07 | Parameterized Service New A/V CODEC |
| 0x08 | ATSC_nrt_service-The virtual channel carries a NRT service conforming to ATSC standards. |
| 0x09-0x7F | [ Reserved for future ] |
| 0x80-0xFF | [ User Private ] |

FIG.8

| Syntax | No. of bits | Format |
|---|---|---|
| data_service_table_section() { | | |
|   table_id | 8 | 0xCF |
|   section_syntax_indicator | 1 | bslbf |
|   private_indicator | 1 | bslbf |
|   reserved | 2 | '11' |
|   private_section_length | 12 | uimsbf |
|   table_id_extension | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   data_service_table_bytes() | | |
|   CRC_32 | 32 | rpchof |
| } | | |

| Syntax | No. of bits | Format |
|---|---|---|
| data_service_table_bytes() { | | |
|   sdf_protocol_version | 8 | uimsbf |
|   application_count_in_section | 8 | uimsbf |
|   if( application_count_in_section > 0) { | | |
|     for(j = 0; j <application_count_in_section; j++) { | | |
|     compatibility_descriptor() | | |
|     app_id_byte_length | 16 | uimsbf |
|     if(app_id_byte_length > 1) { | | |
|       app_id_description | 16 | uimsbf |
|       for(i=0;i< app_id_byte_length-2;i++) { | | |
|         app_id_byte | 8 | bslbf |
|       } | | |
|     } | | |
|     tap_count | 8 | uimsbf |
|     for( i = 0; i < tap_count; i++) { | | |
|       protocol_encapsulation | 8 | uimsbf |
|       action_type | 7 | uimsbf |
|       resource_location | 1 | bslbf |
|       Tap() | | |
|       tap_info_length | 16 | uimsbf |
|       for( k=0; k<N; k++) { | | |
|         descriptor() | | |
|       } | | |
|     } | | |
|     app_info_length | 16 | uimsbf |
|     for( i=0; i< M; i++) { | | |
|       descriptor() | | |
|     } | | |
|     app_data_length | 16 | uimsbf |
|     for( i = 0; i < app_data_length; i++) { | | |
|       app_data_byte | 8 | bslbf |
|     } | | |
|   } | | |
|   service_info_length | 16 | uimsbf |
|   for(j=0; j<K;j++) { | | |
|     descriptor() | | |
|   } | | |
|   service_private_data_length | 16 | uimsbf |
|   for( j = 0; j < service_private_data_length; j++) { | | |
|     service_private_data_byte | 8 | bslbf |
|   } | | |
| } | | |

FIG.12

| Syntax | No. of Bits | Format |
|---|---|---|
| NRT_service_map_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         NST_protocol_version | 8 | uimsbf |
|         reserved | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     reserved | 4 | '1111' |
|     carrier_frequency | 32 | uimsbf |
|     channel_TSID | 16 | uimsbf |
|     program_number | 16 | uimsbf |
|     source_id | 16 | uimsbf |
|     num_NRT_services | 8 | uimsbf |
|     for (i=0; i<num_NRT_services; i++) | | |
|     { | | |
|         reserved | 4 | '1111' |
|         NRT_service_status | 2 | uimsbf |
|         SP_indicator | 1 | bslbf |
|         CP_indicator | 1 | bslbf |
|         NRT_service_id | 16 | uimsbf |
|         short_NRT_service_name | 8*8 | |
|         reserved | 2 | '11' |
|         NRT_service_category | 6 | uimsbf |
|         num_components | 5 | uimsbf |
|         IP_version_flag | 1 | bslbf |
|         source_IP_address_flag | 1 | bslbf |
|         NRT_service_destination_IP_address_flag | 1 | bslbf |
|         if (source_IP_address_flag) | | |
|             source_IP_address | 32 or 128 | uimsbf |
|         if (NRT_service_destination _IP_address_flag) | | |
|             NRT_service_destination_IP_address | 32 or 128 | uimsbf |
|         for (j=0; j<num_components; j++) | | |
|         { | | |
|             reserved | 1 | '1' |
|             essential_component_indicator | 1 | bsblf |
|             component_destination_IP_address _flag | 1 | bslbf |
|             port_num_count | 5 | uimsbf |
|             component_destination_UDP_port_num | 16 | uimsbf |
|             if (component_destination_IP_address _flag) | | |
|                 component_destination_IP_address | 32 or 128 | uimsbf |
|             Reserved | 4 | '1111' |

FIG.13

| Syntax | No. of Bits | Format |
|---|---|---|
|       num_component_level_descriptors | 4 | uimsbf |
|       for (k=0; k<num_component_level_descriptors; k++) | | |
|       { | | |
|           component_level_descriptor() | var | |
|       } | | |
|    } | | |
|    reserved | 4 | '1111' |
|    num_NRT_service_level_descriptors | 4 | uimsbf |
|    for (m=0; m<num_MH_service_level_descriptors; m++) | | |
|    { | | |
|       NRT_service_level_descriptor() | var | |
|    } | | |
| } | | |
| reserved | 4 | '1111' |
| num_virtual_channel_level_descriptors | 4 | uimsbf |
| for (n=0; n<num_virtual_channel_level_descriptors; n++) { | | |
| { | | |
|    virtual_channel_level_descriptor() | var | |
| } | | |
| } | | |

FIG.14

| Syntax | No. of Bits | Format |
|---|---|---|
| MH_component_descriptor() { | | |
|     descriptor_tag | 8 | 0x8D |
|     descriptor_length | 8 | uimsbf |
|     component_type | 7 | uimsbf |
|     component_encryption_flag | 1 | bsblf |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     MH_component_ data(component_type) | var | |
| } | | |

FIG.15

| Syntax | No. of Bits | Format |
|---|---|---|
| NRT_component_ data() { | | |
|     TSI | 16 | uimsbf |
|     session_start_time | 32 | uimsbf |
|     session_end_time | 32 | uimsbf |
|     reserved | 5 | '11111' |
|     tias_bandwidth_indicator | 1 | bslbf |
|     as_bandwidth_indicator | 1 | bslbf |
|     FEC_OTI_indicator | 1 | bslbf |
|     if (tias_bandwidth_indicator == '1'){ | | |
|         tias_bandwidth | 16 | uimsbf |
|     } | | |
|     if (as_bandwidth_indicator == '1'){ | | |
|         as_bandwidth | 16 | uimsbf |
|     } | | |
|     if (FEC_OTI_indicator == '1'){ | | |
|         FEC_encoding_id | 8 | uimsbf |
|         FEC_instance_id | 16 | uimsbf |
|     } | | |
| } | | |

FIG.16

| Syntax | No.of Bits | Format |
|---|---|---|
| NRT_information_table_section() { | | |
|     table_id | 8 | 0xTBD |
|     section_syntax_indicator | 1 | '1' |
|     private_indicator | 1 | '1' |
|     reserved | 2 | '11' |
|     section_length | 12 | uimsbf |
|     service_id | 16 | uimsbf |
|     reserved | 2 | '11' |
|     NRT_IT_version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     time_span_start | 32 | uimsbf |
|     reserved | 5 | '11111' |
|     time_span_length | 11 | uimsbf |
|     num_items_in_section | 8 | uimsbf |
|     for(j=0; j<num_items_in_section; j++) { | | |
|         content_linkage | 32 | uimsbf |
|         updates_available | 1 | bslbf |
|         reserved | 1 | '1' |
|         TF_available | 1 | bslbf |
|         low_latency | 1 | bslbf |
|         playback_length_in_seconds | 20 | uimsbf |
|         content_length_included | 1 | bslbf |
|         playback_delay_included | 1 | bslbf |
|         expiration_included | 1 | bslbf |
|         reserved | 1 | '1' |
|         duration | 12 | uimsbf |
|         if(content_length_included=1) { | | |
|             content_length | 40 | uimsbf |
|         } | | |
|         if(playback_delay_included=1) { | | |
|             reserved | 4 | '1111' |
|             playback_delay | 20 | uimsbf |
|         } | | |
|         if(expiration_included=1) { | | |
|             expiration | | |
|         } | 32 | uimsbf |
|         content_name_lingth | | |
|         content_name_text() | 8 | uimsbf |
|         reserved | var | |
|         content_descriptors_length | 4 | '1111' |
|         for(i=-;i<N; i++) { | 12 | uimsbf |
|             content_descriptor() | | |
|         } | | |
|     } | | |
|     reserved | 6 | '111111' |
|     descriptors_length | 10 | uimsbf |
|     for(i=0; i<M; i++) { | | |
|         descriptor() | | |
|     } | | |
| } | | |

FIG.17

| Syntax | No. of bits | Format |
|---|---|---|
| NRT_content_table_section ( ) { | | |
|     table_id | 8 | uimsbf |
|     section_syntax_indicator | 1 | '1' |
|     private_indicator | 1 | '1' |
|     reserved | 2 | bslbf |
|     section_length | 12 | uimsbf |
|     NRT_Channel_ID | 16 | uimsbf |
|     reserved | 2 | bslbf |
|     version_number | 5 | uimsbf |
|     current_next_indicator | 1 | 1 |
|     section_number | 8 | uimsbf |
|     last_section_number | 8 | uimsbf |
|     protocol_version | 8 | uimsbf |
|     num_contents_in_section | 8 | uimsbf |
| | | |
|         content_version | 32 | uimsbf |
|         content_id | 32 | uimsbf |
|         content_available_start_time | 32 | uimsbf |
|         content_available_end_time | 32 | uimsbf |
|         ETM_location | 2 | uimsbf |
|         content_length_in_seconds | 30 | uimsbf |
|         content_size | 48 | uimsbf |
|         content_delivery_bit_rate | 32 | uimsbf |
|         content_title_length | 8 | uimsbf |
|         content_title_text ( ) | var | |
|         descriptors_length | 16 | uimsbf |
| | | |
|         descriptor ( ) | | |
|         } | | |
|     } | | |
| } | | |

FIG.18

| Syntax | No.of Bits | Format |
|---|---|---|
| service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     SMT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_services | 8 | uimsbf |
|   for (j=0;j< num_services; j++) | | |
|   { | | |
|     service_id | 16 | uimsbf |
|     multi_ensemble_service | 2 | uimsbf |
|     service_status | 2 | uimsbf |
|     SP_indicator | 1 | bslbf |
|     short_service_name_length | 3 | uimsbf |
|     short_service_name | 16*m | |
|     reserved | 2 | '11' |
|     service_category | 6 | uimsbf |
|     num_components | 5 | uimsbf |
|     IP_version_flag | 1 | bslbf |
|     source_IP_address_flag | 1 | bslbf |
|     service_destination_IP_address_flag | 1 | bslbf |
|     if (source_IP_address_flag) | | |
|       source_IP_address | 32 or 128 | uimsbf |
|     if (service_destination_IP address_flag) | | |
|       service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |
|       num_component_level_descriptors | 4 | uimsbf |
|       for (k=0;k< num_components_level_descriptors; k++) | | |
|       { | | |
|         component_level_descriptor() | var | |
|       } | | |
|     } | | |
|     reserved | 4 | '1111' |
|     num_service_level_descriptors | 4 | uimsbf |
|     for (m=0; m<num_service_level_descriptors; m++) | | |
|     { | | |
|       service_level_descriptor() | var | |
|     } | | |
|   } | | |
|   reserved | 4 | '1111' |
|   num_ensemble_level_descriptors | 4 | uimsbf |
|   for (n=0; n<num_ensemble_level_descriptors; n++) { | | |
|     ensemble_level_descriptor() | var | |
|   } | | |
| } | | |

FIG.19

```
<?xml version="1.0" encoding="UTF-8"?>
<xs:schema xmlns="urn:atsc:nrt:flute:fdt:2009" xmlns:xs="
targetNamespace="urn:atsc:nrt:flute:fdt:2009" elementFormDefault ="qualified">
  <xs:element name="FDT-Instance" type="FDT-nstanceType"/>
  <xs:complexType name="FDT-InstanceType">
    <xs:sequence>
      <xs:element name="File" type="File-Type" maxOccurs ="unbounded"/>

<xs:anynamespace="##other" processContents="skip" minOccurs="0"maxOccurs ="unbounded"/>    ①
    </xs:sequence>
    <xs:attribute name="Expires" type="xs:string" use="required'/>
    <xs:attribute name="Complete" type='xs:boolean" use="optional"/>
    <xs:attribute name="Content-Type" type="xs:string" use="optional"/>
    <xs:attribute name="Content-Encoding" type="xs:string" use='optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attributename="FEC-OTI-Max-Number-of-Encoding-Symbols" type="-xs:unsignedLong" use="optional"/>
    <xs:attribute name="FEC-OTI-Scheme-Specific-Info" type="xs:base64Binary' use="optional"/>
    <xs:anyAttribute processContents="skip"/>
  </xs:complexType>
  <xs:complexType name="File-Type">
    <xs:sequence >

<xs:any namespace='##other"processContents ="skip"minOccurs ="0' maxOccurs ="unbounded"/>    ②
    </xs:sequence >
    <xs:attribute name="Content-Location" type="xs:anyURI" use="required"/>
    <xs:attributename="TOI" type="xs:positiveInteger' use="required"/>
    <xs:attributename="Content-Length" type="xs:unsignedLong" use="required"/>
    <xs:attributename="Transfer-Length" type="xs:unsignedLong" use="ootional"/>
    <xs:attributename="Content-Type" type="xs:string" use="optional"/>
    <xs:attributename="Content-Encoding" type="xs:string" use="optional"/>
    <xs:attributename="Content-MD5" type="xs:base64Binary" use="optional"/>
    <xs:attributename="FEC-OTI-FEC-Encoding-ID" type="xs:unsignedLong" use="optional"/>
    <xs:attributename="FEC-OTI-FEC-Instance-ID" type="xs:unsignedLong" use="optional"/>
    <xs:attributename="FEC-OTI-Maximum-Source-Block-Length" type="xs:unsignedLong" use="optional"/>
    <xs:attributename="FEC-OTI-Encoding-Symbol-Length" type="xs:unsignedLong' use="optional"/>
    <xs:attributename="FEC-OTI-Max-Number-of-Encoding-Symbols" type="xs:unsignedLong" use="optional'/>
    <xs:attributename="FEC-OTI-Scheme-Specific-Info" type="xs:base64Binary" use="optional"/>
    <xs:anyAttribute processContents ="skip"/>
  </xs:complexType >
  <xs:complexType name="Content-D-Type">
    <xs:attribute name="Content-ID" type="xs:unsingedShort" use="required"/>
    <xs:attribute name="entry" type="xs:boolean " default="false" use="optional"/>    ③
    <xs:anyAttribute processContents="skip"/>
  </xs:complexType >
</xs:schema>
```

FIG.20

```
<?xml version="1.0" encoding="UTF-8"?>
<xs:schema xmlns="urn:atsc:nrt:flute:fdt:2009" xmlns:xs="
targetNamespace="urn:atsc:nrt:flute:fdt:2009" elementFormDefault="qualified">
  <xs:element name="FDT-Instance" type="FDT-InstanceTyoe"/>
  <xs:complexType name="FDT-InstanceType ">
    <xs:sequence >
      <xs:element name="File" type="File-Type"maxOccurs ="unbounded"/>

<xs:any namespace="##other' processContents ="skip"minOccurs="0" maxOccurs="unbounded"/>
    </xs:sequence>
    <xs:attribute name="Expires" type="xs:string" use="required"/>
    <xs:attribute name="Complete" type="xs:boolean' use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional'/>
    <xs:attribute name="FEC-OTI-Maximum-Source-Block-Length" type=" xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="ootional"/>
    <xs:attribute name="FEC-OTI-Scheme-Specific-Info" type="xs:base64Binary" use="optional"/>
    <xs:anyAttribute processContents ="skip"/>
</xs:complexType>                                                                                     ①
<xs:complexType name="File-Type">
  <xs:sequence>
    <xs:element name="File-Content-ID" type='Content-ID-Type" minOccurs="0"maxOccurs ="unbounded"/>
    <xs:any namespace="##other' processContents="skip"minOccurs ="0" maxOccurs="unbounded"/>
  </xs:sequence >
  <xs:attribute name="Content-Location" type="xs:anyURI" use="required"/>
  <xs:attribute name="TOI" type="xs:positiveInteger" use="required"/>
  <xs:attribute name="Content- Length" type="xs:unsignedLong" use="required"/>
  <xs:attribute name="Transfer- Length" type="xs:unsignedLong" use='optional"/>
  <xs:attribute name="Content- Type" type="xs:string" use="optional'/>
  <xs:attribute name="Content- Encoding" type="xs:string" use="optional'/>
  <xs:attribute name="Content- MD5" type="xs:base64Binary" use="optional"/>
  <xs:attribute name="FEC-OTI-FEC-Encoding-ID" type=' xs:unsignedLong" use="optional"/>
  <xs:attribute name="FEC-OTI-FEC-Instance-ID" type="xs:unsigned_ong" use="optional"/>
  <xs:attribute name="FEC-OTI-Maximum-Source-Block-Length" type="xs:unsignedLong" use="optional"/>
  <xs:attribute name="FEC-OTI-Encoding-Symbol-_ength" type="xs:unsignedLong" use="optional"/>
  <xs:attribute name="FEC-OTI-Max-Number-of-Encoding-Symbols" type=" xs:unsignedLong" use="optional"/>
  <xs:attribute name="FEC-OTI-Scheme-Specific-Info" type="xs:base64Binary" use="optional"/>
  <xs:anyAttribute processContents ="skip"/>
</xs:complexType >
                                          ②

<xs:complexType name="Content-ID-Type">
  <xs:attribute name="Content-ID" type="xs:unsingedShort" use="required"/>
  <xs:attribute name="entry" type="xs:boolean" default="false" use="optional'/>
  <xs:anyAttribute processContents ="skip"/>
</xs:complexType >
</xs:schema >
```

FIG.25

| Syntax | No. of Bits | Format |
|---|---|---|
| tdo_trigger_table_section() { | | |
|     table_id | 8 | 0xTBD |
|     section_syntax_indicator | 1 | 0 |
|     private_indicator | 1 | 1 |
|     reserved | 2 | 11 |
|     section_length | 12 | uimsbf |
|     source_id | 16 | uimsbf |
|     reserved | 2 | 11 |
|     TTT_version_number | 5 | uimsbf |
|     current_next_indicator | 1 | 1 |
|     section_number | 8 | uimsbf |
|     last_section_number | 8 | uimsbf |
|     num_triggers_in_section | 8 | uimsbf |
|     for (i=0; i< num_triggers_in_section; i++) { | | uimsbf |
|         trigger_id | 32 | uimsbf |
|         trigger_time | 32 | uimsbf |
|         trigger_action | 16 | uimsbf |
|         trigger_description_length | 8 | uimsbf |
|         trigger_description_text | var | |
|         service_id_ref | 16 | uimsbf |
|         content_linkage | 32 | uimsbf |
|         num_trigger_descriptors | 8 | uimsbf |
|         for (j=0; j<num_bundle_descriptors; j++) { | | |
|             trigger_descriptor    () | var | |
|         } | | |
|     } | | |
| } | | |

FIG.27

| Syntax | No. of bits | Format |
|---|---|---|
| synchronized_data_packet(){ | | |
|     data_identifier | 8 | uimsbf |
|     sub_stream_id | 8 | uimsbf |
|     PTS_extension_flag | 1 | bslbf |
|     output_data_rate_flag | 1 | bslbf |
|     reserved | 2 | '11' |
|     synchronized_data_packet_header_length | 4 | uimsbf |
|     if (PTS_extension_flag=='1'){ | | |
|         reserved | 7 | '1111111' |
|         PTS_extension | 9 | uimsbf |
|     } | | |
|     for (i=0;i<N1;i++){ | | |
|         synchronized_data_private_data_byte | 8 | bslbf |
|     } | | |
|     for (i=0;i<N2;i++){ | | |
|         synchronized_data_byte | 8 | bslbf |
|     } | | |
| } | | |

FIG.28

| Syntax | No. of bits | Format |
|---|---|---|
| contentTypeDescriptor(){ | | |
|     descriptorTag | 8 | 0x72 |
|     descriptorLength | 8 | uimsbf |
|     for(i=0;i<descriptorLength;i++){ | | |
|         contentTypeByte | 8 | bslbf |
|     } | | |
| } | | |

FIG.29

```
Syntax                              No. Of bits

TS_program_map_section(){
    table_id                            8
    section_syntax_indicator            1
    '0'                                 1
    reserved                            2
    section_length                      12
    program_number                      16
    reserved                            2
    version_number                      5
    current_next_indicator              1
    section_number                      8
    last_section_number                 8
    reserved                            3
    PCR_PID                             13
    reserved                            4
    program_info_length                 12
    for(i=0;i<N;i++){
        descriptor()
    }
    for(i=0;i<N1;i++){
        steam_type                      8
        reserved                        3
        elementary_PID                  13
        reserved                        4
        ES_info_length                  12
        for(i=0;i<N2;i++){
            descriptor()
        }
    }
    CRC_32                              32
}
```

| Syntax | No. of Bits | Format |
|---|---|---|
| service_id_descriptor() { | | |
|     descriptor_tag | 8 | 0xC2 |
|     descriptor_length | 8 | uimsbf |
|     service_count | 8 | uimsbf |
|     for (i=0; i<service_count; i++) | | |
|         service_id | 16 | bslbf |
|     for (j=0; j< N; j++) { | | |
|         reserved | 8 | bslbf |
|     } | | |
| } | | |

FIG.30

| Syntax | No. Of bits |
|---|---|
| TS_program_map_section(){ | |
| table_id | 8 |
| section_syntax_indicator | 1 |
| '0' | 1 |
| reserved | 2 |
| section_length | 12 |
| program_number | 16 |
| reserved | 2 |
| version_number | 5 |
| current_next_indicator | 1 |
| section_number | 8 |
| last_section_number | 8 |
| reserved | 3 |
| PCR_PID | 13 |
| reserved | 4 |
| program_info_length | 12 |
| for(i=0;i<N;i++){ | |
|     descriptor() | |
| } | |
| for(i=0;i<N1;i++){ | |
|     steam_type | 8 |
|     reserved | 3 |
|     elementary_PID | 13 |
|     reserved | 4 |
|     ES_info_length | 12 |
|     for(i=0;i<N2;i++){ | |
|         descriptor() | |
|     } | |
| } | |
| CRC_32 | 32 |
| } | |

| Syntax | No. of Bits | Format |
|---|---|---|
| Trigger_stream_descriptor() { | | |
|     descriptor_tag | 8 | 0xC2 |
|     descriptor_length | 8 | uimsbf |
|     target_service_count | 8 | uimsbf |
|     for (i=0; i<service_count; i++) { | | |
|         target_service_id | 16 | bslbf |
|         target_content_item_count | 8 | uimsbf |
|         for(k=0; k<target_content_item_count; k++) { | | |
|             target_content_linkage | 32 | bslbf |
|     } | | |
|     for (j=0; j< N; j++) { | | |
|         reserved | 8 | bslbf |
|     } | | |
| } | | |

FIG.31

|  | No. of bits | Identifier |
|---|---|---|
| application_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     test_application_flag | 1 | bslbf |
|     application_type | 15 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptors_length | 12 | uimsbf |
|     for(i=0;i<N;i++){ | | |
|       descriptor() | | |
|     } | | |
|     reserved_future_use | 4 | bslbf |
|     application_loop_length | 12 | uimsbf |
|     for(i=0;i<N;i++){ | | |
|       application_identifier() | | |
|       application_control_code | 8 | uimsbf |
|       reserved_future_use | 4 | bslbf |
|       application_descriptors_loop_length | 12 | uimsbf |
|       for(j=0;j<N;j++){ | | |
|         descriptor() | | |
|       } | | |
|     } | | |
|     CRC_32 | 32 | rpchof |
| } | | |

FIG.32

| Syntax | No. of Bits | Format |
|---|---|---|
| System_time_table_section(){ | | |
|     table_id | 8 | uimsbf |
|     section_syntax_indicator | 1 | '1' |
|     private_indicator | 1 | '1' |
|     reserved | 2 | '11' |
|     section_length | 12 | uimsbf |
|     table_id_extension | 16 | 0x0000 |
|     reserved | 2 | '11' |
|     version_number | 5 | '00000' |
|     current_next_indicator | 1 | '1' |
|     section_number | 8 | 0x00 |
|     last_section_number | 8 | 0x00 |
|     protocol_version | 8 | uimsbf |
|     system_time | 32 | uimsbf |
|     GPS_UTC_offset | 8 | uimsbf |
|     daylight_savings | 16 | uimsbf |
|     for (i=0;i<N;i++){ | | |
|       descriptor() | | |
|     } | | |
|     CRC_32 | 32 | rpchof |
| } | | |

FIG.51

| Syntax | No. Bits | Format |
|---|---|---|
| tdo_trigger_table_section() { | | |
|    table_id | 8 | 0xTBD |
|    section_syntax_indicator | 1 | '0' |
|    private_indicator | 1 | '1' |
|    reserved | 2 | '11' |
|    section_length | 12 | uimsbf |
|    source_id | 16 | uimsbf |
|    reserved | 2 | '11' |
|    TTT_version_number | 5 | uimsbf |
|    current_next_indicator | 1 | '1' |
|    section_number | 8 | uimsbf |
|    last_section_number | 8 | uimsbf |
|    num_triggers_in _section | 8 | uimsbf |
|    for (i=0; i< num_triggers_in_section; i++) { | | uimsbf |
|      trigger_id | 32 | uimsbf |
|      trigger_time | 32 | uimsbf |
|      trigger_type | 8 | uimsbf |
|      trigger_action | 16 | uimsbf |
|      trigger_description_length | 8 | uimsbf |
|      trigger_description_text | var | |
|      service_id_ref | 16 | uimsbf |
|      content_linkage | 32 | uimsbf |
|      target_trigger_id_ref | 32 | uimsbf |
|      num_trigger_descriptors | 8 | uimsbf |
|      for (j=0; j<num_trigger_descriptors; j++) { | | |
|         trigger_descriptor() | var | |
|      } | | |
|    } | | |
| } | | |

FIG.52

| Syntax | No. of Bits | Format |
|---|---|---|
| Content_Items_descriptor() { | | |
|     descriptor_tag | 8 | 0xC2 |
|     descriptor_length | 8 | uimsbf |
|     service_count | 8 | uimsbf |
|     for (i=0; i<service_count; i++) { | | |
|         service_id_ref | 16 | bslbf |
|         content_item_count | 8 | uimsbf |
|         for(k=0; k<content_item_count; k++) | | |
|             content_linkage | 32 | bslbf |
|     } | | |
|     for (j=0; j< N; j++) { | | |
|         reserved | 8 | bslbf |
|     } | | |
| } | | |

FIG.53

| Syntax | No. of Bits | Format |
|---|---|---|
| internet_location_descriptor() { | | |
|    descriptor_tag | 8 | 0xC9 |
|    descriptor_length | 8 | uimsbf |
|    reserved | 3 | '111' |
|    URL_count | 5 | uimsbf |
|    for (i=0; i<URL_count; i++) { | | |
|       URL_length | 8 | uimsbf |
|       URL() | var | |
|    } | | |
|    for (j=0; j< N; j++) { | | |
|    reserved | 8 | bslbf |
|    } | | |
| } | | |

METHOD FOR TRANSMITTING A BROADCAST SERVICE, METHOD FOR RECEIVING A BROADCAST SERVICE, AND APPARATUS FOR RECEIVING A BROADCAST SERVICE

This application is a 35 USC §371 National Stage entry of International Application No. PCT/KR2012/000511 filed Jan. 19, 2012, and claims priority of U.S. provisional Application No. 61/433,974 filed Jan. 19, 2011, which are hereby incorporated by reference in its entirety.

TECHNICAL FIELD

The present disclosure relates to a method of transmitting a broadcast service, a method of receiving the broadcast service, and an apparatus for receiving the broadcast service.

BACKGROUND ART

Digital television (DTV) may now provide various services including image and voice services that are original functions of television (TV). For example, it is possible to provide an electronic program guide (EPG) to a user and simultaneously provide broadcast services that are received from two or more channels. In particular, a receiving system has a massive storage device and is connected to the internet or a data communication channel that may make two-way communication. Accordingly, services that may be provided by using a broadcast signal have significantly increased. In addition, as the services that use such a broadcast signal become various, a need to accurately provide services using a broadcast signal has increased.

DISCLOSURE OF THE INVENTION

Technical Problem

Embodiments provide a method of receiving and processing a non-real time service and a method of transmitting a non-real time service.

Embodiments also provide a method of linking content downloaded through a non-real time service to a real-time broadcast service and a receiving apparatus therefor.

Embodiments also provide a transmission method for linking a non-real time service to a real-time broadcast service without affecting a typical receiver and a receiving apparatus therefor.

Technical Solution

In one embodiment, a method of receiving a broadcast service by a broadcast receiving apparatus includes receiving a first packetized stream; extracting a presentation time information from a header of the first packetized stream; extracting trigger information including a target object identifier from a payload of the first packetized stream; recognizing a type of the trigger information; providing an object corresponding to the target object identifier to transit a state of the object into a ready state if the trigger information corresponds to a preparation trigger and the state of the object corresponding to the target object identifier is in a released state; executing the object corresponding to the target object identifier to transit the state of the object into an active state if the trigger information corresponds to an execution trigger and the state of the object corresponding to the target object identifier is in the ready state; and suspending the object corresponding to the target object identifier to transit the state of the object into a suspended state if the trigger information corresponds to a suspension trigger and the state of the object corresponding to the target object identifier is in the active state.

In another embodiment, an apparatus for receiving a broadcast service includes a receiving unit receiving a first packetized stream; a trigger processing unit extracting representation time information from a header of the first packetized stream, wherein the trigger processing unit extracts, from a payload of the first packetized stream, trigger information including a target object identifier field and a trigger action field; and a service manager immediately performing an action corresponding to the trigger action field for an object corresponding to the target object identifier field if the presentation time information is not extracted from the header of the first packetized stream.

In further another embodiment, a method of receiving a broadcast service by a broadcast receiving apparatus includes receiving a first packetized stream; extracting presentation time information from a header of the first packetized stream; extracting trigger information including a target object identifier from a payload of the first packetized stream; recognizing a type of the trigger information; obtaining location information of a file belonging to the target object identifier if the trigger information is a preparation trigger; and downloading, through the location information, a file belonging to the target object identifier at a time that corresponds to the presentation time information.

Advantageous Effects

According to embodiments, it is possible to link content downloaded through a non-real time service, to a real-time broadcast service.

According to embodiments, it is possible to link a non-real time service to a real-time broadcast service without affecting a typical receiver.

According to embodiments, it is possible to provide a broadcast service at an accurate timing.

BRIEF DESCRIPTION OF THE DRAWINGS

FIG. 5 shows a bit stream section of a TVCT table section (VCT) according to an embodiment;

FIGS. 6 and 7 are examples of defining a value of the service_type field according to embodiments of the present invention;

FIG. 8 shows a data service table (DST) section (data_service_table_section) for identifying an application of an NRT service and bit stream syntax of data_service_table_bytes included in the DST section;

FIG. 11 represents, as another embodiment, a method of signaling DSM-CC addressable section data by using a VCT;

FIGS. 12 and 13 show bit stream syntax of an NST according to an embodiment;

FIG. 14 shows bit stream syntax of a MH_component_descriptor according to an embodiment;

FIG. 15 shows bit stream syntax of an NRT_component_descriptor to which NRT_component_data according to an embodiment belongs;

FIG. 16 shows bit stream syntax of an NRT-IT section for signaling an NRT application according to an embodiment belongs;

FIG. 17 shows an embodiment of a bit stream syntax structure of an NRT_content_table_section according to the present invention;

FIG. 18 shows an embodiment of a bit stream syntax structure of a SMT_content_table_section that provides signaling information on NRT service data;

FIG. 19 shows an FDT schema for mapping a file according to an embodiment to a content_id and FIG. 20 shows an FDT schema for mapping a file according to another embodiment to content_id;

FIG. 20 shows an FDT schema for mapping a file according to another embodiment to content_id;

FIG. 25 shows bit stream syntax of a trigger according to an embodiment;

FIG. 27 shows, as bit stream syntax, a synchronized data packet structure of a PES payload for transmitting a trigger according to an embodiment;

FIG. 28 shows an embodiment of a content type descriptor structure that may be included in tap ( ) on a DST;

FIG. 29 shows an embodiment of each of syntax of a PMT and a service identifier descriptor;

FIG. 30 shows a trigger stream descriptor according to an embodiment;

FIG. 31 shows an embodiment of an AIT table;

FIG. 32 shows an embodiment of an STT table;

FIG. 51 shows bit stream syntax of a trigger according to another embodiment;

FIG. 52 shows syntax of a content item descriptor according to an embodiment;

FIG. 53 shows syntax of an internet location descriptor according to an embodiment;

MODE FOR CARRYING OUT THE INVENTION

Figure 1:
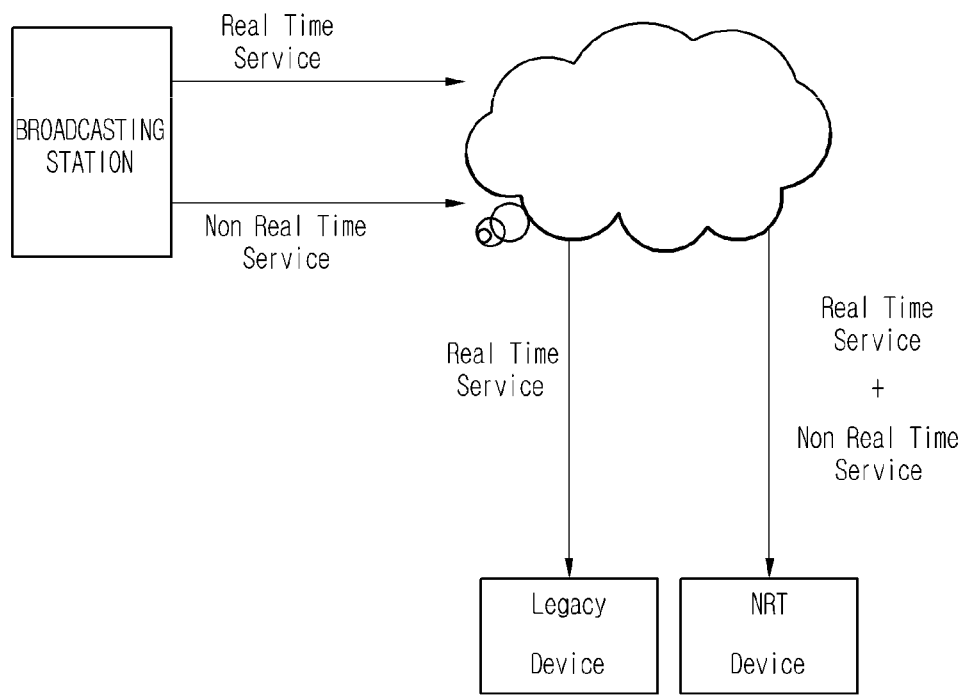
FIG. 1 is a conceptual view of providing an RT service and an NRT service.

Exemplary embodiments of the present invention that may implement the purpose of the present invention will be described with reference to the accompanying drawings. The configuration and action of the present invention that are shown in the drawings and described by means of the drawings are provided only as at least one embodiment and the technical spirit, main configuration and action of the present invention are not limited by the embodiment.

The specification has selected general terms that are currently widely used as possible, in consideration of the functions of the terms in the present invention. But the terms may vary depending on a technician's intent, practice or the emergence of a new technology. Moreover, terms that are arbitrarily selected by the applicant are used in some cases, and in these cases, their meanings will be described in detail in parts where corresponding invention is described. Thus, the terms used herein should be defined on the basis of the meanings of the terms and the overall content of the present invention, not simply the name of the term.

Among the terms used herein, a real time (RT) service literally indicates a service that is provided in real time. That is, the service indicates a service that has a time constraint. On the contrary, a non-real time (NRT) service indicates a service that is provided in non-real time, except for the RT service. That is, the NRT service is a service that has no time constraint. In addition, data for the NRT service may be referred to as NRT service data.

A broadcast receiver according to the present invention may receive a NRT service through a terrestrial, cable, or internet medium.

The NRT service may be stored in a storage medium of the broadcast receiver and then displayed on a display device at a preset time or in response to user's request. The NRT service is received in a file type and stored in the storage medium according to an embodiment. The storage medium is an HDD that is built in the broadcast receiver, according to an embodiment. As another example, the storage medium may be a universal serial bus (USB) memory, an external HDD, etc. that is connected to the outside of a broadcast receiving system.

Signaling information is needed to receive files configuring the NRT service, store them in the storage medium and provide a service to a user. The present invention may call this NRT service signaling information or NRT service signaling data.

The NRT service according to the present invention may be classified into a fixed NRT service and a mobile NRT service according to a way of obtaining an IP datagram including the NRT service signaling data. In particular, the fixed NRT service is provided to a fixed broadcast receiver and the mobile NRT service is provided to a mobile broadcast receiver.

FIG. 1 is a conceptual view of providing an RT service and an NRT service.

A broadcasting station transmits the RT service according to a typical method, that is, as in current terrestrial broadcasting (or mobile broadcasting). In this case, the broadcasting station may provide the NRT service by using a bandwidth remaining after transmitting the RT service or a dedicated bandwidth. That is, the RT service and the NRT service are transferred over the same channel or different channels. Thus, NRT service signaling information (or NRT service signaling data) is needed to allow the broadcast receiver to distinguish the RT service from the NRT service, store the distinguished NRT service and then provide it to a user if necessary. The NRT service signaling information (or NRT service signaling data) will be described below in detail.

For example, the broadcasting station may transmit broadcasting service data in real time, news clip, weather information, advertising, push VOD, etc. in real time. Moreover, the NRT service may be specific scenes among real time broadcast streams, detailed information on a specific program, preview, etc. in addition to the news clip, the weather information, the advertising, the push VOD, etc.

A typical broadcast receiver (that is, legacy device) may receive and process a real time service but do not so on a non real time service. In principle, the typical broadcast receiver (legacy device) is not affected by an NRT stream that is included in a channel over which the real time service is transferred. In other words, even if the typical broadcast receiver receives the NRT service, it may not process a received NRT service because the typical broadcast receiver does not have a means that may process the NRT service.

On the contrary, a broadcast receiver according to the present invention (that is, NRT device) may receive and properly process the NRT service combined with the RT service and thus, it is possible to provide various functions to a viewer as compared to the typical broadcast receiver.

Figure 2:
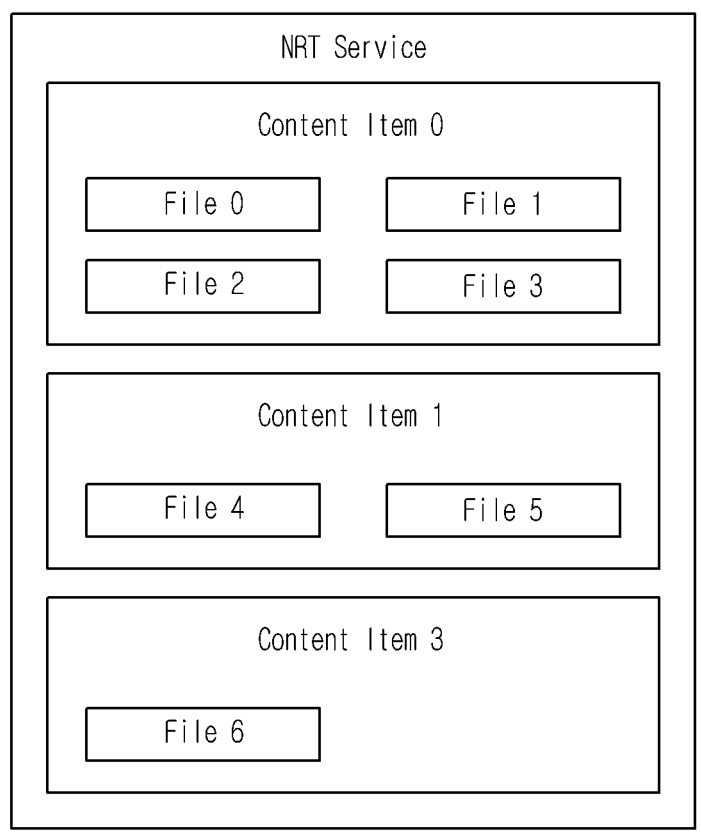
FIG. 2 is a diagram for explaining the structure of an NRT service according to an embodiment of the present invention.

FIG. 2 is a diagram for explaining the structure of an NRT service according to an embodiment.

An NRT service according to the present invention includes one or more content items (or referred to as content or NRT content) as in FIG. 2, and the one or more content items includes one or more files according to an embodiment. In the specification, a file and an object may be used as the same meaning.

The content item is an elementary unit that may be independently played. For example, when there is news provided in real time and the news include economy, politics, and living news, the news may be referred to as the NRT service and each of the economy, politics, and living news may be referred to as a content item. In addition, each of the economy, politics, and living news may include one or more files.

In this case, the NRT service may be transmitted in an MPEG-2 transport stream (TS) packet type over the same broadcast channel as the RT service or a dedicated broadcast channel. In this case, in order to identify the NRT service, a unique PID may be assigned to the TS packet of NRT service data and the service data may be transmitted. According to an embodiment, IP based NRT service data is MPEG-2 TS packetized and transferred.

In this case, NRT service signaling data required for receiving the NRT service data is transferred over an NRT service signaling channel. The NRT service signaling channel is transferred through a specific IP stream on the IP layer and in this case, the specific IP stream may also be MPEG-2 TS packetized and transferred. The NRT service signaling data that is transferred to the NRT service signaling channel may include at least one an NRT service map table (SMT), an NRT service table (NST), an NRT content table (NCT), an NRT information table (NRT-IT), and a text fragment table (TFT). According to an embodiment, the NST or the SMT provides at least one NRT service that is executed on the IP layer, or an access fragment of a content item or files that configure the NRT service. According to an embodiment, the NRT-IT or the NCT provides detailed information on a content item or files that configure the NRT service.

Moreover, the NRT service signaling data that may include the SMT (or NST) or the NRT-IT (or NCT) may be included in an PSIP table on the MPEG 2 TS or transferred over the NRT service signaling channel on the IP layer in a virtual channel. In addition, a plurality of pieces of NTR service data may be provided over one virtual channel.

The non-real time information table (NRT-IT) includes information describing content that may be downloaded to be stored in a receiving device. The information that is provided to the NRT-IP may include the title of content (for example, the name of a program that may be downloaded), a time when content may be downloaded, content recommendation, the availability of a caption service, content identification, and other metadata, for example.

Moreover, the text fragment table (TFT) is a table for providing detailed description information on a content item or a service. The TFT may include a data structure supporting a plurality of languages and accordingly may represent detailed descriptions (each string corresponding to one language) that are made in different languages. The TFT may be included in a private section having a table_id value (TBD) and may be identified by TFT_id. A TFT section may be included in an IP packet in a service signaling channel and this channel may be a channel that is assigned a multicast IP address (224.0.23.60) and a port (4937) by IANA.

Firstly, a receiver may identify with reference to the service_category field in the SMT whether a corresponding service is an NRT service. In addition, the receiver may uniquely identify the NRT service through the NRT service identifier information (NRT_service_id) field from the SMT.

The NRT service may include a plurality of content items. The receiver may identify each NRT content item through the content_id field in the NRT-IT or NCT. In addition, the NRT content item and the NRT service may be connected by matching the NRT_channel_id field in the NCT with the above-described NRT_service_id field.

The NRT service may be transferred through a FLUTE session and the receiver may extract FDT information from the FLUTE session. In addition, the content_id in the extracted FDT information may be mapped to the content identifier (content_id) of OMA BCAST SG or NCT and thus it is possible to check and receive the NRT service content that is selected by a user. The mapping method will be simply described below. For example, a receiver may identify each file configuring an NRT content item by using the content_location field and TOI specified in the FDT in the FLUTE session, and each TOI or content location or the content item may map the content ID field in the FDT to the content identifier (content_id) field in the NCT or the content identifier (content_id) field in OMA BCAST SG, check and receive NRT service content.

Figure 3:
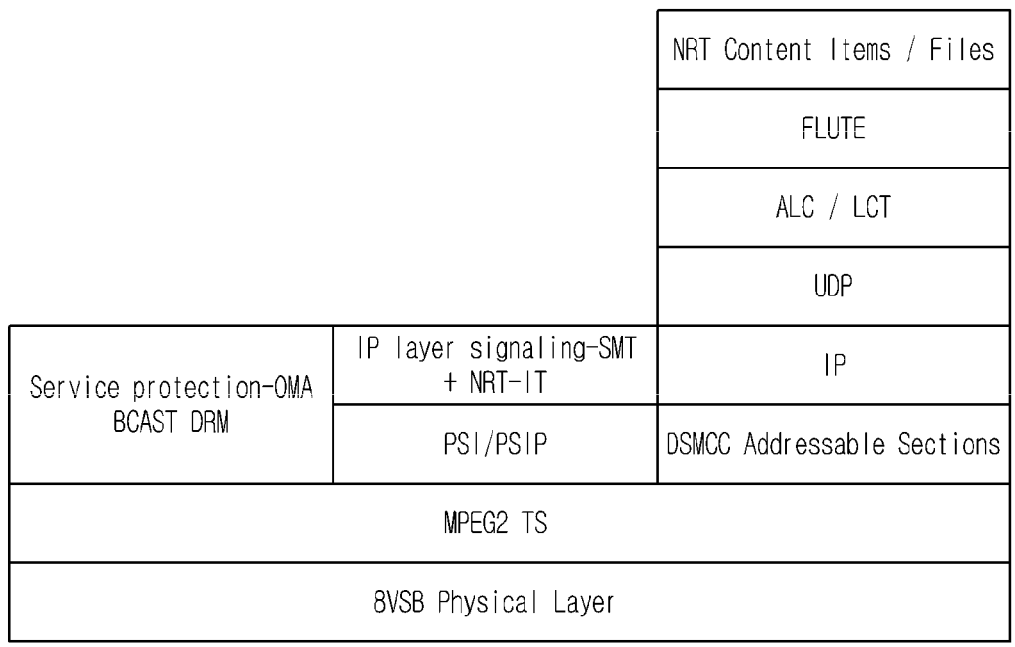
FIG. 3 is shows a protocol stack for an NRT service according to an embodiment.

FIG. 3 is shows a protocol stack for an NRT service according to an embodiment.

According to an embodiment, for a fixed NRT service, an NRT service of a file type is IP packetized on the IP layer and then is transferred in an MPEG-2 TS type over a specific virtual channel.

According to an embodiment, the existence of an NRT service and the identification information of the NRT service in a virtual channel are signaled through an MPEG-2 based program specific information (PSI) or program and system information protocol (PSIP) table, for example, a virtual channel table (VCT).

According to an embodiment, an NRT service signaling channel over which NRT service signaling data signaling an access fragment of an IP based NRT service is transferred is packetized to a specific IP stream on the IP layer and then transferred in an MpEG-2 TS type.

That is, a broadcasting station packetizes an NRT content item or files according to a file transfer protocol as in FIG. 3, and packetizes the packetized NRT content item or files according to an asynchronous layered coding or layered coding transport (ALC or LCT) scheme. In addition, the packetized ALC or LCT data is packetized according to UDP and the packetized UDP data is packetized according to IP to be IP data. In this case, the IP data may include a file description table (FDT) that includes information on the file delivery over unidirectional transport (FLUTE) session. The packetized IP data may be referred to an IP datagram in the specification for convenience of description.

Moreover, according to an embodiment, the IP datagram of an NRT service is encapsulated to an addressable section structure and is packetized back to the MPEG-2 TS format. That is, one addressable section structure has a format that is formed by adding a section header and a CRC checksum to one IP datagram. The format of such an addressable section structure may have a structure that is matched with a digital storage media command and control (DSM-CC) section format for transmitting private data. Thus, the addressable section may be referred to as a DSM-CC addressable section.

NRT service signaling data that includes at least one of SMT (or NST) and NRT-IT (or NCT) required for receiving NRT content/files may be transmitted over an NRT service signaling channel on the IP layer. Thus, the NRT service signaling data may be packetized according to IP so as to be transmitted over the NRT service signaling channel on the IP layer. According to an embodiment, the NRT service signal-ing channel is encapsulated into an IP datagram having a well-known IP address and is multicast.

Moreover, according to an embodiment, the NRT service signaling data may be included and transmitted in PSI or PSIP table section data. In addition, according to an embodiment, the PSI table may a program map table (PMT), a program association table (PAT), etc. and according to an embodiment, the PSIP table may include a virtual channel table (VCT), a terrestrial virtual channel table (TVCT), a cable virtual channel table (CVCT), a system time table (STT), a rating region table (RRT), an extended text table (ETT), a direct channel change table (DCCT), a direct channel change selection code table (DCCSCT), an event information table (EIT), and a master guide table (MGT).

In order to protect such an NRT service against illegal distribution and copy, broadcast services enalbler suite digital rights management (BCAST DRM) that is suggested by open mobile alliance (OMA) may be used as data for the digital right management and encryption of a broadcast service.

In addition, after splitting the PSI table section data, the PSIP table section data, the DSM-CC addressable section data, and the OMA BCAST DRM data in unit of 184 bytes, an MPEG header of 4 bytes may be added to 184 bytes to make an MPEG-2 TS packet of 188 bytes. In this case, a value assigned to the PID of the MPEG header may be a unique value that may identify a TS packet through which an NRT service and an NRT service signaling channel.

MPEG-2 TS packets may be modulated by a transport scheme predefined at the physical layer, for example by the 8-VSB transport scheme, and may be transmitted to a receiving system.

Figure 4:
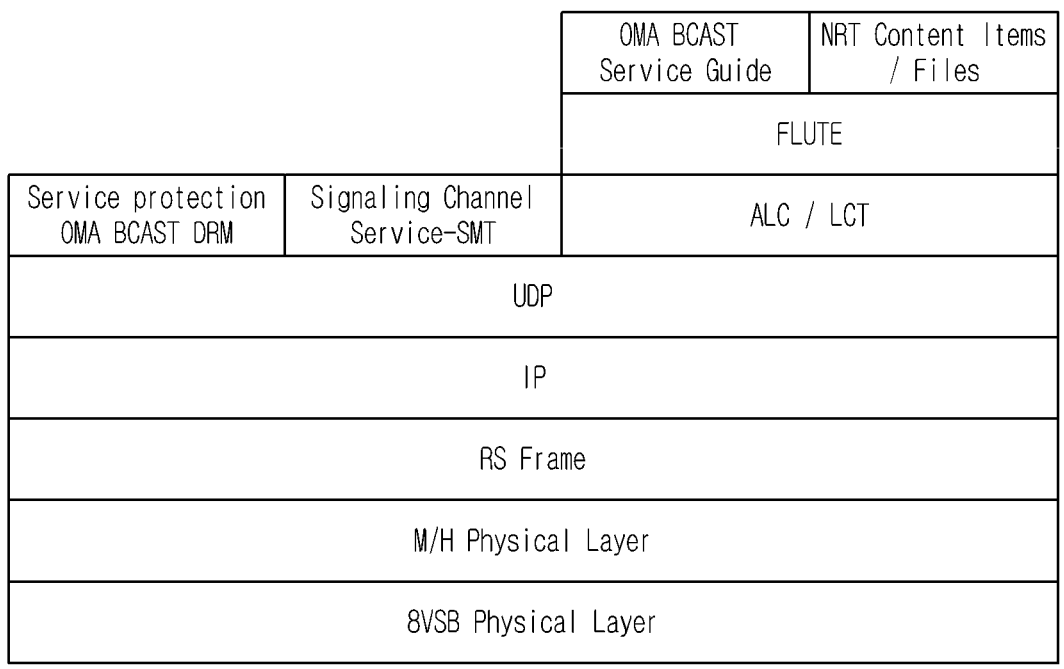
FIG. 4 shows a protocol stack for an NRT service according to another embodiment.

FIG. 4 shows a protocol stack for an NRT service according to another embodiment.

That is, FIG. 4 shows an example of a protocol stack for proving a mobile NRT service. FIG. 4 enables the IP datagram of mobile service data and the IP datagram of signaling information to be transmitted without using an MPEG-2 TS format by including the adaptation layer between the IP layer and the physical layer.

In addition, a broadcasting station packetizes NRT content/files according to the file transfer protocol in FIG. 4 and continues to packetize them according to the asynchronous layered coding/layered coding transport (ALC/LCT) protocol. The packetized ALC/LCT data continues to be packetized according to UDP and the packetized ALC/LCT/UDP data continues to be packetized according to IP to become ALC/LCT/UDP/IP data. The packetized ALC/LCT/UDP/IP data is referred to as an IP datagram in the specification for convenience of description. In this case, OMA BCAST SG information may also configure an IP datagram through the same process as the NRT content/file.

Moreover, the NRT service signaling information required for the NRT content/files (for example, SMT) is transmitted over a service signaling channel, which is packetized according to UDP and the packetized UDP data continues to be packetized according to IP to become UDP/IP data. The UDP/IP data is also referred to as an IP datagram in the specification for convenience of description. In this case, according to an embodiment, the service signaling channel is encapsulated into an IP datagram having a well-known IP destination address and a well-known destination UDP port number and is multicast.

In addition, the OMA BCAST DRM for protecting a service configures an IP datagram which is formed by sequential addition of an UDP header and an IP header.

At the adaptation layer, the IP datagram of each of the NRT service, the NRT service signaling channel, and the mobile service data is gathered to create an RS frame. The RS frame may also include the IP datagram of the OMA BCAST SG.

The length of columns of the RS frame (that is, the number of rows) may be defined as 187 bytes, the length of rows (that is, the number of columns) may be N byte and the number N may vary depending on signaling information such as a transmission parameter (or TPC data).

The RS frame is modulated by a transport scheme predefined at the mobile physical layer, for example, by the VSB transport scheme, and is transmitted to a receiving system.

According to an embodiment, whether to transmit an NRT service is signaled through the PSI/PSIP table. As an example, whether to transmit the NRT service is signaled to the VCT or the TVCT.

FIG. 5 shows a bit stream section of a TVCT table section (VCT) according to an embodiment.

Referring to FIG. 5, although the TVCT table section is exemplified as having a table type of an MPEG-2 private section, the present invention is not limited thereto.

Packet identification (PID) information on audio/video is transmitted through the TVCT by parsing the VCT and PID of the audio/video.

Thus, the TVCT table section may be classified into a header, a body, and a trailer, the header part is from the table_id field to the protocol_version field, and the transport_stream_id field is a 16 bit field and represents the MPEG-2 transport_stream ID in a program association table (PAT) that is defined by a PID value of 0 for multiplexing. In the body section part, the num_channels_in_section field is an 8 bit field and represents the number of virtual channels in the VCT section. Lastly, the trailer part includes the CRC_32 field.

Firstly, the header part is as follows.

A table_id field (8 bits) is set to 0xC8 and identifies that a corresponding table section is a table section that configures TVCT.

If a section_syntax_indicator field (1 bit) is set to 1, it represents that the section conforms general section syntax.

A private_indicator field (1 bit) is set to 1.

A section_length field (12 bits) specifies the number of bytes that remain in the section from directly after the section_length field to the last of the section. A value of the section_length field may not be larger than 1021.

A table_id_extension field (16 bits) is set to 0x000.

A version_number field (5 bits) may have a value of 0 and indicates a version number of the VCT.

If a current_next_indicator field (1 bit) is set to 1, it represents that a corresponding table section is currently applicable.

A section_number field (8 bits) indicates a number of a corresponding table section of TVCT sections. A first section of TVCT, section_number needs to be set to 0x00.

A last_section_number field (8 bits) indicates a table section having the last number and the highest number among TVCT sections.

A protocol_version field (8 bits) is a function that allows a type of a table which delivers parameters structured in a different manner from that defined in the current protocol. At present, one effective value of the protocol_version is 0. A protocol_version other than 0 may be used for a future version of the standard so as to recognize a structurally different table.

Next, the body part will be described.

A num_channels_in_section field (8 bits) designates a number of virtual channels of the VCT section. The number is limited according to the length of a table section.

A short_name field (16 bits) represents the name of the virtual channel with a 16-bit code value from 1 to 7.

A major_channel_number field (10 bits) represents a major_channel_number associated with a virtual channel that is defined in repeating the "for" loop. Each virtual channel needs to be associated with the major channel number and a minor_channel_number. The major channel number along with the minor_channel_number functions as a reference number of a virtual channel of a user.

A minor_channel_number field (10 bits) represents a minor or sub channel number in the range of '0' to '999'. The minor_channel_number field along with the major_channel_number functions as a channel number of two-part that represents a second or right part of a number. The minor_channel_number needs to be set to 0 if the service_type is an analog television. When the service_type is ATSC_digital_television or ATSC_audio_only, a minor number in the range of '1' to '99' is used. A value of the minor_channel_number is not the same as the major_channel_number in TVCT.

A modulation_mode field (8 bits) represents a modulation mode for a carrier associated with a virtual channel.

A recommended value of a carrier_frequency field (32 bits) is 0. The field for identifying a carrier frequency may be used, but it is helpful not to use the field.

A channel_TSID field (16 bits) is a sign-free integer field that represents an MPEG-2 transport_stream ID associated with a transport_stream that carries an MPEG-2 program to which a virtual channel in the range of '0x0000' to '0xFFFF' refers.

A program_number field (16 bits) identifies a sign-free integer number associated with a virtual channel that is defined by an MPEG-2 program association table (PAT) and a TS program map table (PMT). The program_number of a virtual channel corresponding to an analog service is set to '0xFFFF'.

An ETM_location field (2 bits) describes the existence and location of an extended text message (ETM).

An access_controlled field (1 bit) indicates that if the field is set, events associated with the virtual channel are access-controlled. If the flag is set to 0, event access is not limited.

A hidden field (1 bit) indicates that if it is set, a user by direct entry of a virtual channel number may not access the virtual channel. A hidden virtual channel is omitted or not defined if a user surfs a channel or it is represented if the user directly accesses channel entry. A typical application of the hidden channel is a test signal and an NVOD service. The hidden channel and its events are represented on an EPG display according to the state of a hide-guide bit.

If the hidden_guide field is set to 0 for the hidden channel, a virtual and its events may be represented on the EPG display. Since the bit ignores a channel without a hidden bit set, non-hidden channels and their events are always included in the EGP display regardless of the state of the hide_guide bit. A typical application of a hidden channel of which the hidden_guide bit set is set to '1' is a test signal and service that are easy to obtain through an application level pointer.

A service_type (6 bits) represents a type of a service that is transmitted over a virtual channel. FIGS. 6 and 7 are examples of defining a value of the service_type field according to embodiments of the present invention. In an embodiment, the value '0x04' of the service_type represented in FIG. 6 means that the service_type is ATSC_data_only_service and an NRT service may be transmitted over a virtual channel. In another embodiment, the value '0x08' of the service_type represented in FIG. 6 means that the service_type is ATSC_nrt_service and a virtual channel provides an NRT service that matches with the ATSC standard.

A source_id field (16 bits) represents a source of a program associated with a virtual channel.

A descriptors_length field represents a total length (in byte) of a descriptor for the following virtual channel.

A descriptor ( ) field includes a descriptor.

A additional_descriptors_length represents a total length (in byte) of a VCT descriptor list.

Lastly, at the trailer part, the CRC_32 field is a 32 bit field and includes a cyclic redundancy check (CRC) value that ensures a zero output from a register of a decoder defined in an MPEG-2 system after processing the entire STT section.

FIG. 8 shows a data service table (DST) section (data_service_table_section) for identifying an application of an NRT service and bit stream syntax of data_service_table_bytes included in the DST section. A broadcast station may transmit NRT service data or NRT service signaling data that matches with the ASIC standard through the DST table section shown in FIG. 8.

An example of symantics of fields that include the data_service_table_section structure is as follows.

A table_id field (8 bits) is a field for identifying a type of a corresponding table section and it may be appreciated through this field that a corresponding table section is a table section configuring the DST. For example, a receiver may identify that a corresponding table section is a table section configuring the DST if a value of this field has 0XCF.

A section_syntax_indicator field (1 bit) is an indicator that defines a section type of the DST, and the section type may be short-form syntax (0) of MPEG, for example.

A private_indicator field (1 bit) represents whether a type of a corresponding section follows a private section type, and may be set to '1'.

A private_section_length field (12 bits) represents a remaining table section length after a corresponding field. Moreover, a value of this field does not excess '0xFFD'.

A table_id_extension field (16 bits) is table dependent and may be a logical part of the table_id field that provides the scope of remaining fields.

A version_number field (5 bits) represents a version number of the DST.

A current_next_indicator field (1 bit) indicates whether a transmitted DST table section is applicable currently. If a value of this field is 0, it means that there is still no table and that it is valid on the next table.

A section_number field (8 bits) represents a section number in sections that configure the DST. The section_number of a first section of the DST is set to '0x00'. The section_number increases one by one as the section of the DST increases.

A last_section_number field (8 bits) represents a number of the last section (the highest section_number) of the DST.

A data_service_table_bytes represents a data block that configures the DST and its detailed structure will be described below.

The CRC_32 field is a 32 bit field and includes a cyclic redundancy check (CRC) value that ensures a zero output from a register of a decoder defined in an MPEG-2 system after processing the entire DST section.

An embodiment of the symantics of fields that include the above-described data_service_table_bytes structure will be defined as follows.

An sdf_protocol_version field (8 bits) describes a version of service description framework protocol An application_count_in_section field (8 bits) describes the number of applications that are listed in the DST section.

A compatibility_descriptor ( ) field represents that a corresponding structure includes a DSM-CC compatibility descriptor. The purpose is to signal compatibility requirements of an application on a receiving platform so as to determine the ability in order to use a corresponding data service.

An app_id_byte_length field (16 bits) describes the number of bytes that are used for identifying an application.

An app_id_description field (16 bits) may describe the format and symantics of the following application identification bytes. For example, a value of the app_id_description may be defined as in Table 1 below.

TABLE 1

| Value | Application Identifier Format |
|---|---|
| 0x0000 | DASE application |
| 0x0001-0x7FFF | ATSC reserved |
| 0x8000-0xFFFF | User private |

An app_id_byte field (8 bits) represents a byte of an application identifier.

A tap_count field (8 bits) describes the number of Tap ( ) structures that are used by a corresponding application.

A protocol_encapsulation field (8 bits) describes a type of protocol encapsulation that is used for transmitting a specific data element to which the Tap ( ) field refers. A value of the protocol_encapsulation field may be defined and used as in Table 2 below.

TABLE 2

| Value | Encapsulated Protocol |
|---|---|
| 0x00 | Not in a MPEG-2 Transport Stream |
| 0x01 | Asynchronous non-flow controlled scenario of the DSM-CC Download protocol encapsulated in DSM-CC sections |
| 0x02 | Non-streaming Synchronized Download protocol encapsulated in DSM-CC sections |
| 0x03 | Asynchronous multiprotocol datagrams in Addressable Sections using LLC/SNAP header |
| 0x04 | Asynchronous IP datagrams in Addressable Sections |
| 0x05 | Synchronized streaming data encapsulated in PES |
| 0x06 | Synchronous streaming data encapsulated in PES |
| 0x07 | Synchronized streaming multiprotocol datagrams in PES using LLC/SNAP header |
| 0x08 | Synchronous streaming multiprotocol datagrams in PES using LLC/SNAP header |
| 0x09 | Synchronized streaming IP datagrams in PES |
| 0x0A | Synchronous streaming IP datagrams in PES |
| 0x0B | Proprietary Data Piping |
| 0x0C | SCTE DVS 051 asynchronous protocol [19] |
| 0x0D | Asynchronous carousel scenario of the DSM-CC Download protocol encapsulated in DSM-CC sections |
| 0x0E | Reserved for harmonization with another standard body |
| 0x0F-0x7F | ATSC reserved |
| 0x80-0xFF | User defined |

An action_type field (7 bits) may represent an attribute of data to which the Tap ( ) field refers.

A resource_location field (1 bit) describes a location of the association_tag field that matches with an association_tag value listed in the following Tap structure. If a corresponding field is set to '0', the association_tag exists in the PMT of the current MPEG-2 program. If the field is otherwise set to '1', the matched association_tag exists on a DSM-CC resource descriptor in a network resource table of a corresponding data service.

A Tap ( ) field may include information for finding a data element at an application step included in a lower-layer communication channel. The association_tag field in the Tap ( ) field may include information on the relation between data elements at the application step. A value of the association_tag field in one Tap structure corresponds to a value of the association_tag field of one association tag descriptor that is included in the current PMT. For example, the Tap ( ) field may include a specific structure that includes fields such as those in Table 3 below.

TABLE 3

| Syntax | No. of bits | Format |
|---|---|---|
| Tap ( ) { | | |
|     tap_id | 16 | uimsbf |
|     use | 16 | uimsbf |
|     association_tag | 16 | uimsbf |
|     selector( ) | | |
| } | | |

A tap_id field (16 bits) is used by an application so as to identify data elements. The scope of the tap_id values is determined based on a value of the app_id_byte fields related to the Tap ( ) in the DST. The tap_id value is selected by a data service provider. Moreover, the tap_id value may be used in an application for dealing with a data element.

A use field (16 bits) is used to specify a communication channel to which the association_tag refers.

An association_tag field (16 bits) uniquely identifies any one of DSM-CC resource descriptors that are listed in a network resource table, and data element streams that are listed in the PMT. A value of a corresponding field may match with the association_tag value of the association_tab_descriptor in the PMT of a data service.

A selector ( ) field describes a specific data element that may be used in a data elementary stream or communication channel to which the association_tag field refers. Moreover, the selector structure may indicate a protocol required for a corresponding data element.

A tap_info_length field (16 bits) may describe the number of bytes of the descriptors of a field following a corresponding field.

A descriptor ( ) field may include descriptor information according to a corresponding descriptor format.

An app_info_length (8 bits) describes the number of bytes of descriptors following a corresponding field.

A descriptor ( ) field may include descriptor information according to a corresponding descriptor format.

An app_data_length field (16 bits) describes a length of the app_data_byte fields in byte.

An app_data_byte (8 bits) represents input parameters related to an application and other private data fields as 1 byte.

A service_info_length field (8 bits) describes the number of bytes of the following descriptors.

A descriptor ( ) field may include descriptor information according to a corresponding descriptor format.

A service_private_data_length field (16 bits) describes a length of private fields by byte unit.

A service_private_data_byte field (8 bits) represents a private field as 1 byte.

Figure 9:
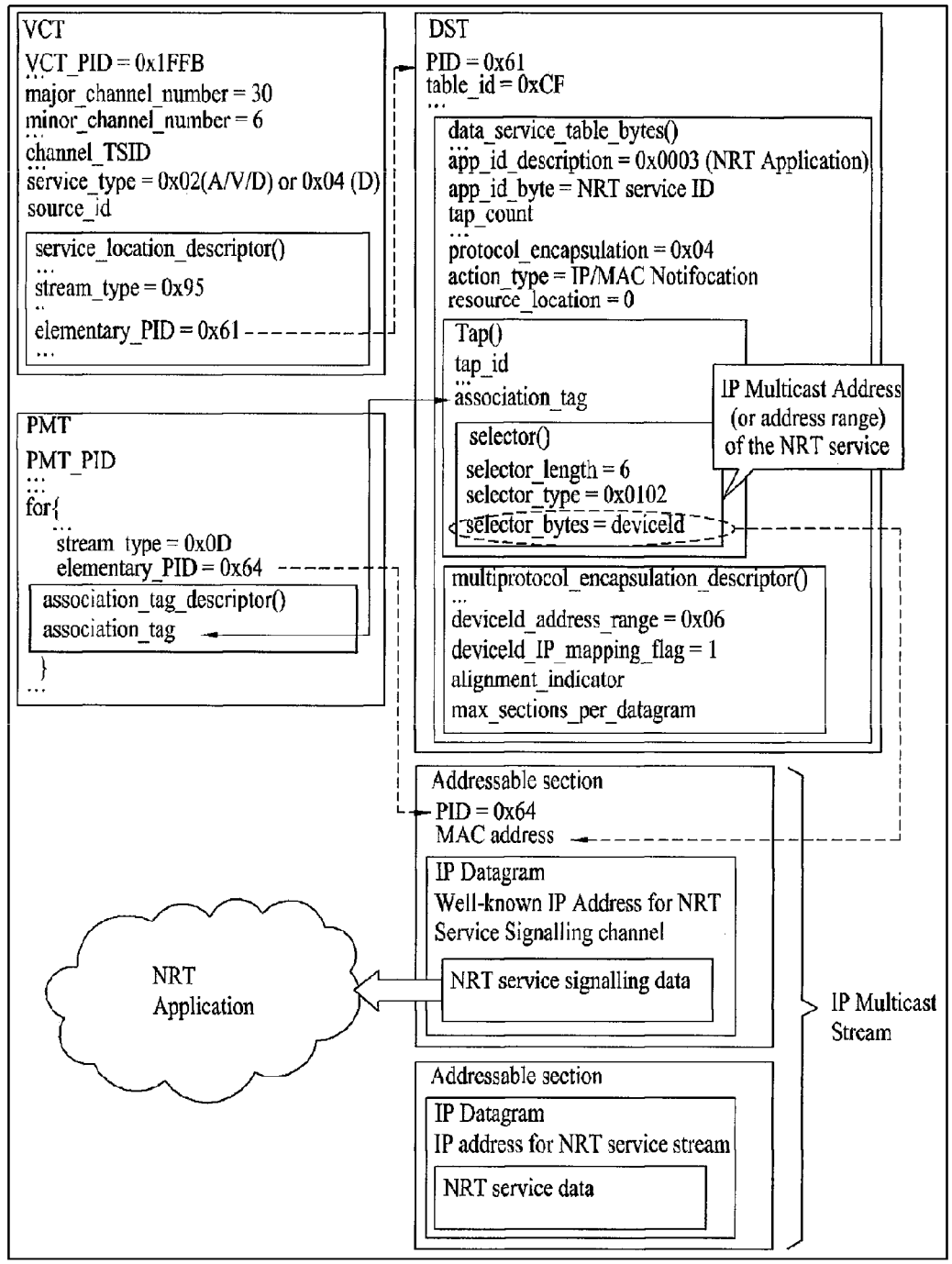
FIG. 9 is a diagram for explaining a method of receiving and providing an NRT service by utilizing the ATSC A/90 standard for delivering a data broadcast stream and the ATSC A/92 standard for transmitting an IP multicast stream in a receiving system according to the present invention.

FIG. 9 is a diagram for explaining a method of receiving and providing an NRT service by utilizing the ATSC A/90 standard for delivering a data broadcast stream and the ATSC A/92 standard for transmitting an IP multicast stream in a receiving system according to the present invention;

That is, information on a stream configuring each virtual channel is signaled to the service location descriptor of a VCT or the ES_loop of a PMT. For example, if the service type of the VCT is 0x02 (that is, digital A/V/data), 0x04 (that is, data only) or 0x08 (that is, NRT only service) as shown in FIG. 7 or FIG. 8, an NRT service stream may be transmitted to the virtual channel. In this case, when 0x95 (that is, DST transmission) is assigned to the stream_type field value that is included in the service location descriptor of the VCT (or the ES loop of the PMT), it means that data broadcast is transmitted. If there is no stream_type field value or the value is not 0x95, only general A/V is transmitted. That is, when the stream_type field value that is included in the service location descriptor represents 0x95, the elementary_PID field value becomes the PID value of the DST. Thus, the DST may be received through the elementary_PID.

Through the DST, it is possible to recognize a type of an application and the detailed information on a data broadcast stream that is transmitted over this channel. The present invention identifies an NRT application (that is, NRT service) by using the DST.

That is, the app_id_description field of the DST regulates the format and interpretation of the following application identification bytes. According to an embodiment, '0x0003' is assigned to the app_id_description field so as to identify an NRT application. The value is just exemplary, and the right scope of the present invention is not limited to the value.

When the app_id_description field value is '0x0003', the following application_id_byte value becomes the service ID value of the NRT application. A service ID for the NRT application may have an URI value that uniquely identifies a corresponding service over the world.

After identifying the NRT application, the PID of an MPEG-2 TS packet split from the IP datagram of an NRT service signaling channel is found through tap information. Then, it is possible to obtain an IP datagram, which transmits the NRT service signaling channel, from MPEG-2 TS packets having the PID that is found through the tap information, and it is possible to obtain NRT service signaling data from the obtained IP datagram. In this case, the IP access fragment of the NRT service signaling channel may include well-known IP access fragment, that is, a well-known IP address and a well-known UDP port number.

That is, if the protocol_encapsulation field value in the DST is 0x04, an asynchronous IP stream is transmitted, and if the selector_type field value is 0x0102, the device_id value that indicates a destination address is transmitted through the selector_bytes. The multiprotocol_encaplsulation_ descriptor is used to accurately interpret the selector_bytes value, and the number of bytes valid among the device_id values is signaled. As a result, it is possible to recognize the IP multicast address (or address range) of the NRT service signaling channel that is transmitted to a corresponding PID through tap information.

Thus, a receiver accesses the IP multicast address (or address range), receives an IP stream or an IP packet, and extracts NRT service signaling data from the received IP packet.

In addition, the receiver may receive NRT service data, such as NRT content item/files on the basis of the extracted NRT service signaling data and store the data in a storage medium or display the data on a display device.

As another example, the present invention may signal the NRT service by using a new value such as 0x96 instead of 0x95 as the steam type field value of the DST. This is because it is likely to perform wrong operation on the NRT service that is a new application, when a typical receiver determines and operates only on the basis of the existence of a stream having a stream type of 0x95 whether a data broadcast stream exists. In this case, a stream type is newly designated and the typical receiver ignores it so that backward compatibility would be able to be guaranteed.

Figure 10:
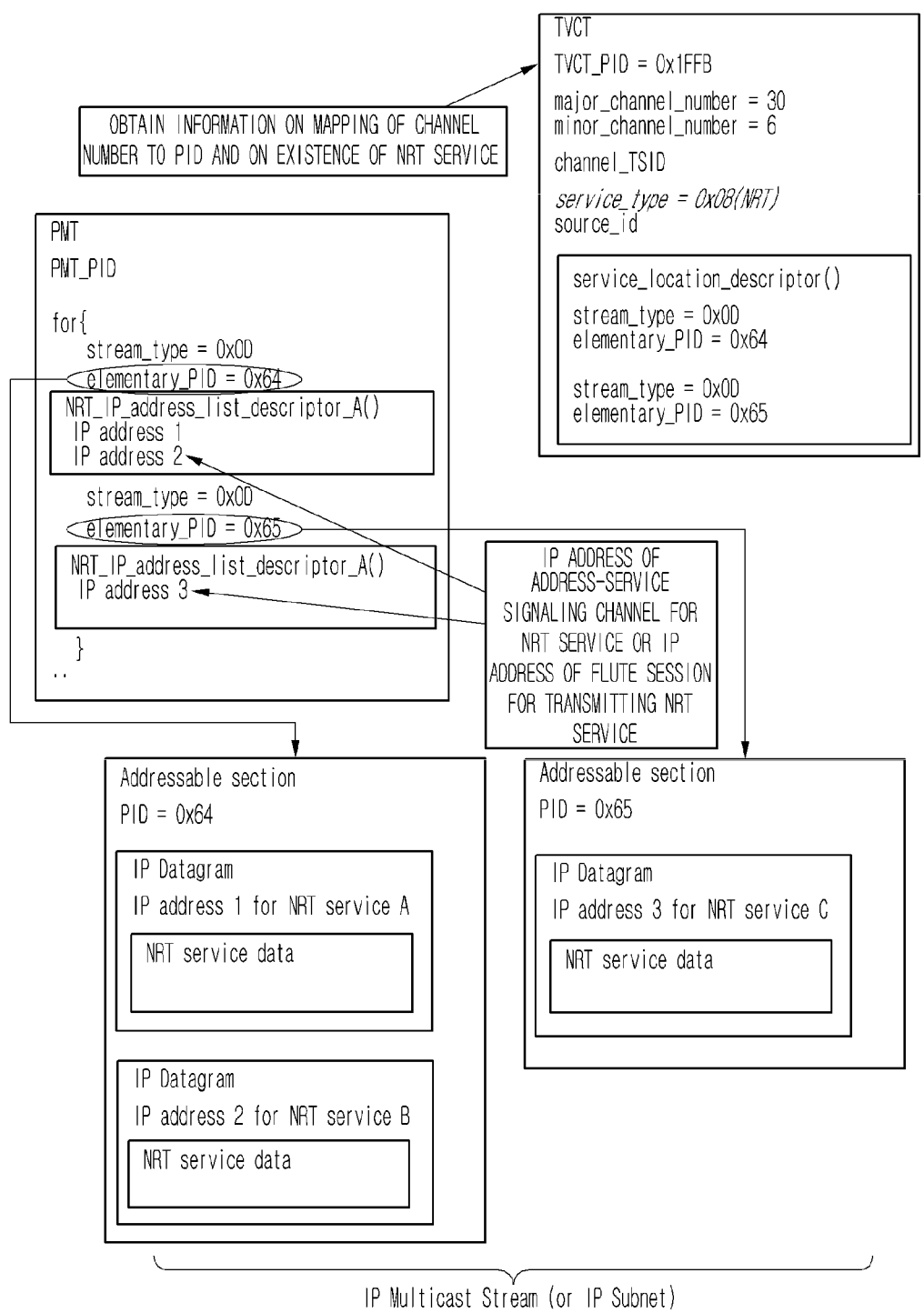
FIGS. 10 and 11 are diagrams for explaining a method of receiving an NRT service by using DSM-CC addressable section data according to another embodiment.
Figure 11:
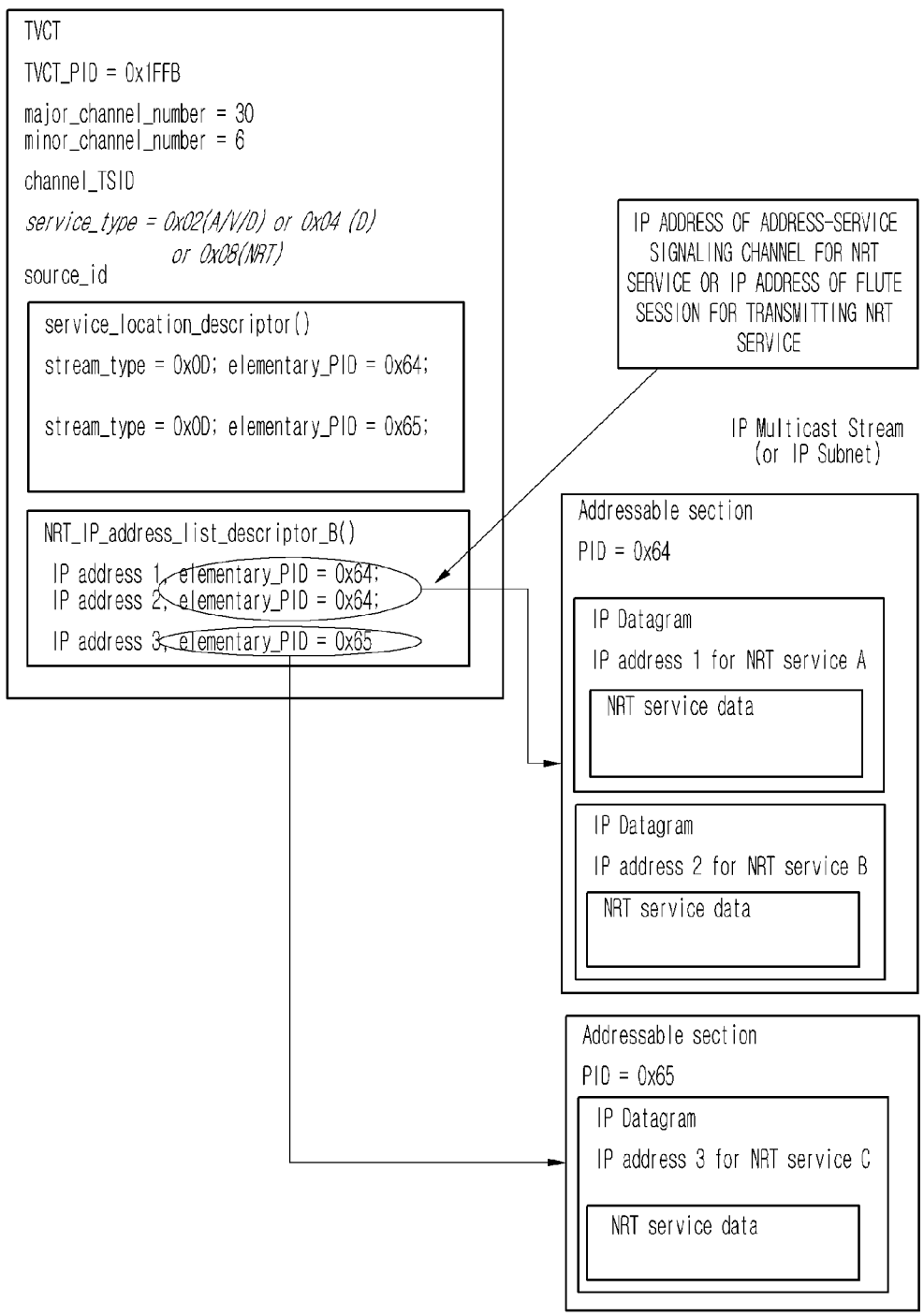

FIGS. 10 and 11 are diagrams for explaining a method of receiving an NRT service by using DSM-CC addressable section data according to another embodiment.

The data transport scheme using the DST is standard for transmitting all types of an IP datagram through a digital broadcast stream and may be inefficient in the NRT service. Thus, as an embodiment, FIGS. 10 and 11 show a method of signaling the PID of a specific stream including the section data and IP address information on an IP datagram on the NRT service through the DSM-CC addressable section data and receiving the NRT service.

As shown in FIG. 10, a receiver may obtain information that an NRT service stream may be transmitted to a virtual channel, when the service type of a VCT (or TVCT) is 0x08 (that is, an NRT only service). That is, the receiver may map the PID of the virtual channel to a channel number and thus obtain information the existence of the NRT service according to the service_type information.

When 0x0D is assigned to the stream_type field value that is included in the service location descriptor of a VCT (or the ES loop of a PMT), it may mean that a DSM-CC stream is transmitted. In this case, the elementary_PID field value may be the PID value of the DSM-CC addressable section. Thus, the receiver may receive the DSM-CC addressable section including NRT service data through the elementary_PID.

That is, the receiver may obtain the PID of the DSM-CC addressable section through the VCT or the PMT. Here, the receiver may obtain the NRT_IP_address list_descriptor_A( ) field that includes the IP address of an NRT service signaling channel corresponding to the PID obtained from the PMT of a corresponding stream or the IP address of a FLUTE session for transmitting NRT service data.

In addition, the receiver may receive the DSM-CC addressable section data from an IP multicast stream or an IP subnet on the basis of the IP address that is obtained from the NRT_IP_address list_descriptor_A( ) field. The receiver may obtain corresponding an IP datagram that includes specific NRT service (for example, A, B, or C) data by finding a DSM-CC addressable section, in which the PID corresponding to the obtained elementary_PID exists, from the received DSM-CC addressable section data.

FIG. 11 represents, as another embodiment, a method of signaling DSM-CC addressable section data by using a VCT.

As described above, the receiver may obtain information that an NRT service stream may be transmitted, when the service_type specified in the VCT is 0X02, 0X04 or 0X08. In addition, the receiver may obtain the elementary_PID having a stream type of 0X0D from the service_location_descriptor( ) field so as to receive a DSM-CC stream. Here, the receiver may obtain from the VCT the NRT_IP_address list_descriptor_B( ) field that includes the IP address of an NRT service signaling channel corresponding to the obtained elementary_PID and the IP address of a FLUTE session for transmitting NRT service data.

In addition, the receiver may receive DSM-CC addressable section data from an IP multicast steam or an IP subnet on the basis of the IP address obtained from the NRT_IP_address list_descriptor_B( ) field. The receiver may parse a DSM-CC addressable section having a PID corresponding to the obtained elementary_PID from the received DSM-CC addressable section data and thus obtain IP datagram that includes specific NRT service (for example, A, B, or C) data which the receiver desires to receive.

An example of extracting the NRT service signaling data and the NRT service data will be described below. In this example, 0x08 is assigned to the service_type field value in the VCT and one or more NRT services are transmitted to a corresponding virtual channel.

That is, if the receiver is powered on and a default channel or a user channel is selected through a tuner, a PSI/PSIP section handler obtains the VCT and the PMT from a broadcast signal received over the selected channel. In addition, the PSI/PSIP section handler pareses the obtained VCT and checks whether there is an NRT service. This may be recognized by checking the service_type field value in the virtual channel loop in the VCT. For example, if the service_type field value is not 0x08, a corresponding virtual channel does not transmit the NRT service. In this case, since the virtual channel transmits a typical service (that is, legacy ATSC service), the receiver performs a proper operation according to the information included in the virtual channel.

In addition, if a demultiplexer is controlled by a service manager and the service_type field value is 0x08, a corresponding virtual channel transmits an NRT service. In this case, the service location descriptor in the virtual channel loop in the VCT is parsed to extract the PID of the DST. In addition, the DST is received by using the extracted PID.

In addition, the receiver checks whether a corresponding service that is provided through the channel selected from the received DST is an NRT service.

The NRT service may be checked from the app_id_description field value.

According to an embodiment, '0x0003' is assigned to the app_id_description field so as to identify an NRT application (that is, an NRT service). The value is just exemplary and the right scope of the present invention is not limited to the value.

If the app_id_description field value in the DST is '0x0003', the following application_id_byte value becomes the service ID value of an NRT application (that is, an NRT service). Therefore, a service manager or a PSI/PSIP section handler identifies the NRT application (that is, NRT service) as described above, and extracts tap so as to find the PID of an MPEG-2 TS packet split from the IP datagram of an NRT service signaling channel. Subsequently, a stream PID including the association_tag of the extracted tap is extracted from the PMT.

In addition, an addressable section handler may receive MPEG-2 TS packets corresponding to the extracted stream PID, perform de-capsulation or remove an MPEG-2 header and recover a DSM-CC addressable section.

Subsequently, a receiver recovers an IP datagram transmitting an NRT service signaling channel by removing a section header and a CRC checksum from the DSM-CC addressable section and obtains NRT service signaling data from the recovered IP datagram. Here, the access fragment on an IP datagram transmitting the NRT service signaling channel is a well-known destination IP address and a well-known destination UDP port number according to an embodiment.

That is, if the protocol_encapsulation field value in the DST is 0x04, an asynchronous IP stream is transmitted, and if the selector_type field value is 0x0102, the device_id value that indicates a destination address is delivered through the selector_bytes. The multiprotocol_encaplsulation_ descriptor is used to accurately interpret the selector_bytes value, and the number of bytes valid among the device_id values is signaled. As a result, it is possible to recognize the IP multicast address (or address range) of the NRT service signaling channel that is transmitted to a corresponding PID through tap information.

Thus, a receiver accesses the IP multicast address (or address range), receives an IP stream or an IP packet, and extracts NRT service signaling data from the received IP packet.

The receiver may receive NRT service data, such as NRT content item/files on the basis of the extracted NRT service signaling data and store the data in a storage medium or display the data on a display device.

According to an embodiment, the above-described NRT service may be provided through a dynamic content delivery (DCD) service. The DCD service is a service that content is transmitted to the receiver periodically or whenever a user desires, and in this case, the content is selected by a server according to information on the receiver. The DCD service supports a point-to-point mode and a broadcast mode as a communication means for content deliver, and according to an embodiment, the above-described NRT service is transmitted by the OMA BCAST mode that is one of the broadcast modes of the DCD service.

It is possible to transmit NRT service data through the DCD service of such an OMA BCAST mode. In this case, the receiver may obtain DCD channel information for receiving an NRT service and receive the NRT service through a corresponding DCD channel on the basis of DCD channel information.

In addition, such DCD channel information may be transmitted as a part of the above-described NST. For example, the receiver may receive the NST, perform DCD bootstrap and obtain DCD channel information.

In addition, the above-described NST may include DCD channel metadata that may be received through a DCD administrative channel for signaling DCD channel information. Thus, the receiver may obtain the metadata and information on a channel over which the NRT service may be received through the NST.

Thus, if the DCD channel information is transmitted as a part of the NST, it is possible to access the DCD channel through the NST without the process of transmitting the NRT service signaling data and receive the NRT service.

As such, when the NST includes the metadata of a channel over which the NRT service may be transmitted according to an embodiment, there are several advantages.

Firstly, it is possible to increase a service access speed by directly receiving, by the NST, channel metadata that may receive the NRT service, without the process of receiving the NRT service signaling data on the basis of the service type of the virtual channel.

Moreover, it is possible to perform update signaling for a channel change in real time under a broadcast environment.

In addition, it is possible to obtain an access fragment of OMA BCAST SG with reference to the NST. For example, a receiver may receive DCD channel metadata on the basis of the DCD channel information in the NST and obtain an access fragment for receiving the NRT service on the basis of the NRT service signaling data and DCD channel metadata obtained from the NST.

Lastly, it is possible to include and transmit a list of NRT services associated with another virtual channel in the NST. Thus, in this case, the list information of the NRT services may be transmitted over a specific NRT service signaling channel through the IP layer instead of the PIS or PSIP layer. Thus, in this case, it is possible to preserve backward compatibility with PSI or PSIP.

As described above, the DCD channel information including DCD channel metadata may be included in the access fragment of the OMA BCAST SG and the access fragment corresponds to NRT service information that is included in the NST. More particularly, a receiver may obtain NRT service information in the NST from the access fragment of the OMA BCAST SG. Thus, the receiver may receive the NST corresponding to the obtained NRT service information and obtain information for receiving the NRT service.

The NRT service transmitted over such a DCD channel may be divided by separately assigning a service category. For example, the service category of the NRT service that is transmitted over the DCD channel may be identified as 0X0F.

FIGS. 12 and 13 show bit stream syntax of NST according to an embodiment.

Here, although corresponding syntax is written in an MPEG-2 private section type to help reader's understanding, a corresponding data format has no limitation. For example, other methods such as representing as a session description protocol (SDP) type and signaling using session announcement protocol (SAP) may also be used.

The NST describes an IP access fragment and the service information in a virtual channel to which the NST is transmitted, and also provides an NRT broadcast stream of a corresponding service by using NRT_service_id that is the identifier of the NRT broadcast stream to which each service belongs. In addition, the NST according to the embodiment includes description information on each fixed NRT service in one virtual channel and a descriptor area may include other additional information.

The table_id field (8 bits) is a field for identifying the type of a corresponding table section and it may be recognized through this field that a corresponding table section is a table section configuring the NST.

The section_syntax_indicator field (1 bit) is an indicator defining the section typf of the NST and the section type may be, for example, the short-form syntax (0) of MPEG.

The private_indicator field (1 bit) represents whether the type of a corresponding section follows a private section type, and is set to '1'.

The section_length field (12 bits) represents a remaining table section length after a corresponding field. Moreover, a value of this field does not exceed '0xFFD'.

The table_id_extension field (16 bits) is table dependent and becomes the logical part of the table_id field that provides the scope of remaining fields. Here, the table_id_extension field includes the NST_protocol_version field.

The NST_protocol_version field (8 bits) represents a protocol version for representing the NST to which parameters having a structure different from that of parameters defined in the current protocol are transmitted. At present, a value of this field is 0. If the value of this field is later designated as other values instead of 0, this is for a table having a different structure.

The version_number field (5 bits) represents a version number of the NST.

The current_next_indicator field (1 bit) indicates whether a transmitted NST section is currently applicable. If the value of this field is 0, it means that there is still no table and the following table is valid.

The section_number field (8 bits) represents a section number in sections that configure an NST table.

The section_number of a first section of the NST is set to '0x00'. The section_number increases by 1 whenever the section of an NRT service table increases.

The last_section_number field (8 bits) represents a number of the last section (the highest section_number) of the NST.

The carrier_frequency field (32 bits) represents a transmission frequency corresponding to a channel.

The channel_TSID field (16 bits) means that a corresponding NST section is a unique channel identifier of a broadcast stream that is being transmitted.

The program_number field (16 bits) represents a number of a program associated with a virtual channel.

The source_id field (16 bits) represents a source of a program associated with the virtual channel.

The num_NRT_services field (8 bits) represents the number of NRT services in the NST section.

The NST according to the embodiment provides information on a plurality of fixed NRT services by using the 'for' loop. The following field information may be provided to each fixed NRT service below.

The NRT_service_status field (2 bits) identifies the state of a corresponding mobile service. Here, MSB indicates whether a corresponding mobile service is active (1) or inactive (0), and LSB indicates whether a corresponding mobile service is hidden (1) or not (0). Here, when the mobile service is an NRT service, the state of a corresponding NRT service will be identified. The hidden service is mainly used for an exclusive application and a general receiver ignores it.

The SP_indicator field (1 bit) is a field for representing that service protection is set, the service protection being applied to at least one of components required for providing a meaningful presentation of a corresponding mobile service.

The CP_indicator field (1 bit) represents whether there is content protection for a corresponding NRT service. If the CP_indicator field value is 1, it may mean that content protection is applied to at least one of components required for providing a meaningful presentation of a corresponding NRT service.

The NRT_service_id field (16 bits) is an indicator that uniquely identifies a corresponding NRT service in the range of corresponding NRT broadcast. The NRT_service_id does not change during a corresponding service. Here, after a service ends, the NRT_service_id for the service may not be used for other services in order to avoid confusion until a proper time passes.

The short_NRT_service_name field (8*8 bits) represents the short name of the NRT service. When there is no short name for the NRT service, the field may be filled with a null value (for example, 0x00).

The NRT_service_category field (6 bits) identifies the type of a service that is transmitted in a corresponding NRT service.

The num_components field (5 bits) represents the number of IP stream components that are included in the NRT service.

The IP_version_flag field (1 bit) indicates that if it is set to '0', the source_IP_address field, the NRT_service_destination_IP_address field, and the component_destination_IP_address field are IPv4 addresses, and if this field is set '1', the source_IP_address field, the NRT_service_destination_IP_address field, and the component_destination_IP_address field are IPv6 addresses.

The source_IP_address_flag (1 bit) indicates that if the flag is set, there is a source_IP_address value for a corresponding NRT service so as to indicate source-specific multicast.

The NRT_service_destination_IP_address_flag (1 bit) indicates that if the flag is set to '1', the NRT_service_destination_IP_address field for providing a default IP address for components of a corresponding NRT service exists.

The source_IP_address field (128 bits) will exist if the source_IP_address_flag is set to 1, but the field will not exist if the source_IP_address_flag is set to 0. If the field exists, it will include the source IP addresses of all IP datagrams that transmit the components of a corresponding NRT service. The limited usage of the 128-bit long address of the field is intended to enable the usage of IPv6 later although the usage of IPv6 is not currently defined. The source_IP_address becomes the source_IP_address of the same server that transmits all channels in a FLUTE session.

For the NRT_service_destination_IP_address field (128 bits), if the source_IP_address_flag is set to 1, the corresponding source_IP_address field will exist, but if the source_IP_address_flag is set to 0, the corresponding source_IP_address field will not exist. If the corresponding source_IP_address field does not exist, the component_destination_IP_address field will exist for each component in the num_components loop. The limited usage of the 128-bit long address of the corresponding source_IP_address field is intended to enable the usage of IPv6 later although the usage of IPv6 is not currently defined. The NRT_service_destination_IP_address is signaled if the destination IP address of the session level of the FLUTE session exists.

The NST according to the embodiment provides information on a plurality of components by using the 'for' loop. The essential_component_indicator field (1 bit) indicates that if a value of the field is set to 1, a corresponding component is an essential component for an NRT service. Otherwise, a corresponding component represents an optional component.

The port_num_count field (6 bits) indicates a number of an UPD port related to a corresponding UPD/IP stream component. A value of a destination UDP port number increases by 1 starting from the component_destination_UDP_port_num field value.

If the component_destination_IP_address_flag field (1 bit) is set to 1, it represents that the component_destination_IP_address for a corresponding component exists.

The component_destination_IP_address field (128 bits) will exits if the component_destination_IP_address flag is set to 1, but the field will not exist if the component_destination_IP_address flag is set to 0. If the field exists, it will include the source_IP_address of all IP datagrams that transmit the components of a corresponding NRT service. The limited usage of the 128-bit long address of the field is intended to enable the usage of IPv6 later although the usage of IPv6 is not currently defined.

The component_destination_UDP_port_num field (16 bits) represents a destination UDP port number for a corresponding UDP/IP stream component.

The num_component_level_descriptors field (4 bits) provides the number of descriptors that provide further information on a corresponding IP stream component.

The component_level_descriptors field identifies one or more descriptors that provide further information on a corresponding IP stream component.

The num_NRT_service_level_descriptors field (4 bits) represents the number of NRT service level descriptors for a corresponding service.

The NRT_service_level_descriptor ( ) identifies one or more descriptors that provide further information on a corresponding NRT service. There may be no descriptor. Here, a particular service type of the NRT service may be provided. The particular service type include, for example, a portal service providing web content, a push VOD service, an A/V download service, etc.

The num_virtual_channel_level_descriptors field (4 bits) describes the number of virtual channel level descriptors for a corresponding virtual channel.

The virtual_channel_level_descriptor ( ) represents descriptors that provide further information on a virtual channel on which a corresponding NST describes.

The NRT service is transmitted through the FLUTE and the access fragment on the NST is connected to FLUTE session information as follows.

The source_IP_address becomes the source IP address of the same server that transmits all channels in the FLUTE session.

The NRT_service_destination_IP_address is signaled when the destination IP address of the session level in the FLUTE session exists.

A component may be mapped to a channel in the FLUTE session and may signal a separate destination IP address (different from an IP address signaled by session unit) by each channel through the component_destination_IP_address.

Moreover, it is possible to signal a destination port number through the component_destination_UDP_port_num and further designate the number of destination ports starting from the component_destination_UDP_port_num through the port_num_count.

It is possible to configure a plurality of channels for one destination IP address by designating a plurality of ports. Here, one component may designate a plurality of channels. However, the channel may be distinguished through a destination IP address in general. Here, it may be considered that one channel is mapped to one component.

Content items/files for an NRT service are transmitted through the FLUTE and signal corresponding FLUTE session information by using the access fragment on an NST.

FIG. 14 shows bit stream syntax of a MH_component_descriptor according to an embodiment.

The NRT_component_descriptor ( ) will be represented in the component descriptor loop of each component of each NRT service in the NST. In addition, all parameters in a corresponding descriptor correspond to parameters Information on each field that is transmitted through the NRT_component_descriptor of FIG. 14 is as follows.

The component_type field (7 bits) identifies the encoding format of a component. The identification value may be one of values assigned for the payload_type of an RTP/AVP stream. Moreover, the identification value may be a dynamic value in the range of 96 to 127. For components that configure media transmitted via the RTP, the values of this field match with those of the payload_type in the RTP header of an IP stream that transmits a corresponding component.

The further value of the component_type field in the range of 43 to 71 is defined by a future version of standard. In order to further signal parameters required for the FLUTE session to be described when the NRT service stream is transmitted on the basis of the FLUTE, it is possible to use a component_type of 38 that is defined for a FLUTE component in the ATSC or it is possible to newly define and use the component type as 43 that is a value not yet assigned.

The num_STKM_streams field (8 bits) identifies a number of an STKM stream related to a corresponding component.

The STKM_stream_id field (8 bits) identifies an STKM stream that connects keys so as to decrypt an obtained corresponding protected component. Here, the component descriptor for the STKM stream refers to the STKM_stream_id field.

The NRT_component_data (component_type) field provides at least one of encoding parameters required for representing a corresponding component and other parameters. Here, the structure of the NRT_component_data element is determined by the value of the component_type field.

The file delivery table (FDT) in FLUTE sessions is used to deliver the item list of all content items and provides a size of items related to obtaining the items, a data type, and other information.

Thus, the present invention uses an NST to receive content selected from a service guide (SG) including NRT-IT and obtains information for accessing the FLUTE session in which corresponding content is transmitted. In addition, the present invention maps, information on a file that is transmitted in the corresponding FLUTE session, to information on the content item of NRT-IT. In this case, the identification of a service including the selected content item is solved through the NRT_service_id of the NST.

The NRT service is transmitted through the FLUTE and the access fragment on the NST is connected to the FLUTE session information as follows.

The Source_IP_address becomes the source_IP_address of the same server that transmits all channels in the FLUTE session.

The NRT_service_destination_IP_address is signaled when the destination IP address of the session level in the FLUTE session exists.

A component may be mapped to a channel in the FLUTE session and may signal a separate destination IP address (different from an IP address signaled by session unit) by each channel through the component_destination_IP_address. Moreover, it is possible to signal a destination port number through the component_destination_UDP_port_num and further designate the number of destination ports starting from the component_destination_UDP_port_num through the port_num_count.

It is possible to configure a plurality of channels for one destination IP address by designating a plurality of ports, and in this case, one component designates a plurality of channels. However, it is generally recommended that the channel be distinguished through a destination IP address, and in this case, it may be considered that one channel is mapped to one component.

It is possible to use the component_attribute_byte so as to signal a further attribute of a component configuring a session. It is thus possible to signal further parameters required for signaling the FLUTE session.

Regarding this, parameters are needed to signal the FLUTE session and these parameters include essential parameters that are necessarily needed, and optional parameters that are optionally needed in relation to the corresponding FLUTE session. Firstly, the essential parameters include a source IP address, the number of channels in the session, the destination IP address and port number for each channel in the session, the transport session identifier (TSI) of the session, and the start time and end time of the session, and the parameters optionally needed in relation to the corresponding session include FEC object transmission information), some information that tells receiver in the firstplace that the session contains files that are of interest, and bandwidth specification.

The number of channels in the session may be explicitly provided or obtained by summing the number of streams that configure the session. Among these parameters, the start time and end time of the session, a source IP address, the destination IP address and port number for each channel in the session, the transport session identifier (TSI) of the session, and the number of channels in the session may be signaled through the NST and the component_descriptor.

FIG. 15 shows bit stream syntax of an NRT_component_descriptor to which NRT_component_data according to an embodiment belongs.

One NRT service may be included in multiple FLUTE sessions. Each session may be signaled by using one or more NRT component descriptors depending on ports and IP addresses that are used for the session.

Each field of the NRT_component_data will be described below in detail.

The TSI field (16 bits) represents the TSI of the FLUTE session.

The session_start_time field indicates when the FLUTE session starts. When the values of the field are all 0, it may be interpreted that the session has already started.

The session_end_time field indicates when the FLUTE session ends. When the values of the field are all 0, it may be interpreted that the session continues endlessly.

The tias_bandwidth_indicator field (1 bit) indicates flags that include transport independent application specific (TIAS) bandwidth information. That bit needs to be set to 1 so as to indicate that the TIAS bandwidth field exists, and that bit needs to be set to 0 so as to indicate that the TIAS bandwidth field does not exist.

The as_bandwidth_indicator field (1 bit) is flags that include application specific (AS) bandwidth information. That bit needs to be set to 1 so as to indicate that the AS bandwidth field exists, and that bit needs to be set to 0 so as to indicate that the AS bandwidth field does not exist.

The FEC_OTI_indicator field (1 bit) represents whether FEC object transmission information (OTI) is provided.

The tias_bandwidth field represents TIAS maximum bandwidth.

The as_bandwidth field has a value of AS maximum bandwidth.

The FEC_encoding_id field represents an FEC encoding ID used in that FLUTE session.

The FEC_instance_id field represents an FEC instance ID that is used in that FLUTE session.

Information that is necessarily needed for receiving the FLUTE session may be all provided by signaling the above-mentioned parameters through the FLUTE component data bytes, and a method of receiving files may be used in which FDT is received through the session and accordingly, information on all files transmitted through the FLUTE session is obtained.

The FLUTE component descriptor may be transmitted through the component_level_descriptor loop. When there is a plurality of FLUTE channels, the parameters of the session level such as TSI, session_start_time, session_end_time, etc. need to be signaled only once. Thus, only one of components of several channels may transmit the FLUTE component descriptor through the component_level_descriptor loop.

FIG. 16 shows bit stream syntax of NRT-IT section for signaling an NRT application according to an embodiment belongs.

Information provided by the NRT-IT includes the title of content (for example, the name of a downloadable program), a downloadable time and information, such as content advisories, the availability of a caption service, content identification, and other metadata. One item of content may include one or more files. For example, an audio/video clip may be played as a JPEG thumbnail image that may be used for a screen display.

An instance of the NRT-IT may include data that corresponds to an arbitrarily defined period, or may also describe NRT content that starts at a designated time and ends in the indefinite future. Each NRT-IT represents a start time and a duration which may be indefinite. Each NRT-IT instance may be split into as many as 256 sections. Each section includes information on a plurality of content items but information on a specific content item may not be split and may not be stored in two or more sections.

A downloadable content item that has an extended time as compared to a period during which one or more NRT-IT instances take is described on only the first of the NRT-IT. The content item description is stored in the NRT_information_table_section ( ) in availability order. Thus, when a value of the last_section_number is larger than 0 (which means that the NRT-IT is transmitted to a plurality of sections), all content item description on a specific section other than the first section will have the first availability that is the same as or higher than that of the content item description on the next section.

Each NRT-IT identifies an NRT service that is related to a specific value of the service_id valid in a specific virtual channel during the period.

The table_id field (8 bits) is sets as 0xTBD so as to identify that the corresponding table section is a table section configuring the NRT-IT.

The service_id field (16 bits) describes the service_id field that is related to an NRT service showing a content item that describes in the section.

The NRT_IT_version_number field (5 bits) is defined as a set in one or more NRT_content_table_section ( ) that have a value common to the service_id, current_next_indicator, protocol_version and time_span_start fields. It identifies a version number of an NRT-IT instance. The version number increases by 1 modulo 32 when a field of the NRT-IT instance changes.

When a current_next_indicator field (1 bit) is set to 1, it represents that the corresponding table section is currently applicable.

A protocol_version field (8 bits) is set to 0. The protocol_version allows, in future, a type of a table that has parameters that may be structurally different from those defined in the current protocol. At present, a unique valid value of the protocol_version is 0. A value other than 0 in the protocol_version is used as a future version of standard that recognizes a structurally different table.

The time_span_start field (32 bits) shows the start of the instance period of the NRT-IT that is represented as the number of GPS seconds since 00:00:00 UTC, Jan. 6, 1980. The time of the day of the time_span_start needs to follow the minute 00 of a time. A value of the time_span_start of 0 shows the period of the NRT-IT instance starting from undefined past. A value of a time_span is equal every section of the NRT-IT instance that includes a plurality of sections. Values of the time_span_start and a time_span_length are set not to be the same as those of another NRT-IT instance in an IP subnet during a designated period.

A time_span_length field (11 bits) identifies the number of minutes starting from a time recognized at the time_span_start which the instance of the NRT-IT recognizes covers. Once a value of the time_span_length is set, the value does not change at a given time_span_start value. When the value of the time_span_length is 0, the NRT-IT instance covers all times starting from the time_span_start in the indefinite future. When the value of the time_span_start is 0, the time_span_length is meaningless.

The value of the time_span_start is equal every section of the NRT-IT instance that includes a plurality of sections. Values of the time_span_start and the time_span_length are set not to be the same as those of another NRT-IT instance in an IP subnet during a designated period.

A num_items_in_section field (8 bits) represents the number of content items that are described in the NRT-IT section.

A content_linkage field (16 bits) represents an identification number of content in the range of 0x0001 to 0xFFFF. The value 0x0000 is not used. The content_linkage has a linkage function of linking one or more files of FLUTE FDT related to an NRT service to the metadata of the NRT-IT and also forms an identifier for text fragment in text fragment table (TF_id). A value of the content_linkage field corresponds to a value of a file-content-linkage element or a value of an FDTD content-linkage element in the FLUTE FDT in each file related to a content item. The priority rule is applied when matching each content_linkage value including the corresponding content_linkage element in the FLUTE FDT.

A TF_availiable flag (a boolean flag) is set to '1' if text fragment exists in the text fragment table in a service signaling channel. If the text fragment is not included in the service signaling channel for the content item, a value of the TF_availiable field is set to '0'.

When a low_lantency flag (a boolean flag) is set to '1', content is valid in the current digital transmission having a sufficiently low latency time when a user awaits. If it is set to '0', a restoration latency time is longer and a user interface suggests a user viewing content later.

A playback_length_in_seconds (20 bits) is integer that represents the playback time of content as seconds. Content including texts and/or still images is represented as a value of '0'. Content includes audio or audio/visual content. The playback_length_in_seconds represents the playback time of the audio or audio/video content.

When a content_length_included flag (a boolean flag) is set to '1', it represents that the content_length field exists in the repetition of a 'for' loop. If the flag is set to '0', it represents that the content_length field does not exist in the repetition of a 'for' loop.

When a playback_delay_included flag (a boolean flag) is set to '1', it represents that the playback_delay exists in the repetition of a 'for' loop. When the flag is set to '1', it represents that the playback_delay does not exist in the repetition of a 'for' loop.

When a value of an expiration_included flag (a boolean flag) is set to '1', it represents that the expiration field exists in the repetition of a 'for' loop. When the flag is set to '0', it represents that the expiration field does not exist in the repetition of a 'for' loop.

A duration (12 bits) field represents, as minutes, the scheduled cycle time of carousel including a referenced content item in the range of 1 to 2880. A receiver uses a duration parameter that determines an amount of time during which the referenced content is captured.

A playback_delay (20 bits) is represented as the number of seconds before playing related content back and after receiving a first byte, while an incoming stream is buffered. A value of 0 represents that playback starts immediately. When the playback_delay is not set, the receiver restores a complete file or a file before playback.

An expiration field (32 bits) represents an expiration time that is represented as the number of GPS seconds since 00:00:00 UTC, Jan. 6, 1980. After expiration, content is deleted from a memory. When the expiration time is not set, the receiver uses a selection method of managing a memory resource.

A content_name_length field (8 bits) represents a length of a content_name_text (by byte unit).

The content_name_text( ) field represents the title of a content item in the structure of a plurality of strings.

A content_descriptors_length field (12 bits) represents the total length (in byte) of the content_descriptor that provides further information on a content level.

The content_descriptor is a descriptor that is separately applied to each content item.

A descriptor_length (10 bits) represents the total length (in byte) of a descriptor.

The descriptor is generally applied to all content items that are described in the NRT-IT section.

FIG. 17 shows an embodiment of a bit stream syntax structure of an NRT_content_table_section according to the present invention. The detailed description on each field of the NCT section is as follows.

In FIG. 17, a table_id field (8 bits) is an identifier of a table and an identifier for identifying an NCT may be set to the field.

A section_syntax_indicator field (1 bit) is an indicator that defines a section type of the NCT.

A private_indicator field (1 bit) represents whether the NCT follows a private section.

A section_length field (12 bits) represents a section length of an NST.

An NRT_channel_id field (16 bits) represents a value that may uniquely identify an NRT service that includes content describing in the NCT.

A version_number field (5 bits) represents a version number of the NCT.

A current_next_indicator field (1 bit) represents whether information which that NCT section includes is applicable currently or whether the information is applicable in the future.

A section_number field (8 bits) represents a section number of the current NCT section.

A last_section_number field (8 bits) represents a number of the last section of the NCT.

A protocol_version field (8 bits) represents a protocol version for allowing the NCT to carry parameters having a structure different from those defined in the current protocol. (An 8-bit unsigned integer field whose function is to allow, in the future, this NRT Content Table to carry parameters that may be structured differently than those defined in the current protocol. At present, the value for the protocol_version shall be zero. Non-zero values of the protocol_version may be used by a future version of this standard to indicate structurally different tables.)

A num_contents_in_section field (8 bits) represents the number of content pieces that are described in this NCT. In this case, the number of content pieces represents the number of content pieces (or files) that are transmitted over a virtual channel that is specified by a source_id.

Subsequently, a 'for' loop is performed as many times as the number of content pieces corresponding to the num_contents_in_section field value and provides detailed information on the corresponding content by each content piece.

A content_version field (32 bits) represents a version number of a content piece (or a file) having a specific content_id value. That is, assume that a content_id of content that a receiver previously receives and stores is 0x0010 and the same content that is content having a content_id value of 0x0010 is transmitted. In this case, if the content_version field value changes, content newly announced through the NCT is received and updates or replaces the previously stored content. In the embodiment, the content version field value means a serial number representing a release version but may directly represent an actually published (released) time. In this case, when it is difficult to represent a publish time by using the content_version, it is possible to use a new field that may represent the published (released) time.

A content_id field (16 bits) represents an identifier that may uniquely identify the content (or file).

A content_available_start_time field (32 bits) and a content_available_end_time field (32 bits) represent the start time and end time of a FLUTE session in which the contents is transmitted.

An ETM_location field (2 bits) describes the existence and location of an extended text message (ETM).

When the content (or file) is an A/V file, a content_length_in_seconds field (30 bits) represents the actual playback time of the corresponding content in second.

A content_size field (48 bits) represents a size of the content (or file) in byte.

A content_delivery_bit_rate field (32 bits) represents a bit rate at which the content (or file) is delivered, and means a target bit rate. That is, it represents how much bandwidth should be allocated when a service provider a broadcasting station delivers the corresponding content. Thus, when a receiver uses the content_size and the content_delivery_bit_rate, it is possible to recognize a minimum time consumed to receive the corresponding content (or file). That is, it is possible to estimate a time consumed to receive content and provide the corresponding information to a user. In addition, the minimum time consumed to receive is obtained by calculating (conent_size*8)/(content_delivery_bit rate) and its unit is seconds.

A content_title_length field (8 bits) represents a length of the content_title_text ( ) in byte. If this field is used, a receiver may accurately recognize how may byte data needs to be read so as to obtain content_title_text ( ) information.

A content_title_text( ) field represents a content title in the format of a multiple string structure.

That is, the receiver may obtain configuration information on NRT content/file by using the NCT and provide a guide on the NRT content/file on the basis of the obtained configuration information on the NRT content/file. In addition, it may obtain, from an NST, an access fragment of a FLUTE session in which the content/file selected from the guide is transmitted, and may receive the selected content by using the obtained access fragment of the FLUTE session.

The present invention may transmit, as a part of the NCT, a decoding parameter of a media object, media information, and container information that are essential for rendering content/files configuring an NRT service. Thus, a receiving system may extract the decoding parameter of the media object, the media information, and the container information that are essential for rendering the corresponding content by each content piece, and may use the extracted values for rendering the corresponding content.

FIG. 18 shows an embodiment of a bit stream syntax structure of an SMT section that provides signaling information on NRT service data.

Here, although the corresponding syntax is written in an MPEG-2 private section type to help readers' understanding, the format of the corresponding data has no limitation.

The SMT describes an IP access fragment and signaling information on a mobile service (or signaling information of an NRT service) in an ensemble to which the SMT is transmitted. The SMT also provides broadcast stream information on the corresponding service by using a transport_stream_ID that is an identifier of a broadcast stream to which each service belongs. In addition, the SMT according to an embodiment may include the description information on each mobile service (or NRT service) in one ensemble and a descriptor area may include other additional information.

As described above, the SMT section may be transmitted in an IP stream type in an RS frame. In this case, RS frame decoders of a receiver to be described below decode an input RS frame and output the decoded RS frame to the corresponding RS frame handler. In addition, each RS frame handler classifies the input RS frame row by row, configures an M/H TP, and outputs it to an M/H TP handler.

Examples of fields that may be transmitted through the SMT are as follows.

A table_id field (8 bits) is a field for classifying a type of a table, and by using this field, it is possible to recognize that this table section is a table section in the SMT. (table_id: An 8-bit unsigned integer number that indicates the type of table section being defined in Service Map Table (SMT)).

A section_syntax_indicator field (1 bit) is an indicator that defines a section type of the SMT, and the section type may be short-form syntax ('0') of MPEG, for example. (section_syntax_indicator: This 1-bit field shall be set to '0' to always indicate that this table is derived from the "short" form of the MPEG-2 privatesection table)

A private_indicator field (1 bit) represents whether the SMT follows a private section.

A section_length field (12 bits) represents a section length of the SMT remaining after the corresponding field. (section_length: A 12-bit field. It specifies the number of remaining bytes this table section immediately following this field. The value in this field shall not exceed 4093 (0xFFD.))

A table_id_extension field (16 bits) is table dependent and becomes the logical part of a table_id field that provides the range of remaining fields. (table_id_extension: This is a 16-bit field and is table-dependent. It shall be considered to be logically part of the table_id field providing the scope for the remaining fields).

Here, the table_id_extension field includes an SMT_protocol_version field.

The SMT_protocol_version field (8 bits) represents a protocol version for allowing the SMT to carry parameters having a structure different from those defined in the current protocol. (SMT_protocol_version: An 8-bit unsigned integer field whose function is to allow, in the future, this SMT to carry parameters that may be structured differently than those defined in the current protocol. At present, the value for the SMT_protocol_version shall be zero. Non-zero values of SMT_protocol_version may be used by a future version of this standard to indicate structurally different tables).

An ensemble_id field (8 bits) is an ID value related to the corresponding ensemble and values between '0x00' and '0x3F' may be assigned to the field. A value of this field may be derived from a parade_id of TPC data. If the corresponding ensemble is transmitted through a primary RS frame, the most significant bit (MSB) is set to '0' and the remaining 7 bits are used as a value of the parade_id of the corresponding parade. If the corresponding ensemble is transmitted through a secondary RS frame, the MSB is set to '1' and the remaining 7 bits are used as a value of the parade_id of the corresponding parade. (ensemble_id: This 8-bit unsigned integer field in the range of 0x00 to 0x3F shall be the Ensemble ID associated with this Ensemble. The value of this field shall be derived from the parade_id carried from the baseband processor of physical layer subsystem, by using the parade_id of the associated Parade for the least significant 7 bits, and using '0' for the most significant bit when the Ensemble is carried over the Primary RS frame, and using '1' for the most significant bit when the Ensemble is carried over the Secondary RS frame.).

A version_number field (5 bits) represents a version number of the SMT. A current_next_indicator field (1 bit) indicates whether the transmitted SMT table section is currently applicable. (current_next_indicator: A one-bit indicator, which when set to '1' shall indicate that the Service Map Table sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field).

A section_number field (8 bits) represents a number of the current SMT section. (section_number: This 8-bit field shall give the section number of this NRT Service Signaling table section. The section_number of the first section in an NRT Service Signaling table shall be 0x00. The section_number shall be incremented by 1 with each additional section in the NRT Service Signaling table).

A last_section_number field (8 bits) represents a number of the last section of the SMT.

(last_section_number: This 8-bit field shall give the number of the last section (i.e., the section with the highest section_number) of the Service Signaling table of which this section is a part).

A num_services field (8 bits) indicates the number of services in the SMT section. (num_services: This 8 bit field specifies the number of services in this SMT section.). By using an ensemble including the SMT, only at least one mobile service may be received, only at least one NRT service may be received, or both the mobile service and the NRT service may be received. If only NRT services are transmitted to the ensemble including the SMT, the field may indicate the number of NRT services that are included in the SMT.

Subsequently, a 'for' loop (or referred to as a service loop) is performed as many times as the number of services corresponding to the num_services field value and provides signaling information on a plurality of services. That is, by service that is included in the SMT section, signaling information on the corresponding service is represented. Here, the service may be a mobile service or an NRT service. In this case, the following field information may be provided to each service.

A service_id field (16 bits) represents a value that may uniquely identify the corresponding service. (A 16-bit unsigned integer number that shall uniquely identify this service within the scope of this SMT section.) A service_id field value of one service does not change while the service is maintained.

In this case, if a certain service ends, the service_id field value of the service may be not used until a certain time passes. The reason is to avoid confusion. (The service_id of a service shall not change throughout the life of the service. To avoid confusion, it is recommended that if a service is terminated, then the service_id for the service should not be used for another service until after a suitable interval of time has elapsed.). Here, if the service is an NRT service, the service_id will identify the NRT service.

A multi_ensemble_service field (2 bits) identifies whether the corresponding service is transmitted through one or more ensembles.

In addition, the corresponding field identifies whether the service is just represented as a part of a service transmitted through the corresponding ensemble. That is, if the service is an NRT service, the field identifies whether the NRT service is transmitted through one or more ensembles. (multi_ensemble_service: A two-bit enumerated field that shall identify whether the Service is carried across more than one Ensemble. Also, this field shall identify whether or not the Service can be rendered only with the portion of Service carried through this Ensemble.).

A service_status field (2 bits) identifies a status of the corresponding service. Here, MSB indicates whether the corresponding service is active ('1') or inactive ('0'), and LSB indicates whether the corresponding service is hidden ('1') or not ('0'). Here, if the service is an NRT service, the MST of the service status field indicates whether the corresponding NRT service is active ('1') or inactive ('0'), and LSB thereof indicates whether the corresponding NRT service is hidden ('1') or not ('0').

An SP_indicator represents a status of the service protection of the corresponding service. If the SP_indicator field value is 1, service protection is applied to at least one of components that are needed for providing the meaningful presentation of the corresponding service. (A 1-bit field that indicates, when set to 1, service protection is applied to at least one of the components needed to provide a meaningful presentation of this Service).

A short_service_name_length field (3 bits) represents, in byte, a length of a short service name that is described in a short_service_name field.

The short_service_name field represents a short name of a corresponding service. (short_service_name: The short name of the Service, each character of which shall be encoded per UTF-8 [29]. When there is an odd number of bytes in the short name, the second byte of the last of the byte pair per the pair count indicated by the short_service_name_length field shall contain 0x00). For example, when a service is a mobile service, the field represents a short name of the mobile service, and when a service is an NRT service, the field represents a short name of the NRT service.

A service_category field (6 bits) identifies a type category of a corresponding service. When a value of a corresponding field is set to indicate "informative only", the value of the corresponding field is handled as informative description on the category of the service. In addition, a receiver needs to check a component_level_descriptors ( ) field of an SMT so as to identify the actual category of a received service. It has an NTP time base component for services having a video and/or audio component.

In particular, regarding the present invention, when a value of the service category field has, for example, a value of '0x0E', it represents that a corresponding service is an NRT service. In this case, it may be recognized that signaling information on a service that is currently described in an SMT section is signaling information on an NRT service.

A num_components field (5 bits) represents the number of IP stream components in a corresponding service. (num_components: This 5-bit field specifies the number of IP stream components in this Service).

When an IP_version_flag field (1 bit) is set to '1', it indicates that a source_IP_address field, a service_destination_IP_address field, and a component_destination_IP_address field are IPv6 addresses, and when the IP_version_flag field is set to '0', it indicates that the source_IP_address field, the service_destination_IP_address field, and the component_destination_IP_address field are IPv4 addresses. (IP_version_flag: A 1-bit indicator, which when set to '0' shall indicate that source_IP_address, service_destination_IP_address, and component_destination_IP_address fields are IPv4 addresses. The value of '1' for this field is reserved for possible future indication that source_IP_address, service_destination_IP_address, and component_destination_IP_address fields are for IPv6. Use of IPv6 addressing is not currently defined).

When a source_IP_address_flag field (1 bit) is set, it indicates that a source_IP_address value for a corresponding service exists to indicate source specific multicast. (source_IP_address_flag: A 1-bit Boolean flag that shall indicate, when set, that a source_IP_address value for this Service is present to indicate a source specific multicast).

When a service_destination_IP_address_flag field (1 bit) is set, it indicates that a corresponding IP stream component is transmitted through an IP datagram having a target IP address different from a service_destination_IP_address.

Thus, when this flag is set, a receiving system uses a component_destination_IP_address as a destination_IP_address to access a corresponding IP stream component and ignores a service_destination_IP_address field in a num_channels loop. (service_destination_IP_address_flag: A 1-bit Boolean flag that indicates, when set to '1', that a service_destination_IP_address value is present, to serve as the default IP address for the components of this Service).

A source_IP_address field (32 bits or 128 bits) is needed to be interpreted when a source_IP_address_flag is set to '1', but the interpretation is not needed when the source_IP_address_flag is not set to '0'.

When a source_IP_address_flag is set to '1' and an IP_version_flag field is set to '0', this field indicates a 32-bit IPv4 address that represents a source of a corresponding virtual channel. When the IP_version_flag field is set to '1', this field indicates a 32-bit IPv6 address that represents a source of a corresponding virtual channel. (source_IP_address: This field shall be present if the source_IP_address_flag is set to '1' and shall not be present if the source_IP_address_flag is set to '0'. If present, this field shall contain the source_IP_address of all the IP datagrams carrying the components of this Service. The conditional use of the 128 bit-long address version of this field is to facilitate possible use of IPv6 in the future, although use of IPv6 is not currently defined).

If the service is an NRT service, the Source_IP_address field becomes a source_IP_address of the same server that transmits all channels in a FLUTE session.

A service_destination_IP_address field (32 bits or 128 bits) is needed to be interpreted when a service_destination_IP_address flag set to '1', but the interpretation is not needed when the service_destination_IP_address flag is set to '0'. When the service_destination_IP_address flag is set to '1' and an IP_version_flag is set to '0', this field represents a 32-bit destination IPv4 address for a corresponding virtual channel.

When the service_destination_IP_address flag is set to '1' and the IP_version_flag field is set to '1', this field represents a 64-bit destination IPv6 address for a corresponding virtual channel. If it is not possible to interpret a corresponding service_destination_IP_address, a component_destination_IP_address field in a num_components loop is needed to be interpreted and a receiving system needs to use the component_destination_IP_address so as to access an IP stream component. (service_destination_IP_address: This field shall be present if the service_destination_IP_address_flag is set to '1' and shall not be present if the service_destination_IP_address flag is set to '0'. If this service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined). When the service is an NRT service, the service_destination_IP_address field is signaled if there is a destination IP address of the session level of a FLUTE session.

An SMT according to the embodiment uses a 'for' loop to provide information on a plurality of components.

Subsequently, the 'for' loop (or referred to as component loop) is performed as many times as the number of components corresponding to the num_components field value so as to provide access fragments of a plurality of components. That is, an access fragment on each component that is included in a corresponding service is provided. In this case, the following field information may be provided on each component. Here, according to an embodiment, one component corresponds to one FLUTE session.

When an essential_component_indicator field (1 bit) is set to '1', it indicates that a corresponding component is an essential component for a mobile service. Otherwise, a corresponding component indicates an optional component. (essential_component_indicator: A one-bit indicator which, when set to '1' shall indicate that this component is an essential component for the service. Otherwise, this field indicates that this component is an optional component).

When a component_destination_IP_address_flag field (1 bit) is set to '1', it indicates that a component_destination_IP_address field exists for a corresponding component. (component_destination_IP_address flag: A 1-bit Boolean flag that shall indicate, when set to '1' that the component_destination_IP_address is present for this component).

A port_num_count field (6 bits) indicates a number of an UDP port related to a corresponding UDP/IP stream component. A destination UDP port number value increases by 1 starting from a destination_UDP_port_num field value. For an RTP stream, a destination UDP port number increases by 2 starting from the destination_UDP_port_num field value, and it is performed so as to include an RTCP stream related to the RTP stream. (port_num_count: This field shall indicate the number of destination UDP ports associated with this UDP/IP stream component. The values of the destination UDP port numbers shall start from the component_destination_UDP_port_num field and shall be incremented by one, except in the case of RTP streams, when the destination UDP port numbers shall start from the component_estination_UPD_port_num field and shall be incremented by two, to allow for the RTCP streams associated with the RTP streams).

A destination_UDP_port_num field (16 bits) represents a destination UDP port number for a corresponding IP stream component. For the RTP stream, a value of a destination_UDP_port_num is even, the next largest value represents a destination UDP port number of a related RTCP stream. (component_destination_UDP_port_num: A 16-bit unsigned integer field, that represents the destination UDP port number for this UDP/IP stream component. For RTP streams, the value of component_destination_UDP_port_num shall be even, and the next higher value shall represent the destination UDP port number of the associated RTCP stream).

When an IP_version_flag field is set to '0', a component_destination_IP_address field (32 bits or 128 bits) indicates a 32-bit destination IPv4 address for a corresponding IP stream component. In addition, when the IP_version_flag field is set to '1', the component_destination_IP_address field indicates a 128-bit destination IPv6 address for a corresponding IP stream component. (component_destination_IP_address: This field shall be present if the component_destination_IP_address flag is set to '1' and shall not be present if the component_destination_IP_address flag is set to '0'. When this field is present, the destination address of the IP datagrams carrying this component of the M/H Service shall match the address in this field. When this field is not present, the destination address of the IP datagrams carrying this component shall match the address in the M/H_service_destination_IP_address field. The conditional use of the 128 bit-long address version of this field is to facilitate possible use of IPv6 in the future, although use of IPv6 is not currently defined).

A num_component_level_descriptors field (4 bits) represents the number of descriptors that provide further information on a component level.

A number of component level_descriptor ( ) corresponding to the num_component_level_descriptors field value is included in the component loop so as to provide additional information on the component.

A num_service_level_descriptors field (4 bits) represents the number of descriptors that provide further information on a corresponding service level.

A number of service level_descriptor ( ) corresponding to the num_service_level_descriptors field value is included in the service loop so as to provide additional information on the service. If the service is a mobile service, additional information on the mobile service is provided, and if the service is an NRT service, additional information on the NRT service is provided.

A num_ensemble_level_descriptors field (4 bits) is the number of descriptors that provide further information on ensemble information.

A number of ensemble_level_descriptor ( ) corresponding to the num_ensemble_level_descriptors field value is included in the ensemble loop so as to provide additional information on the ensemble.

A component_descriptor ( ) may be provided as a component_level_descriptors( ) also in the SMT in FIG. 18.

The component_descriptor( ) is used as one of component_level_descriptors( ) and describes additional signaling information on a corresponding component.

Thus, a mobile NRT service may also provide signaling information necessary for receiving a corresponding FLUTE session, by using the component descriptor in FIG. 14.

For example, when a component_type field value of the component descriptor of FIG. 14 is 38, a component data (component_type) field provides FLUTE file delivery data as shown in FIG. 15. Since descriptions on each field in FIGS. 14 and 15 have been previously made, the descriptions are not repeated.

FIG. 19 shows an FDT schema for mapping a file according to an embodiment to a content_id, FIG. 20 shows an FDT schema for mapping a file according to another embodiment to a content_id, and FIGS. 19 and 20 represent how to designate an FDT instant level entry file. Although there is a plurality of files related to NRT content, it is difficult to find an NRT related file because there is no mark on each file. Thus, FIGS. 19 and 20 show that a content_id is inserted into an FDT in each file.

An FDT instance level means a level including a definition part, when there is a need for defining a common attribute to all files that are declared in an FDT. An FDT file level may be used as meaning a level that includes definition on an attribute unique to each file.

A receiver identifies whether a service transmitted through a corresponding channel is an SMT-based NRT service. In addition, the receiver identifies a file and content item in a corresponding NRT service.

As mentioned above, the receiver may identify the file and content item in the NRT service but may not match a file of a content item because there is no information on the file of the content item. Thus, the receiver may not process the received NRT service.

Thus, the present invention may provide a method of identifying a content item relation. In other words, this method will show what file exists in the content item. In this case, the receiver may properly process the received NRT service. Thus, this method may transmit and designate an NRT service on the basis of FDT information in a FLUTE session.

For example, each file building a content item is identified on the basis of a TOI field and a content-location designated in the FLUTE session. A content_id in an FDT is matched with a content identifier (content_id) in an NCT or a content identifier of content fragment in OMB BCAST SG.

Referring to FIGS. 19 and 20, a content identifier of an FDT-instance level is declared in the part represented by and the declared content identifier is provided to all files that are declared in a corresponding FDT-instance. Of course, it is also possible to override this information by newly providing a content identifier of a file level. Alternatively, when a specific file also belongs to a content item other than the content item defined in the FDT-instance level, this matter may be recognized by providing a file level content_id to be described below. The embodiment represents the content_id by using 16 bits.

A content_id of a file level is declared in the part represented by 2, and when a file included in an FDT instance belongs to a different content item, to which content item each file belongs and to which entry all files of content belong are signaled by using this method.

3 is a method of representing whether each file is an entry file. That is, the entry file is a file that corresponds to a root file that needs to be first played among several files or to be first executed so as to access a content item. 3 represents a method of providing such information. An entry attribute may be omitted and the default value is false. Thus, if the entry attribute is omitted, it means that a corresponding file is not an entry file. The "entry" indicates a head of a file to be processed to execute a file. For example, "index.html" may be an "entry". Thus, the entry file may be set to "true" and other files may be set to "false". By using the entry file, the duplicate transmission of the same file may be effectively controlled. Once a file is downloaded, an entry file do not need to be downloaded for another instance or a separate instance because it indicates a file of content for other references.

A group related to a file level signals whether a file is an entry and thus, a specific file signals may function as an entry in a specific group but not so in other groups. Examples of representing whether a file is an entry file when a content identifier of an FDT-instance level is provided may include the following two methods.

1) Method of further providing a file level content identifier to a file corresponding to an entry file and then setting an entry attribute to true: this case has a limitation in that a content identifier is duplicate in an FDT-instance level and a file level but may have the most flexible structure. In other words, one of the file level and the FDT-instance level may designate a content_id but when another content_id is designated in both the file level and the FDT-instance level, the content_id of the file level has a priority.

2) As another embodiment of an FDT schema as shown in FIG. 20, a method of directly referencing files that function as an entry file in content identifier definition of an FDT-instance level may be considered. To that end, the embodiment according to FIG. 2 separately defines an FDT-Content-ID-Type for an FDT-instance level content identifier and expands it to be able to include a content_location of an entry file as represented by 2. In the case of 2, an entry level is defined as its content_id. For example, each content_id shows which entry file exists.

This method may have a limitation in that a content-location is repeatedly signaled but may have an advantage in that entry file configuration information may be directly obtained by each content item.

Figure 21:
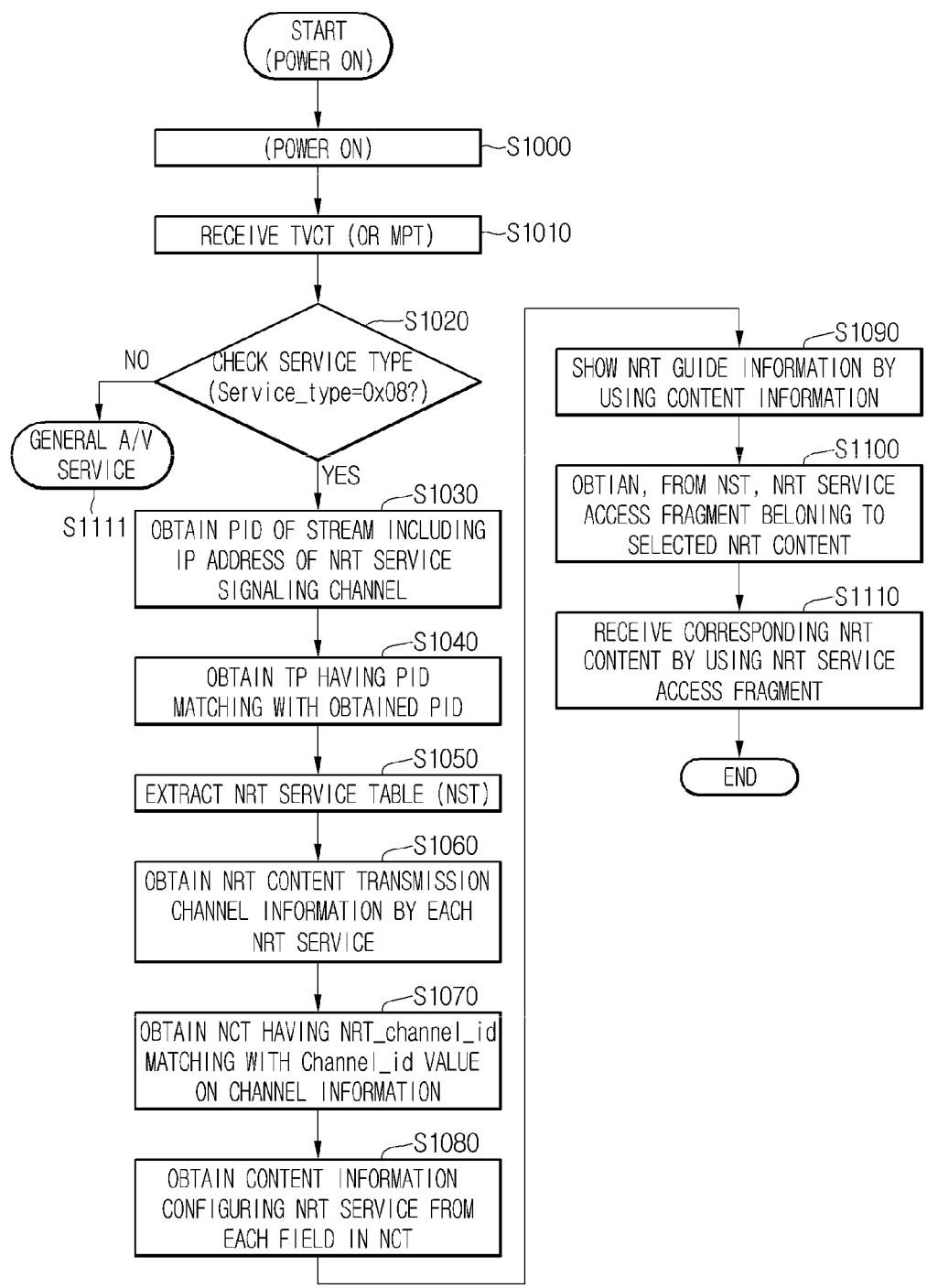
FIG. 21 is a flow chart of a method of operating a receiver according to an embodiment.

FIG. 21 is a flow chart of a method of operating a receiver according to an embodiment.

Referring to FIG. 21, in the embodiment, a receiver may receive NRT service signaling data over an NRT service signaling channel, display NRT guide information by using the received NRT service signaling data, receive NRT service data on selected NRT content and provide an NRT service.

Firstly, if the receiver is powered on, a channel is selected by a user in step S1000. In addition, a physical transmission channel is tuned according to the selected channel.

Subsequently, a VCT and a PMT are obtained from a broadcast signal that is received over the tuned physical transmission channel, in step S1010. In addition, the obtained TVCT (VCT) is parsed and it is checked whether there is an NRT service, in step S1020. This may be recognized by checking a service_type field value in the virtual channel loop in the VCT. For example, when a value of the service_type field is 0x08, it may be checked whether there is an NRT service. In addition, when the value of the field is not 0x08, it is possible to perform a proper operation such as providing a general A/V service according to information included in the virtual channel because the corresponding virtual channel does not transmit the NRT service, in step S1111.

If it is determined that there is an NRT service, a PID (PID=PID_NST) that is matched with a specific PID (PID_NST) of a stream including a well known IP address for NRT service signaling channel access is obtained because the corresponding virtual channel transmits the NRT service, in step S1030.

In addition, by using the obtained PID value (PID_NST), the receiver receives a transport packet (TP) having the PID value in step S1040.

Subsequently, the receiver extracts NRT service signaling data including an NST from the received TP or an IP address for the above-described NRT service signaling channel access from the received TP and receives NRT service signaling data transmitted in another format through an IP layer, in step S1050.

In addition, the receiver obtains channel information for transmitting NRT service data by each NRT service from the NST, in step S1060.

Subsequently, the receiver obtains an NCT having a value of an NRT_channel_id field that matches with a channel_id value that is an identifier of the obtained channel information, from the NRT service signaling data, in step S1070.

In addition, the receiver obtains content information on NRT content that configures each NRT service from each field in the obtained NCT, in step S1080. Content information may include, for example, at least one of content_delevery_bit_rate, content_available_start_time, content_available_end_time and content_title_text ( ) fields, according to an above-described embodiment of an NCT.

In addition, the receiver displays NRT guide information by using content information in step S1090. A user may select, from the displayed NRT guide information, NRT content which he/she desires to use or receive.

Subsequently, the receiver obtains, from an NST, an NRT service access fragment to which the selected NRT content belongs, in step S1100. The NRT service access fragment may include, for example, channel information or IP address information for receiving NRT service data.

In addition, the receiver accesses a channel or a server for transmitting an NRT service by using the obtained NRT service access fragment and receives corresponding NRT content in step S11110, and may perform a proper operation according to the received NRT content.

Figure 22:
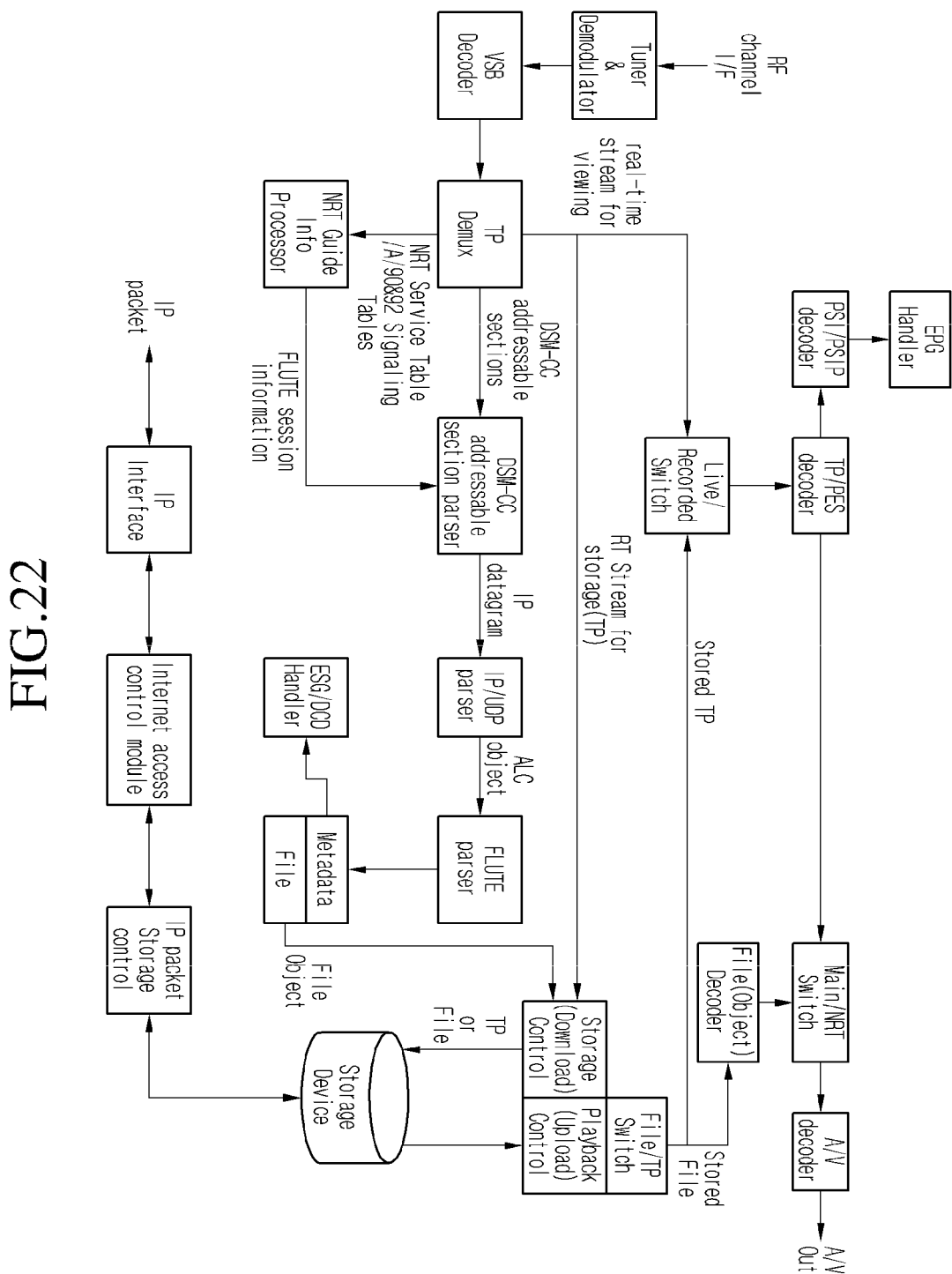
FIGS. 22 and 23 are embodiments of a receiving system capable of receiving, storing and playing NRT content for an NRT service.
Figure 23:
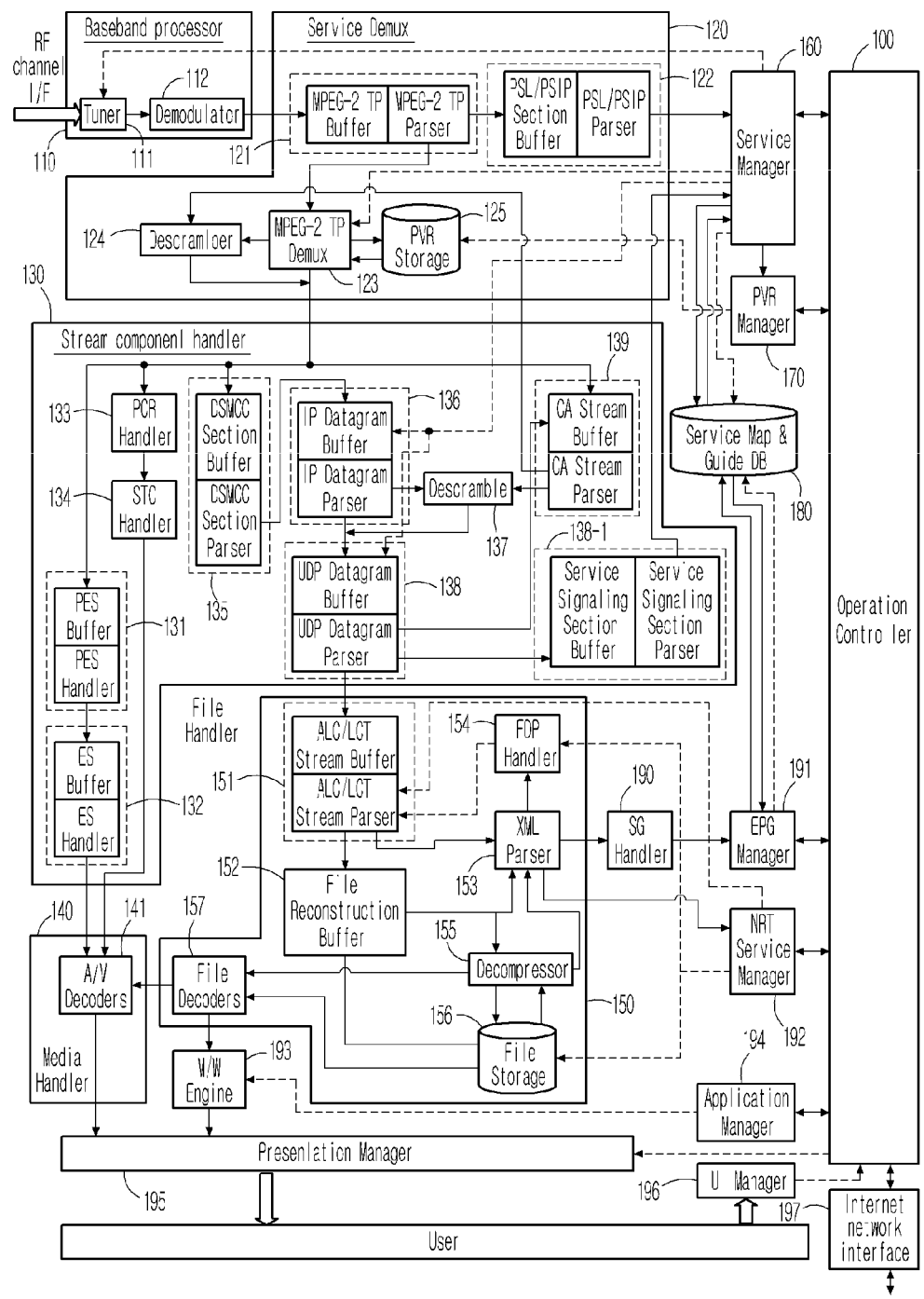

FIGS. 22 and 23 are embodiments of a receiving system capable of receiving, storing and playing NRT content for an NRT service.

A receiver in FIG. 23 may include an operation controller 100, a baseband processor 110, a service demultiplxer 120, a stream component handler 130, a media handler 140, a file handler 150, a service manager 160, a personal video recorder (PVR) manager 170, a first storage 180, an SG handler 190, an EGP manager 191, an NRT service manager 192, an application manager 194, a middleware engine 193, a presentation manager 195, and a user interface (UI) manager 196.

The baseband processor 110 may include a tuner 111 and a demodulator 112. The service demultiplexer 120 may include an MPEG-2 transport stream packet (TP) handler 121, a PSI/PSIP handler 122, an MPEG-2 TP demultiplexer 123, a descrambler 124, and a second storage 125.

The stream component handler 130 may include a packetized elementary stream (PES) decoder 131, an elementary stream decoder (ES) decoder 132, a PCR handler 133, an STC handler 134, a DSM-CC addressable section handler 135, an IP datagram handler 136, a descrambler 137, an UDP handler 138, a service signaling section handler 138-1, and a conditional access system (CAS) 139.

The media handler 140 may include an A/V decoder 141. The file handler 150 may include an ALC/LCT stream handler 151, a file reconstruction buffer 152, an XML parser 153, an FDT handler 154, a decompressor 155, a third storage 156, and a file decoder 157.

In FIG. 23 having such a configuration, the tuner 111 tunes a broadcast signal of a desired channel among broadcast signals received through a terrestrial wave by the control of the service manager 160, down-converts the tuned signal into an intermediate frequency (IF) signal, and outputs the down-converted signal to the demodulator 112. The tuner 111 may receive a real time stream and a non-real time stream. In the present invention, the non-real time stream is referred to as the NRT stream.

The demodulator 112 performs automatic gain control, carrier recovery, and timing recovery on a passband digital IF signal input from the tuner 111 to convert the signal into a baseband signal, and performs channel equalization on the converted signal. For example, when the broadcast signal is a VSB modulation signal, the automatic gain control, the carrier recovery, and the timing recovery are performed through a VSB demodulation process.

Data demodulated and channel equalized in the demodulator 112 is output in an MPEG-2 transport_stream (TS) packet type to the MEGP-2 TP handler 121.

The MEGP-2 transport stream packet (TP) handler 121 includes an MPEG-2 TP buffer and an MPEG-2 TP parser, temporarily stores an output from the demodulator 112, and then analyzes a TS header. Subsequently, the MEGP-2 transport stream packet (TP) handler 121 outputs the TS header to the demultiplexer 123 when the output from the demodulator 112 is a real time A/V TS packet or an NRT TS packet, and outputs the TS header to the PSI/PSIP handler 122 when the output is a TS packet for a PSI/PSIP table.

The PSI/PSIP handler 122 includes a PSI/PSIP section buffer and a PSI/PSIP parser and temporarily stores a TS packet output from the MPEG-2 TP handler 121. Subsequently, the PSI/PSIP handler 122 recovers and parses a corresponding table from PSI/PSIP section data included in a payload of the TS packet with reference to a table identifier. In this case, whether one table includes one section or a plurality of sections may be recognized through a table_id field, a section_number field, and a last_section_number filed in a corresponding section. In addition, it is possible to complete a corresponding table by gathering sections having the same table identifier. For example, it is possible to complete a VCT by gathering sections having a table identifier assigned to the VCT. In addition, information on each table parsed is collected by the service manager 160 and stored in the first storage 180. Information on tables such as VCT, PAT, PMT, DST, etc. according to the present invention is stored through such processes in the first storage 180. The service manager 160 stores the table information in service map and guide data types in the first storage 180.

If the input TS packet is a real time A/V TS packet, the demultiplexer 123 divides an input TS packet into an audio TS packet and a video TS packet and outputs the packet to the PES decoder 131, and if the input TS packet is an NRT TS packet, the demultiplexer 123 outputs the packet to the DSM-CC handler 135. In addition, if the TS packet includes a program clock reference (PCR), the demultiplexer 123 outputs the packet to the PCR handler 133, and if the TS packet includes conditional access (CA) fragment, the demultiplexer 123 the packet to the CAS (139). The NRT TS packet is divided into a TS packet include NRT service data and a TS packet including an NRT service signaling channel. A unique PID is assigned to the TS packet of the NRT service data so as to identify the NRT service, and the PID of the TS packet including the NRT service signaling channel is extracted by using a DST and a PMT.

If a payload of an input TS packet is scrambled, the demultiplxer 123 outputs the input TS packet to the descrambler 124, and the descrambler 124 receives information required for descrambling (for example, a control word used for scrambling) and performs descrambling on the TS packet.

The demultiplxer 123 stores in the second storage 125 a real time A/V packet that is input in response to a request for any one of temporary recording, reserved recording, and time shifting. The second storage 125 is a massive storage medium and may be, for example, an HDD. Downloading (namely, storing) and uploading (namely, playing) from/to the second storage 125 are performed by the control of the PVR manager 170.

The demultiplexer 123 divides an A/V TS packet uploaded from the second storage 125 into an audio TS packet and a vide TS packet in response to a playback request and outputs them to the PES decoder 131.

The demultiplxer 123 is controlled by the service manager 160 and/or the PVR manager 170 for the above-described processing.

That is, if a service_type field value indicates that an NRT service is transmitted, the service manager 160 extracts and stores the identification information on each NRT service from an NRT service descriptor (NRT_service_descriptor( )) that is received as a part of a virtual channel loop of the VCT, extracts a PID of a DST from a service location descriptor of the VCT (or an ES loop of a PMT) and receives a DST.

In addition, an NRT service is identified from the received DST, a PID of an MPEG-2 TS packet including the NRT service signaling channel is extracted by using a DST ad a MPT so as to receive the identified NRT service. The extracted PID is output to the demultiplexer 123. The demultiplexer 123 outputs, to the addressable section handler 135, MPEG-2 TS packets corresponding to a PID that are output from the service manager 160.

The PCR is a time reference value that is used for the time synchronization of audio ES and video ES in the A/V decoder 141. The PCR handler 133 recovers a PCR included in a payload of an input TS packet and outputs the recovered PCR to the STC handler 134. The STC handler 134 recovers a system time clock (STC) acting as a reference clock of a system from the PCT and outputs the recovered clock to the A/V decoder 141.

The PES decoder 131 includes a PES buffer and a PES handler, temporarily stores an audio TS packet and a video TS packet and then removes a TS header from each TS packet, and recovers an audio PES and a video PES. The recovered audio PES and the recovered video PES are output to the ES decoder 132. The ES decoder 132 includes an ES buffer and an ES handler, removes each PES header from the audio PES and the video PES and recovers an audio ES and a vide ES that are pure data. The recovered audio ES and the recovered video ES are output to the A/V decoder 141.

The A/V decoder 141 decodes the audio ES and the video ES with each decoding algorithm, recovers them to have a state before compression and then outputs them to the presentation manager 195. In this case, time synchronization is achieved when decoding the audio ES and the video ES according to the STC. As an example, an audio decoding algorithm may include at least one of AC-3 decoding, MPEG 2 audio decoding, MPEG 4 audio decoding, AAC decoding, AAC+ decoding, HE AAC decoding, AAC SBR decoding, MPEG surround decoding, and BSAC decoding algorithms, and a video decoding algorithm may include at least one of MPEG 2 video decoding, MPEG 4 video decoding, H.264 decoding, SVC decoding, and VC-1 decoding algorithms.

The CAS 139 includes a CA stream buffer and a CA stream handler, temporarily stores a TS packet output from the MPEG-2 TP handler 121 or service protection data recovered and output from the UDP datagram handler 138 and then recovers information required for descrambling (for example, a control word used for scrambling) from the stored TS packet or the stored service protection data. That is, an entitlement management message (EMM) and an entitlement control message (ECM) that are included in a payload of the TS packet are extracted, and the extracted EMM and ECM are analyzed to obtain information required for descrambling. The ECM may include a control word (CW) used for scrambling. In this case, the control word may be encrypted with an authentication key. The EMM may include entitlement information and an authentication key on corresponding data. Information required for descrambling that is obtained by the CAS 139 is output to the descramblers 124 and 137.

The DSM-CC section handler 135 includes a DSM-CC section buffer and a DSM-CC section parser, temporarily stores a TS packet output from the demultiplxer 123 and then recovers an addressable section included in a pay load of the TS packet. In addition, the DSM-CC section handler 135 recovers an IP datagram by removing CRC checksum and a header of the addressable section and outputs the IP datagram to the handler 136.

The IP datagram handler 136 includes an IP datagram buffer and an IP datagram parser. The IP datagram handler 136 buffers the IP datagram transmitted from the DSM-CC section handler 135, then extracts and analyzes a header of the buffered IP datagram, recovers an UDP datagram from a payload of the IP datagram and then outputs the UDP datagram to the handler 138.

In this case, if the IP datagram is scrambled, the scrambled UPD datagram is descrambled in the descrambler 137 and then output to the UDP datagram handler 138. As an example, the descrambler 137 receives information required for descrambling (for example, a control word used for scrambling) from the CAS 139, performs descrambling on the UDP datagram and then outputs it to the UDP datagram handler 138.

The UDP datagram handler 138 includes an UDP datagram buffer and an UDP datagram parser. The UDP datagram handler 138 buffers an UDP datagram output from the IP datagram handler 136 or the descrambler 137, then extracts and analyzes a header of the buffered UDP datagram, and recovers data included in a payload of the UDP datagram. In this case, if the recovered data is service protection data, it is output to the CAS (139), if the recovered data is NRT service signaling data, it is output to the service signaling section handler 138-1, and if the recovered data is NRT service data, it is output to the ALC/LCT stream handler 151.

That is, an access fragment of an IP datagram that transmits the NRT service signaling channel includes a well-known destination IP address and a well-known destination UDP port number, for example.

Thus, the IP datagram handler 136 and the UDP datagram handler 138 have a well-known destination IP multicast address and a well-known destination UDP port number, extract an IP multicast stream transmitting an NRT service signaling channel, namely, NRT service signaling data and outputs it to the service signaling section handler 138-1.

In addition, the service signaling section handler 138-1 includes a service signaling section buffer and a service signaling section parser, recovers and parses an NST from the NRT service signaling data, and outputs the NST to the service manager 160. After the NST is parsed, it is possible to extract an access fragment of a FLUTE session, in which content/files configuring an NRT service is transmitted, and signaling information required for rendering the NRT service. For example, it is possible to extract information essential for rendering the content/files of an NRT service that is transmitted from the NST to each FLUTE session. The information essential for rendering the content/files of an NRT service may be container information, encoding information, or a decoding parameter of a media object.

Information parsed from the NST is collected by the service manager 160 and stored in the first storage. The service manager 160 stores information extracted from the NST in the first storage 180 in a service map and guide data type. As another example, the NRT service manager 192 may function as the service manager 160. That is, information parsed from the NST may be collected by the NRT service manager 192 and stored in the first storage 180.

The ALC/LCT stream handler 151 includes an ALC/LCT stream buffer and an ALC/LCT stream parser. The ALC/LCT stream handler 151 buffers ALC/LCT structure data that is output from the UDP datagram handler 138, and then analyzes a header and a header extension of an ALC/LCT session from the buffered data. As a result of analyzing the header and the header extension of the ALC/LCT session, if data transmitted to the ALC/LCT session has an XML structure, it is output to the XML parser 153, and if the data has a file structure, it is temporarily stored in a file reconstruction buffer 152 and then output to the file decoder 157 or stored in the third storage 156. When the data transmitted to the ALC/LCT session is data for an NRT service, the ALC/LCT stream handler 151 is controlled by the NRT service manager 192. In this case, when the data transmitted to the ALC/LCT session is compressed, it is decompressed by the decompressor 155 and then output to at least one of the XML parser 153, the file decoder 157, and the third storage 156.

The XML parser 153 analyzes XML data that is transmitted through the ALC/LCT, outputs the analyzed data to the FDT handler 154 if it is data for a file based service, and outputs the analyzed data to the SG handler 190 if it is data for a service guide.

The FDT handler 154 analyzes and processes a file description table of a FLUTE protocol through the ALC/LCT session. The FDT handler 154 is controlled by the NRT service manager 192 if the received file is a file for an NRT service.

The SG handler 190 collects and analyzes data for a service guide transmitted in an XML structure, and outputs it to the EPG manager 191.

The file decoder 157 decodes a file output from the file reconstruction buffer 152, a file output from the decompressor 155, or a file uploaded from the third storage 156 with a preset algorithm and outputs it to the middleware engine 193 or the A/V decoder 141.

The middleware engine 193 interprets and executes file structure data, namely, an application. In addition, the application may also be output to an output device such as a screen or a speaker through the presentation manager 195. As an example, the middleware engine 193 is a JAVA based middleware engine.

The EPG manager 191 receives service guide data from the SG handler 190 according to a user input, converts it into a display format and then outputs the converted data to the presentation manager 195. The application manager 194 performs overall management on processing application data that is received in a file type.

The service manager 160 collects and analyzes PSI/PSIP table data or NRT service signaling data that is transmitted to an NRT service signaling channel, creates a service map, and then stores it in the first storage 125. In addition, the service manager 160 controls an access fragment of an NRT service which a user desires, and controls the tuner 111, the demodulator 112, and the IP datagram handler 136.

The operation controller 100 controls at least one of the service manager 160, the PVR manager 170, the EPG manager 191, the NRT service manager 192, the application manager 194, and the presentation manager 195 according to a user instruction that is input through the UI manager 196, and allows a function according to the user instruction to be performed.

The NRT service manager 192 performs overall management on an NRT service that is transmitted in a content/file type through a FLUTE session on an IP layer.

The UP manager 196 delivers a user input to the operation controller 100 through a UI.

The presentation manager 195 provides at least one of audio and video data outputs from the A/V decoder 141, a file data output from the middleware engine 193, and a service guide data output from the EPG manager 191 to a user through at least one of a speaker and a screen.

Any one of the service signaling section handler 138-1, the service manager 160, and the NRT service manager 192 obtains, from a FLUTE session loop of an NST (or a component loop of an NST), an IP access fragment of a FLUTE session that transmits content or a file configuring the NRT service. In addition, it obtains an access fragment of a FLUTE level from A NRT_FLUTE_File_delivery_descriptor ( ) that is received as a part of a FLUTE session loop of the NST. In addition, it obtains an access fragment of a FLUTE level from a component_descriptor ( ) that is receives as a part of a component loop of an NST.

Then, the ALC/LCT stream handler 151 and the file decoder 157 access a FLUTE file delivery session by using the obtained access fragment of a FLUTE level and gathers files belonging to the session. The gathered files configure one NRT service. Such an NRT service is stored in the third storage 156 or output to the middleware engine 193 or the A/V decoder to be displayed on a display device.

The third storage 156 is a storage medium storing a file such as NRT service data and may be shared with or separately used from the second storage 125.

Figure 24:
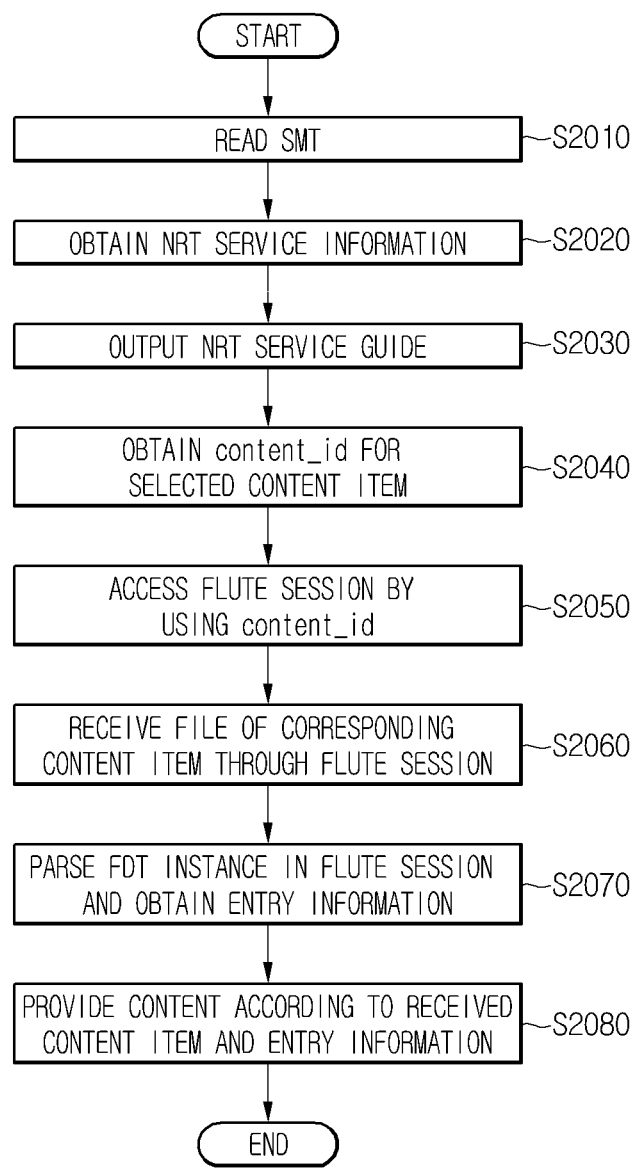
FIG. 24 is a flow chart of a method of receiving and providing an NRT service by a receiver according to an embodiment.

FIG. 24 is a flow chart of a method of receiving and providing an NRT service by a receiver according to an embodiment The receiver may obtain NRT service signaling information through an NRT service signaling channel or by receiving an IP datagram in the case of a mobile NRT service, and reads an SMT from the NRT service signaling information, in step S2010.

In addition, the receiver obtains NRT service information from the SMT in step S2020. The NRT service information may be obtained by parsing an NRT_service_info_descriptor in a service level descriptor loop. The obtained NRT service information may include an application type for each NRT service or requirement information on other NRT services.

Subsequently, the receiver outputs an NRT service guide on the basis of the obtained NRT service information in step S2030. Service category information and an application for each service may be represented in the NRT service guide. In addition, detailed information may further be represented on the basis of each field in an NRT service info descriptor. The detailed information may include, for example, capacity information on a corresponding NRT service according to a storage_requirement field or audio or video codec information on a corresponding NRT service according to an audio_codec_type or video_codec type field. A user may select an NRT service which a user desires to receive or use, on the basis of information represented in the service guide.

In addition, the receiver obtains, from an NCT, an identifier for a content item (content_id) configuring the selected NRT service in step S2040. The receiver may obtain an NRT_service_id corresponding to the selected NRT service from an SMT, obtain an NCT that has an NRT_channel_id value matching with a value of the obtained NRT_service_id, and obtain an identifier for a content item (content_id) configuring a corresponding NRT service through the obtained NCT.

Subsequently, the receiver accesses a FLUTE session so as to receive a file configuring a corresponding content item by using an obtained content item identifier (content_id) in step S2050. Since each file configuring a content item is matched with a content-location field or TOI specified in an FDT in a FLUTE session, the receiver subsequently receives a corresponding content item file by using such a FLUTE session in step S2060. The reception of a file may be performed by receiving a corresponding file or object if a content-ID attribute field for a corresponding file matches with the obtained content_id after an FDT is read from a corresponding FLUTE session.

Moreover, the receiver may obtain a list of files corresponding to a content item by parsing FDT instances in a corresponding FLUTE session. In addition, the receiver obtains entry information including a list of files functioning as an entry among a list of files in step S2070.

Lastly, the receiver provides to a user an NRT service on the basis of the received content item and entry information or a list of files corresponding to a content item in step S2080.

Content downloaded through an NRT service in this way may be used at a time when a user desires, independently of real-time broadcast.

Moreover, a broadcasting station may be set so that a content item of a corresponding NRT service is played when specific real-time broadcast is transmitted or at a time represented by a receiver after an NRT service is previously transmitted and a receiver receives and stores the service. As such, an NRT service may include, as an example, content that may be played at a specific time after it is previously downloaded in association with real-time broadcast. Moreover, the NRT service may include, as an example, content for preparing so as to execute a specific NRT service at a specific time. NRT service content triggered at a specific time associated with real-time broadcast so that a specific action is executed on a specific NRT service in this way may be referred to as a triggered declarative object (TDO). Thus, an NRT service application may be divided into a non-real time declarative object (NDO) or a TDO according to whether to be executed at a specific time.

According to an embodiment, a broadcasting station may transmit trigger information for triggering such a TDO. The trigger information may include information that a receiver requires for performing a specific action on a specific TDO at a specific time.

Moreover, the trigger information may include trigger signaling data (trigger signaling information) for signaling a trigger and triggering data configuring a trigger. Moreover, a data stream that transmits triggering data may be referred to as a trigger stream. In addition, the triggering data may mean a trigger itself in the present invention.

Such a trigger may include at least one of a trigger identifier for identifying a trigger, a TDO identifier for identifying an NRT service for triggering, action information to be performed on a TDO, and a trigger time.

The trigger identifier may be an identifier for uniquely identifying a trigger. For example, a broadcasting station may transmit broadcast program information along with one or more triggers during a certain time that is provided through an EIT. In this case, a receiver may perform an action on a TDO, a trigger target at a time designated by each trigger on the basis of one or more triggers. In this case, the receiver may distinguish each trigger by using a trigger identifier.

A TDO identifier may be an identifier for identifying NRT service content that is a trigger target. Thus, the TDO identifier may include at least one of a trigger NRT service identifier (NRT_service_id), a content_linkage (content_linkage), a URI or URL of an NRT content item entry. In addition, it may include a target identifier for identifying a trigger target TDO (target_service_id) as will be described.

Moreover, TDO action information may include information on an action which is performed on the trigger target TDO. The action information may include at least one of execution, termination, extension instructions on TDO. Moreover, the action information may include an instruction for executing a specific function or an event in a target TDO. For example, when the action information includes an execution instruction on the target TDO, a trigger may request a receiver to activate the target TDO. In addition, when the action information includes an extension instruction on the target TDO, the trigger may instruct the receiver to extend the target TDO. In addition, when the action information includes a termination command on the target TDO, the trigger may instruct the receiver to terminate the target TDO. A broadcasting station may control a TDO operation of a receiver according to real-time broadcast content through a trigger in this way.

A trigger time may mean a time designated to perform (trigger) an action designated on a target TDO. Moreover, the trigger time may be synchronized with a video stream in a specific virtual channel so as to associate an NRT service with real-time broadcast. Thus, a broadcasting station may designate a trigger time with reference to a PCR to which a video stream refers. Moreover, a receiver may trigger a TDO at a time designated by a broadcasting station with reference to a PCR to which a video stream refers. In addition, the broadcasting station may signal a trigger after adding a trigger identifier to a header of a video stream so as to transmit an accurate trigger time.

Moreover, the trigger time may be designated as an UTC time. The UTC time has an advantage in that a trigger may be performed with reference to an absolute time, not a relative time.

Such a trigger time may be accurate trigger timing and may include an approximate start time. In addition, a receiver may receive an approximate time and prepare an action on a target TDO before accurate trigger timing. For example, the receiver may naturally operate a TDO at a trigger time by preparing for executing a TDO FIG. 25 shows bit stream syntax of a trigger according to an embodiment.

Here, a trigger or triggering data is configured in a trigger table and corresponding syntax is written in an MPEG-2 private section type to help readers' understanding, but a corresponding data format has no limitation. For example, other methods such as representing as a session description protocol (SDP) type and signaling by using session announcement protocol (SAP) may also be used.

A table_id field is arbitrarily set to 0XTBD and identifies that a corresponding table section is a table section configuring a trigger.

When a section_syntax_indicator field is set to 1, it represents that the section follows general section syntax.

A private_indicator field is set to 1.

A section_length field specifies the number of bytes remaining from directly after a section_length field to the last of the section.

A source_id field represents a source of a program associated with a virtual channel.

A TTT_version_number field may represent version information. Moreover, information on a version of a trigger may represent a version of a trigger protocol. The trigger version information may be used so as to determine whether there is a change in trigger structure or trigger itself. For example, when the trigger version information is equal, a receiver may determine that a trigger has no change. Moreover, when there is a change in trigger version information, the receiver may determine that the trigger has a change. For example, the trigger version information may include a plurality of version numbers and the receiver may determine on the basis of a part of the plurality of version numbers whether there is a change in trigger.

When a current_next_indicator field is set to 1, it represents that a corresponding table section is applicable.

A section_number field indicates a number of a corresponding table section.

A last_section_number means a table section of the last and highest number among sections.

A num_triggers_in_section field means the number of triggers that are included in a corresponding table section. The number of triggers that are included in one section may be one or more. Moreover, the number of triggers that are included in one section may be one or more. Moreover, the following 'for' loop may be repeated as many times as the number of triggers.

A trigger_id field represents an identifier that may uniquely identify a trigger.

A trigger_time field represents a time when a trigger is performed. This field may not be included in a section and in this case, the trigger time may be a time designated from a broadcast stream as described above.

A trigger_action field represents action information on a trigger to be performed at the trigger time. A trigger action may include any one of instructions on preparing, executing, extending and terminating a target TDO as described above, and may include in the target TDO an instruction that causes a specific function or event.

A trigger_description_length field represents a length of a trigger_description_text.

A trigger_description_text field represents a description of a text type on a corresponding trigger.

A service_id_ref field represents an identifier for identifying a trigger target TDO. Thus, a service_id_ref field may indicate an NRT_service_id field in an SMT or an NST so as to identify an NRT service of a trigger target TDO, for example.

A content_linkage field represents an identifier for identifying a trigger target TDO content item. For example, the content_linkage field may indicate a content_linkage field in an NRT-IT or an NCT so as to identify a trigger target TDO content item. Moreover, a service_id_ref field and a content_linkage field may be included in a class for indicating one target TDO.

A num_trigger_descriptors field represents the number of trigger descriptors.

A trigger_descriptor ( ) field represents a descriptor that includes information on a trigger.

When a trigger is configured in a table form of an MPEG2 private section in this way, a broadcasting station may transmit one trigger according to a virtual channel.

As a first method of transmitting a trigger by a broadcasting station, it is possible to transmit the above-described trigger table as a part of a 0X1FF stream that is a default PID of PSIP. The first method has a characteristic in that a trigger table may be distinguished from another table since a table_id of a trigger table is uniquely assigned.

In addition, as a second method of transmitting a trigger, it is possible to assign a PID corresponding to a trigger table to a master guide table (MGT) and transmit a trigger table along with a stream of a corresponding PID. The second method has a characteristic in that a receiver may process all tables in a stream of a corresponding PID as a trigger table.

As an example, the present invention transmits at least one of a trigger and trigger signaling information through an MPEG2 packetized elementary stream (PES) so as to designate accurate timing synchronized with audio and video as a trigger time.

Here, the synchronization of video and audio of an MPEG2 PES is performed as follows. A receiver decoder operates in synchronization with a time stamp of a transmitter encoder. An encoder has a main oscillator counter that is referred to as a system time clock (STC), and a counter. The STC belongs to a specific program and is a main clock of a program for video and audio encoders.

If a video frame or an audio block emerges at an encoder input, the STC is sampled. A sampling value is added to a constant corresponding to a delay between an encoder buffer and a decoder buffer to create presentation time information, namely, a presentation time stamp (PTS), which is inserted into a first part of a picture block or an audio block. If frame reordering occurs, a decode time stamp (DTS) that represents a time when data needs to be decoded at a decoder is inserted. This process is the same as those of a DTS and a PTS except for frame reordering of a B picture. The DTS is further needed only in the case of frame reordering. When the DTS is used, the PTS also exists always and these may be inserted at an interval less than 700 msec. Moreover, ATSC is defining so that the PTS and the DTS are inserted into a start part of each picture.

An output of an encoder buffer has a time stamp that is referred to as a program clock reference (PCR) in a transport packet level. In addition, the PCT time stamp may emerge at an interval less than 100 msec and such a PCR is used for synchronizing an STC of a decoder with an STC of an encoder.

In addition, a video stream and an audio stream may have each PTS or DTS corresponding to a common STC for synchronization of a decoder. Thus, it is possible to recognize through each PTS and DTS when an audio stream and a video stream need to be played whenever decoding, and audio and video are synchronized by using it.

For example, a decoder of a receiver outputs a PES packet from a received TS stream to a video PES depacketizer and outputs a PCR value inserted in a TS packet header to a PCR counter. The PCR counter counts a PRC value of 100 and outputs it to a comparison unit. In addition, the vide PES depacketizer outputs a header of a PES packet to a DTS/PTS extractor and buffers an elementary stream (ES), namely, video data to be displayed, in an elementary stream buffer & decoder. The DTS/PTS extractor extracts a DTS value and a PTS value from a PES packet header and outputs it to a comparison unit. If the PCR value received from the PCR counter becomes a DTS value or a PCR value of 100 becomes a PTS value, the comparison unit outputs each related signal to a decoding and display control block. The decoding and display control block receives a signal related to a change of the PCR value to the DTS value received from the comparison unit, decodes video data buffered in the elementary stream buffer & decoder, and stores the decoded data in a decoded stream memory. Moreover, if the decoding and display control block receives a signal related to a change of the PCR value to the PTS value received from the comparison unit, the control block displays the decoded video data stored in the decoded stream memory through a display unit.

Thus, the MPEG2 PES may include a PTS and a DTS in its header and synchronize data transmitted in data transmission with one elementary stream (ES) or a plurality of ESs in a presentation time. This may be referred to as a synchronized data stream scheme.

That is, according to an embodiment, a broadcasting station may include triggering data or a trigger stream in a payload of a PES by using such a synchronized data stream scheme and designate a trigger time as a PTS value of a PES packet header. In this case, a receiver may trigger a target TDO at an accurate time according to a PCR value to which a PES of a PES including a trigger refers. Thus, a broadcasting station may synchronize triggers at an accurate time when audio and video which the broadcasting station desires to trigger are presented, by using a PTS value of a PES packet header designated as a trigger time and a PTS value of an audio and video PES packet header.

In addition, a header of a PES stream packet including a trigger may have a stream_type value of 0x06 so as to represent a synchronized data stream scheme and a stream_id may represent an identifier of a preset stream and a PES_packet_length may represent a length of a PES stream including a payload of a PES stream.

Figure 26:
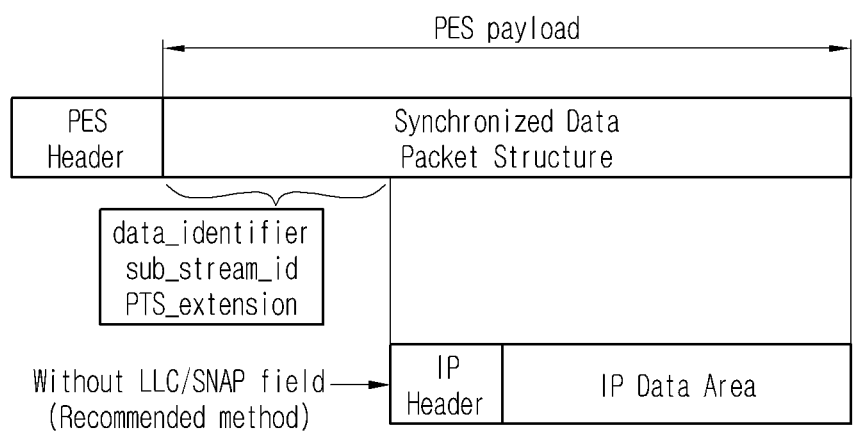
FIG. 26 shows a structure of a PES according to a synchronized data streaming scheme that includes a trigger according to an embodiment.

FIG. 26 shows a structure of a PES according to a synchronized data streaming scheme that includes a trigger according to an embodiment.

As shown in FIG. 26, the PES according to the synchronized data streaming scheme may include a PES header and a PES payload, and the PES payload may include a synchronized data packet structure. The trigger that is configured as a trigger table as described above or is configured as data of another type may be transmitted as a part of the PES payload of FIG. 26. In addition, a broadcasting station may packetize a trigger in an IP datagram type and transmit the packetized trigger as a part of an IP data area.

FIG. 27 shows, as bit stream syntax, a synchronized data packet structure of a PES payload for transmitting a trigger according to an embodiment.

As shown in FIGS. 26 and 27, the trigger may be transmitted as a part of the synchronized data packet structure. Detailed descriptions on each field in the structure are as follows.

A data_identifier field is an identifier for identifying a type of data that is included in a PES data packet. It may be set to 0x22 according to the data type.

A sub_stream_id field is a user private identifier.

A PTS_extention_flag field indicates whether there is a PTS_extention field. When a value of this field is 1, there may be a PTS extension field in a PES_data_packet field. In addition, when there is no PTS extension field, the value of this field may be 0.

An output_data_rate_flag field may be set to 0.

A syncnronized_data_packet_header_length field represents a length of an optional field that is included in a PES packet header. This field may be included when a PTS_extention_flag field is 1, and may represent a length that includes a synchroziced_data_privete_data_byte(s).

A PTS_extension field extends a PTS that is delivered from a header of a corresponding PES packet. This field may include 9-bit program clock reference (PCR) extension information. In addition, a receiver may extend a PTS resolution of synchronized data through this field from 11.1 microseconds (90 kHz), MPEG2 standard to 37 nanoseconds (27 MHz).

A synchronized_data_private_data_byte field represents a payload byte of a synchronized PES packet. When a protocol_encapsulation field of a data service table (DST) represents any one of a synchronized datagram, an IP datagram with no LLC/SNAP, and a multi-protocol datagram with LLS/SNAP, a synchronized_data_byte field may include a unique one datagram. Thus, when the LLC/SNAP is used, an 8-byte LLC/SNAP header may appear only in the first 8-byte synchronized_data_byte of a PES packet.

Thus, if a broadcasting station transmits a trigger as a part of a synchronized data stream (its stream_type is 0x06) of a PES as described above, a receiver may extract a trigger stream from the payload of the PES. In addition, the receiver may perform an action on a target TDO by using a PTS value of a PES header as a trigger time. Thus, by synchronizing a trigger on the basis of a PTS that is a reference time for video and audio display synchronization, a TDO may be triggered at a frame-based accurate time. In addition, when a trigger time is designated as a PTS, video and audio synchronization may be easily performed.

As an example, the present invention transmits trigger signaling information that may obtain a trigger stream. A receiver may receive trigger signaling information and obtain a trigger stream included in a synchronized data stream of a PES on the basis of the received trigger signaling information.

A method of transmitting trigger signaling information for obtaining a trigger stream that is transmitted by using the synchronized data streaming may vary according to embodiments. As an example, the present invention transmits trigger signaling information by using at least one of 1. a transmission using a DST, 2. a transmission using a service id descriptor, 3. a transmission using a trigger stream descriptor, and 4. a transmission using a stream type defined on a trigger stream.

According to an embodiment, the present invention may transmit trigger signaling information through a data_service_table (DST) for an NRT service. The DST is a table section for transmitting a data service, and since descriptions on the DST and an example of a data_service_bytes ( ) configuring the DST are provided in FIG. 8 above, these are here skipped.

The above-described DST may include signaling data for receiving each elementary stream (ES) that configures a data service. Thus, the trigger signaling data for receiving a trigger stream may also be included in the DST.

Each data service may include one or more applications, each of which may be an application identification structure type that includes an application identifier such as app_id. In addition, each application may include one or more data streams or data elements that configure the corresponding application.

Thus, a broadcasting station may transmit one trigger stream as a part of a specific virtual channel (VC) so as to transmit the trigger stream through a data service. In addition, it is also possible to transmit one trigger stream as a part of each application. Thus, examples of two methods of transmitting trigger signaling information will be described below.

In a case where one trigger stream is a part of a virtual channel, a data service for transmitting a trigger stream may be referred to as a trigger service in an embodiment. In this case, a broadcasting station may assign a fixed service identifier (a service ID) to a trigger service.

Thus, a receiver may identify that one trigger stream is being transmitted to a corresponding virtual channel if a service identifier is a fixed value, 0X01.

Here, a broadcasting station may transmit trigger signaling information as a part of an application identification structure that is included in a DST.

For example, the broadcasting station may add 0x0001 as a value of an app_id_description field in a DST so that the value means a bidirectional application for associating an NRT service such as a TDO with a real-time broadcast. In addition, an app_id_byte_length uses 3 bytes for 0x0003 and an app_id_byte may assign 0x01 and indicate that a corresponding data service includes trigger stream signaling information.

Thus, a receiver may receive a DST by using the above-described method and identify a tap ( ) including trigger signaling information if an app_id_byte_length is 0x0003, an app_id_description is 0x0001, and an app_id_byte is 0x01. The receiver may extract trigger signaling information including an association_tag value from the identified tap ( ) structure, and receive a stream of which an association_tag_descriptor matches with the extracted association_tag and which has a PID, among data elementary streams (ESs) listed in the PMT extracted from a broadcast stream so that a trigger stream may be received.

As described above, an NRT service is signaled through an SMT or an NST and may be uniquely identified through a 16-bit service identifier (service_id). In addition, content items that configure the NRT service may be identified through a content identifier or a content_linkage in an NCT or an NRT-IT. Thus, it is possible to extend an app_id_byte through a DST and transmit a trigger service like the NRT service. For example, the app_id_byte may include data that combines a service identifier (service id) field and a content linkage (content_linkage) field in the trigger service. Thus, the app_id_byte may be configured so that its first 16 bits correspond to a service identifier (service id) field in an SMT or an NST and its remaining 32 bits correspond to a content linkage field in an NCT or an NRT-IT.

As such, a broadcasting station may transmit trigger signaling information as a part of tap ( ) through an application identification structure on a DST if one stream is included per virtual channel.

As an example, the present invention may transmit trigger signaling information by using a protocol_encapsulation field in a DST. For example, when an app_id_byte_length in the DST is set to 0x0000, an app is not assigned and when a value of a protocol_encapsulation field is 0x0F, it may indicate that the trigger signaling information is included in a corresponding tap ( ) structure. Thus, if an app_id_byte_length is 0x0000 and value of a protocol_encapsulation field is 0x0F, a receiver may receive the trigger signaling information from the corresponding tap ( ) structure, accordingly obtain a PID value on a PMT indicating a trigger stream as described above, and receive the trigger stream.

According to another embodiment, it is possible to transmit trigger signaling information by using a content type descriptor field in a DST.

As shown in FIG. 28, an example of a content type descriptor structure may be included in a tap ( ) on a DST is as follows.

A descriptorTag field may have a value of 0x72 for representing a contentTypeDescriptor.

A descriptorLenth field represents the total length (in byte) of a descriptor.

A contentTypeByte field represents a MIME media type value of data referenced by a tap to which the descriptor is connected. A MIME media type is defined in No. 5 in RFC2045 section [8].

Thus, as an example, the present invention may add a content type descriptor to a tap ( ) structure that includes trigger signaling information. Thus, if an app_id_byte_length is 0x0000, a content type descriptor of the tap ( ) structure matches with preset content, a receiver may receive trigger signaling information from a corresponding tap ( ) structure, accordingly obtain a PID value on a PMT indicating a trigger stream as described above, and receive the trigger stream. In order to identify from a content type descriptor that there is trigger service signaling information, a MIME media type may be designated as a specific type.

As described above, one NRT service may be a trigger service for transmitting a trigger stream, and transmit different trigger streams by content item in the trigger service. In this case, each application may include one trigger stream.

Thus, as an example, the present invention may transmit a trigger stream as a part of each content item in an NRT service. In this case, it is possible to use the above-described application identification structure. For example, when an app_id_byte_length is 0x0003, it represents that a trigger stream is transmitted through one NRT service by using one service identifier, and when the app_id_byte_length is 0x0007, it may represent that the trigger stream is transmitted by content item by using a service identifier and content linkage. In a case where a definition is made in this way, each NRT service may transmit each trigger stream by NRT service or content item. Since the subsequent steps of a method of transmitting trigger signaling information and a method of receiving a trigger stream are the same as when one trigger stream is included per virtual channel, related descriptions are here skipped.

FIG. 29 shows an embodiment of each of syntax of a PMT and a service identifier descriptor.

As shown in FIG. 29, a program map table (PMT) represents information on a program that is broadcast over each channel. By parsing a 'packet ID' to which the PMT is transmitted, the PMT may be received from a program association table (PAT) in which a 'packet ID' is defined and transmitted as '0x00'.

A service identifier descriptor may be included in a descriptor loop by elementary stream (ES) in a PMT. In addition, it may include information on a list of services that is included in each program element.

Descriptions on a structure of a service identifier descriptor are as follows.

A descriptor_tag field is a field for representing that the descriptor is a service_id_descriptor ( ) and may have a value of 0xC2.

A descriptor_length field represents, in byte, a length of a field following this field to the end of this descriptor.

A service_count field indicates the number of services that are included in a program element to which this descriptor is attached.

A service_id field represents a service identifier that is included in a program element to which this descriptor is attached.

A trigger stream may be transmitted through a well-known IP address, for example. In addition, a broadcasting station may transmit a specific service identifier (a service id, for example 0x01) corresponding to a trigger stream as a part of a service identifier descriptor so as to signal a trigger. That is, trigger signaling information for receiving a trigger stream may be transmitted through a service identifier descriptor. Thus, if a service identifier of a service_id_descriptor that is included in an ES descriptor loop in an ES loop of a PMT is 0x01, a receiver may determine that an elementary_PID in the ES loop is a PID indicating a trigger stream, and may receive the trigger stream by using the PID.

FIG. 30 shows a trigger stream descriptor according to an embodiment. According to an embodiment, a trigger may be signaled by using the trigger stream descriptor. Like the above-described service identifier descriptor, the trigger stream descriptor may be included in the ES descriptor loop in the ES loop in the PMT. Thus, when there is a trigger stream, there may be a trigger stream descriptor in an ES descriptor loop. A receiver may obtain a PID of a trigger stream from an elementary_PID in a corresponding ES loop and receive a trigger stream.

As such, a trigger stream descriptor for transmitting trigger signaling information may include at least one of a service identifier (a target service id) of a TDO, namely, a trigger target in a trigger stream and a list of IP addresses to which the trigger stream is transmitted. The trigger stream descriptor of FIG. 30 is an example, and descriptions on a structure thereof are as follows.

A descriptor_tag field represents a trigger_stream_descriptor if it is a preset value.

A descriptor_length field represents a length (in byte) between a field following this field and the end of this descriptor.

A target_service_count field represents the number of target NRT services of one or more triggers (TDO) that are included in a trigger stream.

A target_service_id field represents a service identifier (service_id) of each of the target NRT services of one or more triggers (TDO) that are included in a trigger stream. A receiver may recognize a service identifier (service_id) of a target TDO by using the target_service_id field even before receiving a trigger stream.

A target_content_item_count field represents the number of target NRT service content items of one or more triggers that are included in a trigger stream.

A target_content_linkage field represents the target NRT service content item linkage (content_linkage) of one or more triggers that are included in a trigger stream.

Since a trigger stream descriptor is an example, it is obvious that further information may be added or the descriptor may be configured as another type. For example, when one trigger stream is transmitted per virtual channel, a field for a content item may be omitted. Moreover, at least one of a trigger stream identification information field for identifying a trigger stream or a profile information field may be added.

A broadcasting station may transmit information on a list of trigger target NRT services such as a TDO by using the above-described trigger stream descriptor. Moreover, the broadcasting station may transmit trigger signaling information by using target_service_id and target_content_linkage fields if there are different triggers by content item. Moreover, a trigger stream descriptor may further include a list of port numbers or information on IP addresses to which a trigger stream is transmitted.

According to an embodiment of the preset invention, a broadcasting station may designate a stream type and transmit trigger signaling information. A receiver may extract trigger signaling information from a PMT by using a stream type and accordingly receive a trigger stream. For example, 0x96 that is one of stream types that are preliminarily set may be designated as a trigger stream. In this case, since a typical receiver has no information on where a stream type is 0x96, it may discard the trigger stream without processing the trigger stream. Thus, it has an advantage in that compatibility with an inferior receiver is ensured.

According to an embodiment, it is possible to transmit a trigger as a part of an application information table (AIT) for transmitting application information in a data broadcast such as multimedia home platform (MHP) or advanced common application platform (ACAP). FIG. 31 shows an embodiment of such an AIT table.

In addition, according to another embodiment, it is also possible to transmit a trigger as a part of a descriptor of a system time table (STT) so as to refer to the STT as a trigger time. FIG. 32 shows an embodiment of such an STT table.

Figure 33:
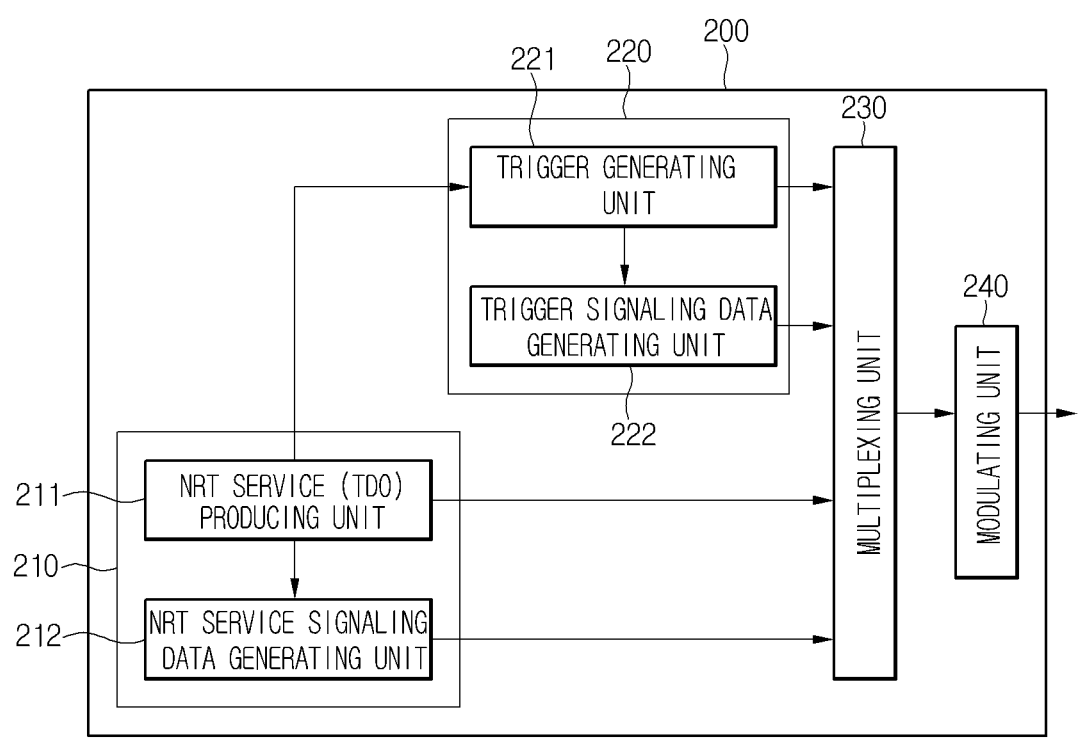
FIG. 33 is a schematic block diagram of a transmitter for transmitting a trigger and a TDO according to an embodiment.

FIG. 33 is a schematic block diagram of a transmitter for transmitting a trigger and a TDO according to an embodiment.

Referring to FIG. 33, a transmitter 200 according to an embodiment includes an NRT service transmitting unit 210, a trigger transmitting unit 220, a multiplexing unit 230, and a modulating unit 240. The NRT service transmitting unit 210 includes an NRT service (TDO) producing unit 211 and an NRT service signaling data generating unit 212 and the trigger transmitting unit 220 includes a trigger generating unit 221 and a trigger signaling data generating unit 222.

The NRT service (TDO) producing unit 211 receives data for producing an NRT service from a service provider, produces the NRT service, packetizes the produced NRT service as an IP datagram and packetizes it as a transport packet (TP). The packetized NRT service data is transmitted to the multiplexing unit 230.

In addition, the NRT service producing unit 211 transmits, to the NRT service signaling data generating unit 212, metadata including a service_id and information on a channel over which an NRT service is transmitted. Moreover, when the produced NRT service is a TDO, the NRT service producing unit 211 extracts trigger information including a trigger time for triggering a TDO, identification information on a target TDO, and trigger action information, and transmits it o the trigger generating unit 221.

The NRT service signaling data generating unit 212 generates NRT service signaling data for receiving an NRT service by using received NRT service metadata, packetizes the NRT service signaling data as a transport packet (TP), and transmits it to the multiplexing unit 230.

The trigger generating unit 221 generates triggering data by using trigger information on a TDO received from the NRT service (TDO) producing unit. The generated triggering data is packetized as a transport packet and transmitted to the multiplexing unit 230. In addition, the trigger generating unit 221 transmits, to the trigger signaling data generating unit 222, metadata for receiving a trigger such as a packet identifier (PID) of transmitted triggering data.

The trigger signaling data generating unit 222 generates trigger signaling data on the basis of received metadata, packetizes the trigger signaling data as a transport packet and transmits it to the multiplexing unit 230.

The multiplexing unit 230 multiplexes received transport packets by each channel and transmits the multiplexed signals to the modulating unit 240.

The modulating unit 240 modulates the multiplexed signals for transmission and transmits them to the outside. There may be various modulation schemes and the present invention has no limitation in modulation scheme.

Figure 34:
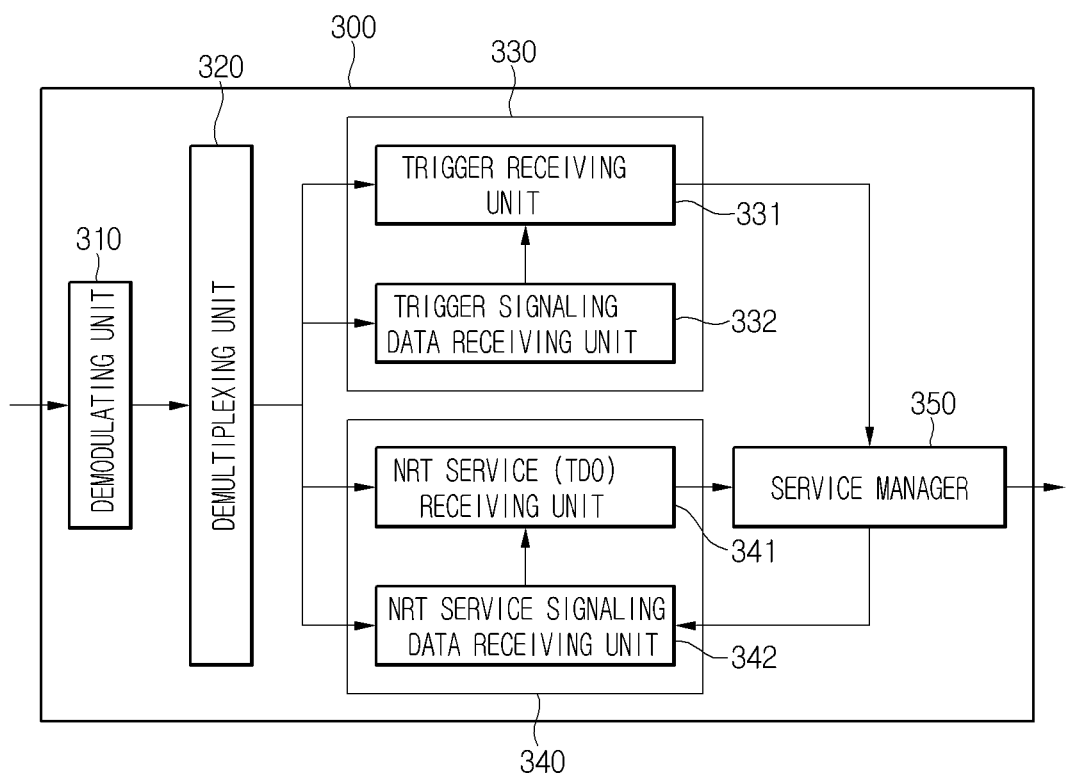
FIG. 34 is a schematic block diagram of a receiver 300 for receiving a trigger and a TDO according to an embodiment.

FIG. 34 is a schematic block diagram of a receiver 300 for receiving a trigger and a TDO according to an embodiment.

As shown in FIG. 34, the receiver 300 according to an embodiment includes a demodulating unit 310, a demultiplexing unit 320, a trigger processing unit 330, an NRT service processing unit 340, and a service manager. The trigger processing unit 330 includes a trigger receiving unit 331 and a trigger signaling data receiving unit 332 and the NRT service processing unit 340 includes an NRT service (TDO) receiving unit 341 and an NRT service signaling data receiving unit 342.

The de-modulating unit 310 receives a modulated signal from the transmitter 200, demodulates it according to a pre-designated demodulation scheme, and transmits the demodulated signal to the demultiplexing unit 320.

The demultiplexing unit 320 demultiplexes the demodulated signal, recovers original transport packets by each channel and transmits them to each receiving unit of the trigger processing unit 220 or the NRT service processing unit 340.

The NRT service signaling data receiving unit 342 receives and recovers the above-described packetized NRT service signaling data from the demultiplexing unit 320, extracts information for receiving an NRT service therefrom, and then transmits the extracted information to the NRT service (TDO) receiving unit 341. The NRT service (TDO) receiving unit 341 receives from the demultiplexing unit 320 transport packets of an NRT service by using information for receiving an NRT service, recovers the received packets as NRT service data and transmits the recovered data to the service manager 350.

The trigger signaling data receiving unit 332 receives and recovers the above-described packetized trigger signaling data from the demultiplexing unit 320, extracts information for receiving a trigger therefrom, and then transmits the extracted information to the trigger receiving unit 331. The trigger receiving unit 331 receives from the demultiplexing unit 320 transport packets including a trigger by using information for receiving a trigger, recovers triggering data and transmits the recovered data to the service manager 350.

The service manager 350 receives at least one of the triggering data and the NRT service (TDO) data from the trigger processing unit 330 or the NRT processing unit 340. In addition, the service manager 350 allows a trigger action to be performed on a TDO by performing or applying a trigger action on a trigger target TDO at a trigger time.

Figure 35:
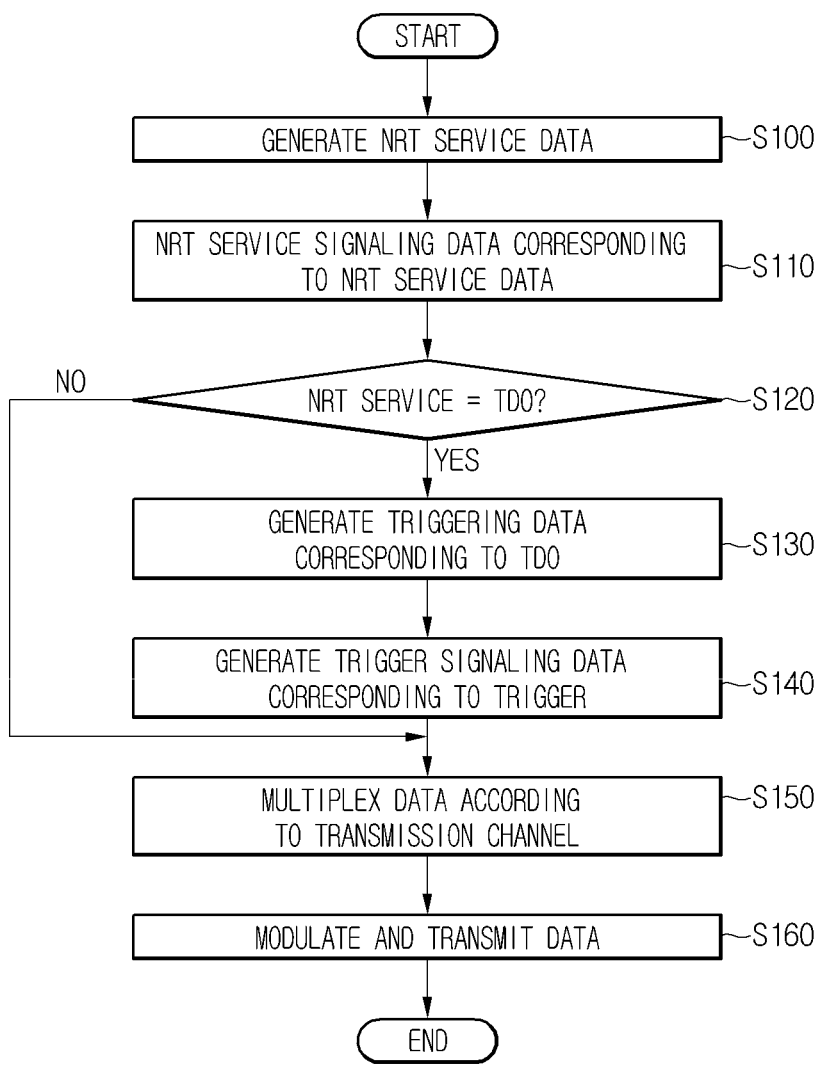
FIG. 35 is a schematic flow chart of a method of transmitting a trigger according to an embodiment.

FIG. 35 is a schematic flow chart of a method of transmitting a trigger according to an embodiment.

Referring to FIG. 35, the NRT service producing unit 211 receives NRT service data from the outside or produces NRT service data on the basis of data received from an NRT service provider, in step S100. In addition, the NRT service producing unit 211 packetizes the generated data as transport packets. Moreover, the NRT service producing unit 211 transmits, to the NRT service signaling data generating unit 212, information for receiving transport packets including an NRT service.

Subsequently, the NRT service signaling data generating unit 212 generates the above-described NRT service signaling data and packetizes it as a transport packet, in step S110.

The NRT service producing unit 211 determines whether the produced NRT service is a triggered declarative object or a TDO, in step S120.

In addition, if the produced NRT service is a TDO, the NRT service producing unit 211 transmits, to the trigger generating unit 221, trigger information including a trigger time for triggering a target TDO, a trigger action, and target TDO identification information, and the trigger generating unit 211 generates triggering data by using the received trigger information, in step S130. The generated triggering data is packetized as a transport packet and transmitted to the multiplexing unit. For example, a target service identifier for a target TDO and trigger action information to be applied to a target service may be inserted into a payload of a packetized stream such as a PES for transmission. Moreover, trigger time information may be designated for example in a PTS or DTS type, and may be inserted into a payload or a header of a PES for transmission. If a synchronized data streaming scheme is used in this way, a PST of a trigger stream is synchronized with a PTS of video and audio streams and thus it is possible to set an accurate playing timing.

In addition, the trigger signaling data generating unit 222 generates trigger signaling data for identifying and receiving a trigger transmitted from the trigger generating unit 221, packetizes the data as a transport packet, and transmits the packet to the multiplexing unit, in step S140. Here, the trigger signaling data may include a trigger stream descriptor or a service identifier descriptor that are inserted into a program map table, and may include a packet identifier of a trigger stream that corresponds to each descriptor. In addition, trigger signaling data may also include a packet identifier of a trigger stream that is included in a TAP structure of a DST.

Subsequently, the multiplexing unit 230 multiplexes at least one of packetized NRT service data, NRT service signaling data, triggering data, and trigger signaling data, and transmits the multiplexed data to the modulating unit 240.

In addition, the modulating unit 240 performs modulation for transmitting a multiplexed signal and the modulated signal to an external receiver or broadcast network, in step S160.

Figure 36:
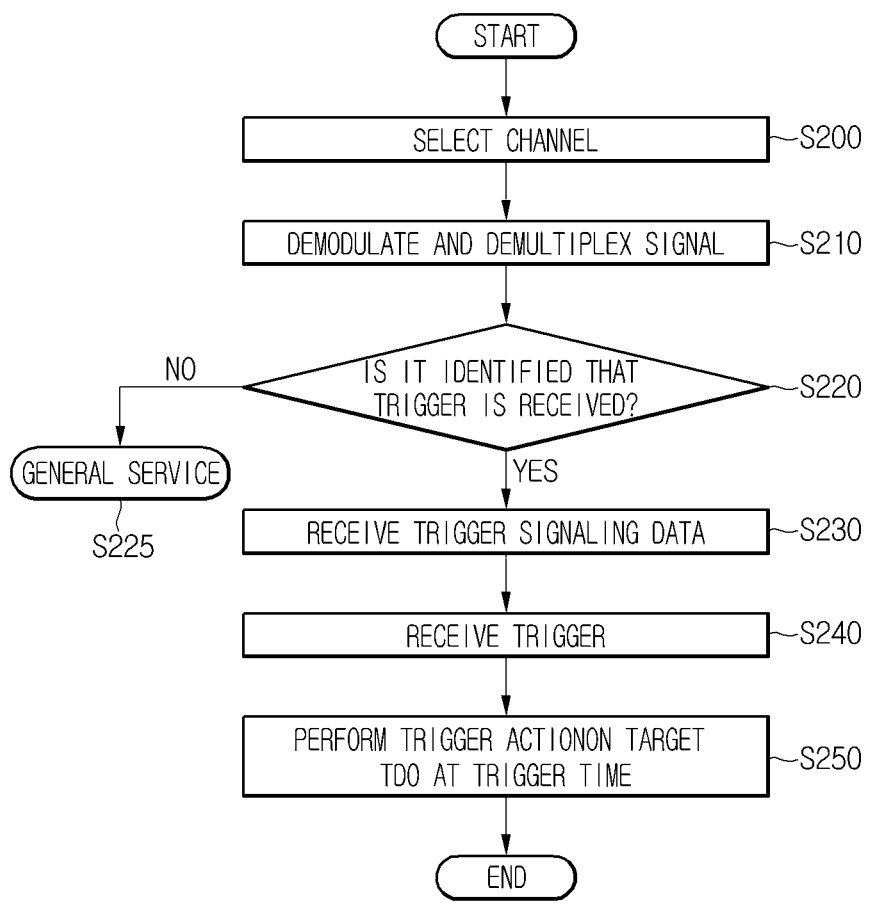
FIG. 36 is a schematic flow chart of an operation of a receiver 300 according to an embodiment.

FIG. 36 is a schematic flow chart of an operation of a receiver 300 according to an embodiment.

Firstly, if the receiver 300 is powered on, it selects a channel that is preset or selected by a user, instep S200. In addition, a signal received from the selected channel is demodulated in the demodulating unit 310 and the demultiplexing unit 320 demultiplexes the demodulated signal by transmission channel, in step S210. In addition, the NRT service receiving unit 341 and the NRT service signaling data receiving unit 342 receives and transmits NRT service data to the service manager 350 as described above.

Subsequently, the trigger signaling data receiving unit 332 or the NRT service signaling data receiving unit 342 checks whether it is possible to receive a trigger, in step S220. Trigger reception may be checked by using any one of the above-described methods. That is, the trigger signaling data receiving unit 332 or the NRT service signaling data receiving unit 342 may check by using any one of checking a PSIP base PID or a PID corresponding to a trigger in an MGT, using a tap structure of a DST, using a service identifier descriptor or a trigger stream descriptor, using a trigger stream type, and using an AIT or an STT whether it is possible to receive a trigger.

In addition, if it is confirmed that it is possible to receive a trigger, the trigger signaling data receiving unit 332 receives a transport packet including trigger signaling data, recovers and transmits the trigger signaling data to the trigger receiving unit 331, in step S230.

Subsequently, the trigger receiving unit 331 extracts triggering data from the received transport packet by using trigger signaling data, and transmits the extracted data to the service manager 350, in step S240. For example, the trigger receiving unit 331 may receive a trigger stream by using a packet identifier corresponding to the above-described trigger stream descriptor. Moreover, the trigger receiving unit 331 may extract trigger information from a trigger stream and transmit the extracted information to the service manager 350. Moreover, if a received trigger stream is a PES, a PTS included in a header of the PES may be extracted as a trigger time, and a trigger action and a target service identifier may be extracted from a payload of the PES and transmitted to the service manager 350.

In addition, the service manager 350 performs a trigger action on a target TDO at a trigger time to allow a trigger to be performed on a TDO if the trigger is received, in step S250. In particular, when a PTS of a PES is a trigger time, a PTS of a trigger stream may be synchronized with a PTS included in a header of a PES of audio and video streams to set an accurate playing timing.

Figure 37:
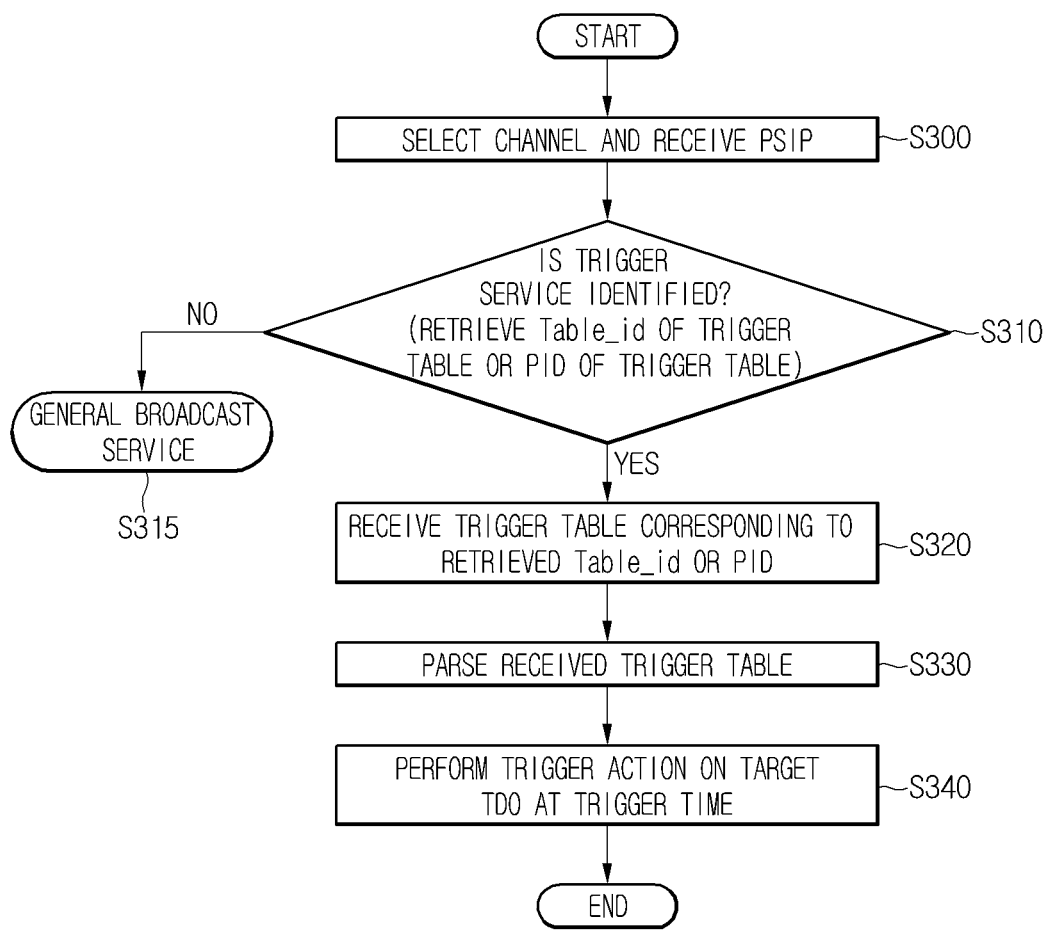
FIG. 37 is a schematic flow chart of a method of receiving a trigger by using a trigger table according to an embodiment.

FIG. 37 is a schematic flow chart of a method of receiving a trigger by using a trigger table, among methods of receiving a trigger according to embodiments of the present invention.

The demodulating unit 310 receives and demodulates a broadcast signal for a selected channel. In addition, the trigger signaling data receiving unit 332 receives a PSIP table through the demultiplexing unit 320, determines whether there is a trigger table among received tables, and then identifies a trigger service, in step S310. The trigger signaling data receiving unit 332 may retrieve a PID assigned to a trigger table from an MGT table, a PSIP base table, or a table corresponding to a Table_id assigned to a trigger table to identify a trigger service.

If the trigger service is not identified, the receiver 300 provides a general broadcast service.

If the trigger service is identified, the trigger receiving unit 331 receives the retrieved trigger table and parses the received trigger table, in steps S320 and S330.

Subsequently, the service manager 350 receives trigger information including a trigger time parsed at the trigger table, a trigger action, and target TDO identification information and performs a corresponding trigger action on a corresponding TDO at a corresponding trigger time, in step S340.

Figure 38:
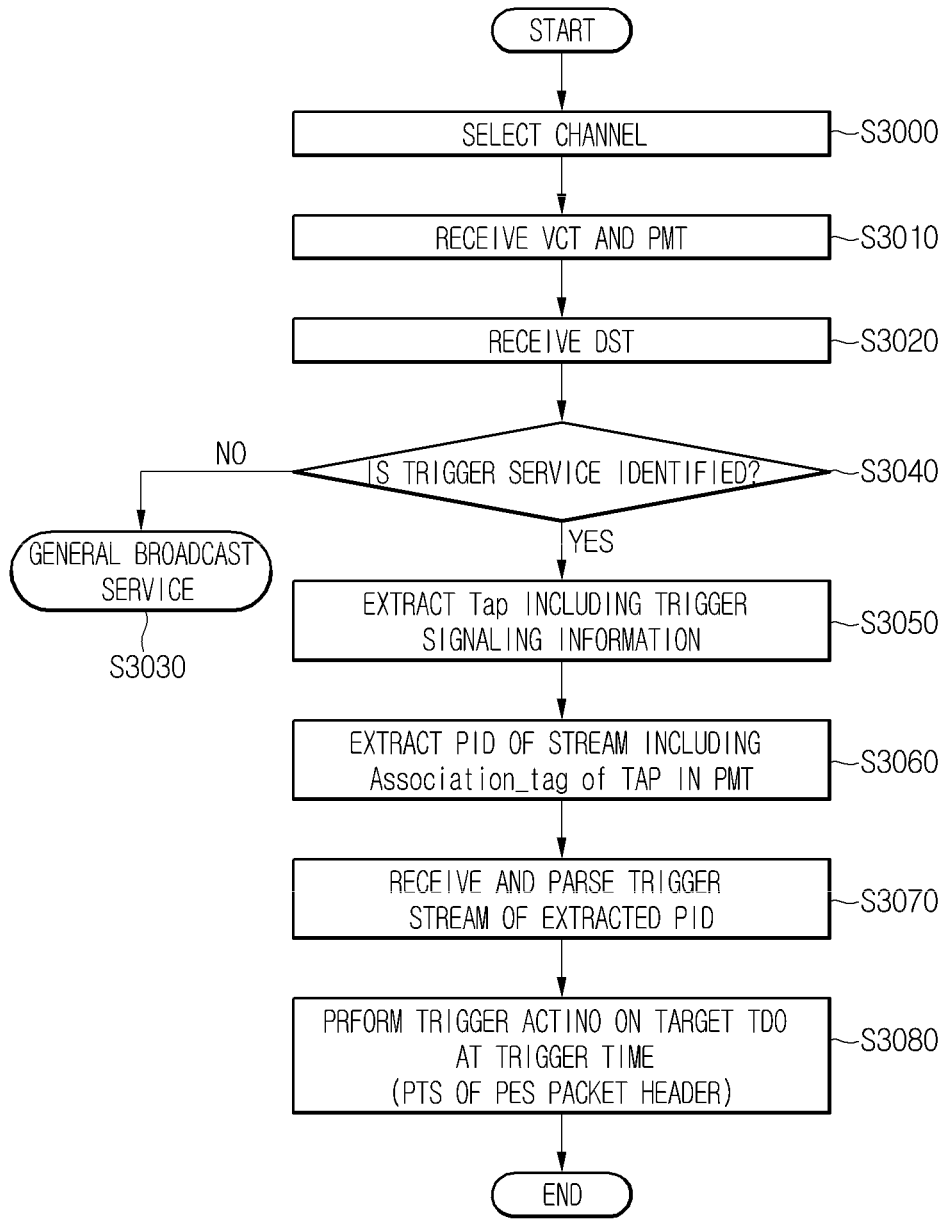
FIG. 38 is a flow chart of an operation of a receiver 300 when transmitting trigger signaling information and a trigger by using a DST according to an embodiment.

FIG. 38 is a flow chart of an operation of a receiver 300 when transmitting trigger signaling information and a trigger by using a DST according to an embodiment.

If a physical transmission channel is selected in step S3000 and a channel selected by a tuner is tuned, the receiver 300 obtains a VCT and a PMT by using the demodulating unit 310 and the demultiplexing unit 320 from a broadcast signal that is received from the tuned physical transmission channel, in step S3010. In addition, the PSI/PSIP section handler or trigger signaling data receiving unit 332 or the NRT service signaling data receiving unit 342 parses the obtained VCT and PMT and checks whether there is an NRT service.

For example, if a value of a service_type field in the VCT is not 0x04 or 0x08, a corresponding virtual channel does not transmit an NRT dedicated service. In this case, since a corresponding virtual channel transmits a typical broadcast service, the receiver 300 performs a proper operation according to information included in a corresponding virtual channel. However, even if a value of a service_type field does not mean an NRT dedicated service, a corresponding virtual channel may include an NRT service. In this case, the service included in the corresponding virtual channel is referred to as an adjunct NRT service and the receiver 300 may perform the same process as when receiving an NRT service.

In addition, if a value of a service_type field is 0x04 or 0x08, the NRT service signaling data receiving unit 342 or the trigger signaling data receiving unit 332 may determine that an NRT service may be received through a corresponding virtual channel. In this case, if a value of a stream_type filed included in a service location descriptor in a VCT (or an ES loop in a PMT) is 0x95 (that is, a DST transmission), a DST is received by using a value of an elementary_PID field, in step S3020. It may be performed in the demultiplexing unit 320 by the control of the service manager 350.

In addition, the trigger signaling data receiving unit 342 identifies a trigger service from the received DST in step S3040. A way of identifying a trigger service may be any one of identifying specific values assigned to an app_id_description and an app_id_byte by using an application identification structure, identifying a specific value assigned to a protocol_encapsulation field, and identifying a tap in which a content type descriptor is present, as described above.

If a trigger service is not identified from a received DST, triggering data is transmitting a general NRT service over the corresponding virtual channel and thus the receiver 300 performs a proper operation according to an NRT service included in a corresponding virtual channel, in step S3030.

In addition, if a trigger service is identified from a DST, the trigger signaling data receiving unit 332 extracts a tap from the DST including trigger signaling information (a PID of a trigger stream), in step S3060.

Subsequently, the trigger signaling data receiving unit 332 extracts from a PMT a stream PID including an association_tag of an extracted tap, in step S3070.

The trigger receiving unit 331 receives MPEG-2 TS packets corresponding to the extracted stream PID, decapsulates them, namely removes TS headers from them, and recovers a PES stream including a trigger stream. A stream_type of a PES packet including a trigger stream may be 0x06 that represents a synchronized data stream. The trigger receiving unit 331 parses from the recovered PES stream at least one of a PTS of a PES packet header, a target TDO identifier included in a trigger stream, a trigger identifier and trigger action information, in step S3070.

Subsequently, the service manager 350 performs an action on a target TDO at a trigger time which is a PTS of a PES packet header including a trigger, in step S3080. Here, the target TDO may be an NRT service that is indicated by the parsed target TDO identifier. In addition, an action may be at least one of preparation, execution, extension, and termination instructions that are indicated by parsed trigger action information.

Figure 39:
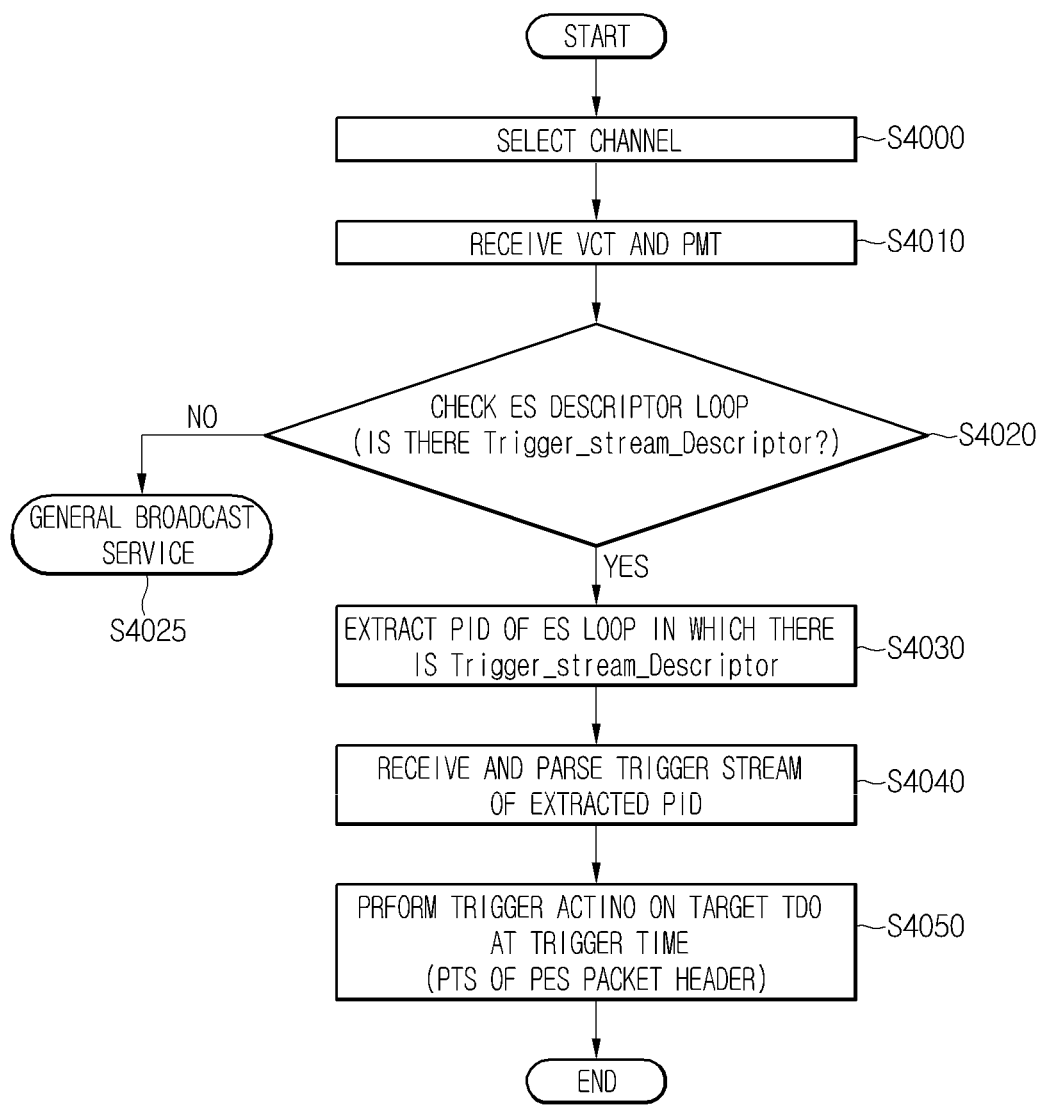
FIG. 39 is a flow chart of an operation of a receiver when transmitting a trigger by using a trigger stream descriptor according to an embodiment.

FIG. 39 is a flow chart of an operation of a receiver when transmitting a trigger by using a trigger stream descriptor according to an embodiment.

If a physical transmission channel is selected in step S3000 and a channel selected by a tuner is tuned, the receiver 300 obtains a VCT and a PMT by using the demodulating unit 310 and the demultiplexing unit 320 from a broadcast signal that is received from the tuned physical transmission channel, in step S4000. The broadcast signal includes a VCT and a PMT and the trigger signaling data receiving unit 332 or the PSI/PSIP section handler parses the obtained VCT and PMT.

In addition, the trigger signaling data receiving unit 332 checks whether a trigger is being transmitted from the VCT and the PMT to a corresponding virtual channel. To that end, the trigger signaling data receiving unit 332 determines whether there is an above-described trigger stream_descriptor in an ES descriptor loop in a PMT corresponding to a corresponding virtual channel, in step S4020. The existence of the trigger_stream_descriptor may be determined by searching descriptors in the ES descriptor loop and by whether a value of a stream_type is 0x06 corresponding to synchronized data streaming and a descriptor_tag field in a corresponding descriptor matches a value that is set to correspond to the trigger_stream_descriptor.

If it is determined that there is no trigger_stream_descriptor because the trigger_stream_descriptor is not identified from a PMT, a corresponding virtual channel does not transmit a trigger and thus the receiver 300 performs a proper operation according to a broadcast service included in a corresponding virtual channel, in step S4025.

In addition, if there is a trigger_stream_descriptor, the trigger signaling data receiving unit 332 extracts an elementary_PID included in a corresponding ES loop in a PMT, in step S4030. The extracted stream PID may be a PID value of a stream including a trigger stream.

Subsequently, the trigger receiving unit 331 receives MPEG-2 TS packets corresponding to the extracted stream PID, decapsulates them, namely removes TS headers from them, and recovers a PES stream including a trigger stream. A stream_type of a PES packet including a trigger stream may be 0x06 that represents a synchronized data stream. The trigger receiving unit 331 parses from the recovered PES stream at least one of a PTS of a PES packet header, a target TDO identifier included in a trigger stream, a trigger identifier and trigger action information, in step S4040.

Subsequently, the service manager 350 performs an action on a target TDO at a trigger time which is a PTS of a PES packet header including a trigger, in step S4050. Here, the target TDO may be an NRT service that is indicated by the parsed target TDO identifier. In addition, an action may be at least one of preparation, execution, extension, and termination instructions that are indicated by parsed trigger action information.

Figure 40:
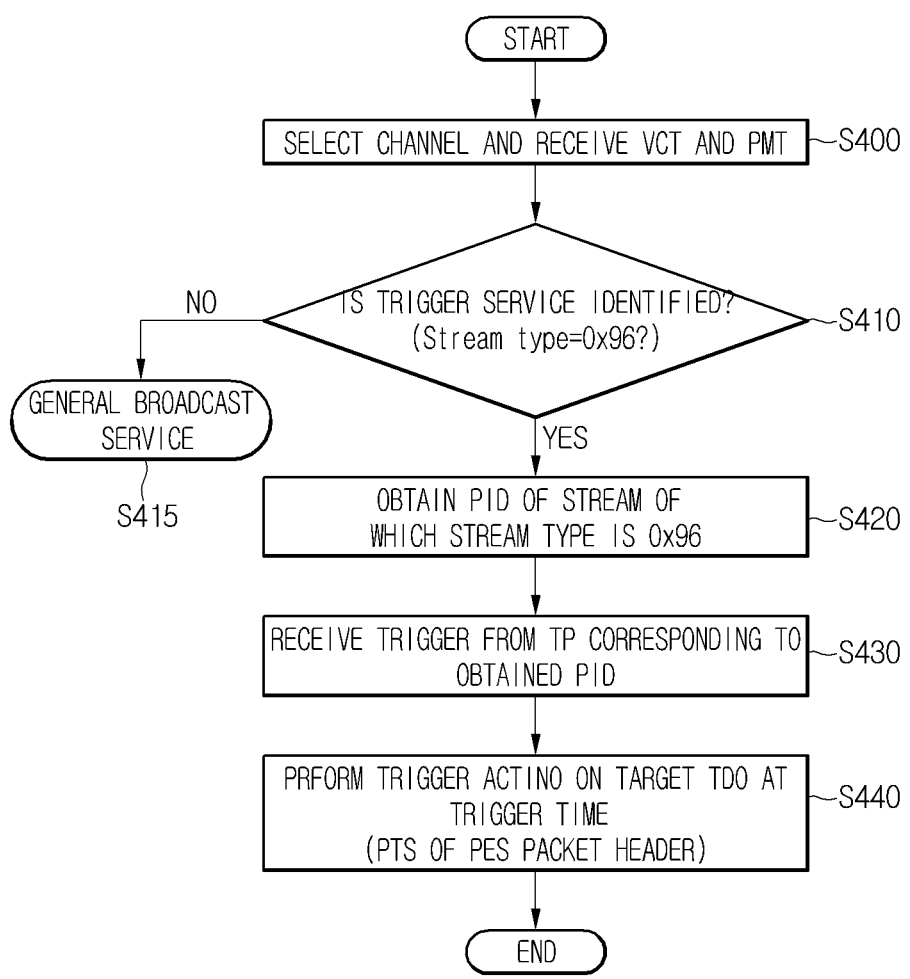
FIG. 40 is a flow chart of an operation of a receiver when transmitting a trigger by using a stream type according to an embodiment.

FIG. 40 is a flow chart of an operation of a receiver when transmitting a trigger by using a stream type according to an embodiment.

If a physical transmission channel is selected and a channel selected by a tuner is tuned, the receiver 300 obtains a VCT and a PMT by using the demodulating unit 310 and the demultiplexing unit 320 from a broadcast signal that is received from the tuned physical transmission channel. The broadcast signal includes a VCT and a PMT and the trigger signaling data receiving unit 332 or the PSI/PSIP section handler parses the obtained VCT and PMT in step S400.

In addition, the trigger signaling data receiving unit 332 checks whether a trigger is being transmitted from the VCT and the PMT to a corresponding virtual channel. To that end, the trigger signaling data receiving unit 332 determines whether there is an above-described specific data type, namely, 0x96 in an ES descriptor loop in a PMT corresponding to a corresponding virtual channel, in step S410.

If it is determined that there is no 0x96 because the 0x96 is not identified from a stream type in a PMT, a corresponding virtual channel does not transmit a trigger and thus the receiver 300 performs a proper operation according to a broadcast service included in a corresponding virtual channel, in step S415.

In addition, if a stream type is 0x96, the trigger signaling data receiving unit 332 extracts an elementary_PID included in a corresponding ES loop in a PMT, in step S420. The extracted stream PID may be a PID value of a stream including a trigger stream.

Subsequently, the trigger receiving unit 331 receives MPEG-2 TS packets corresponding to the extracted stream PID, decapsulates them, namely removes TS headers from them, and recovers a PES stream including a trigger stream. The trigger receiving unit 331 parses from the recovered PES stream at least one of a PTS of a PES packet header, a target TDO identifier included in a trigger stream, a trigger identifier and trigger action information, in step S430.

Subsequently, the service manager 350 performs an action on a target TDO at a trigger time which is a PTS of a PES packet header including a trigger, in step S440. Here, the target TDO may be an NRT service that is indicated by the parsed target TDO identifier. In addition, an action may be at least one of preparation, execution, extension, and termination instructions that are indicated by parsed trigger action information.

Figure 41:
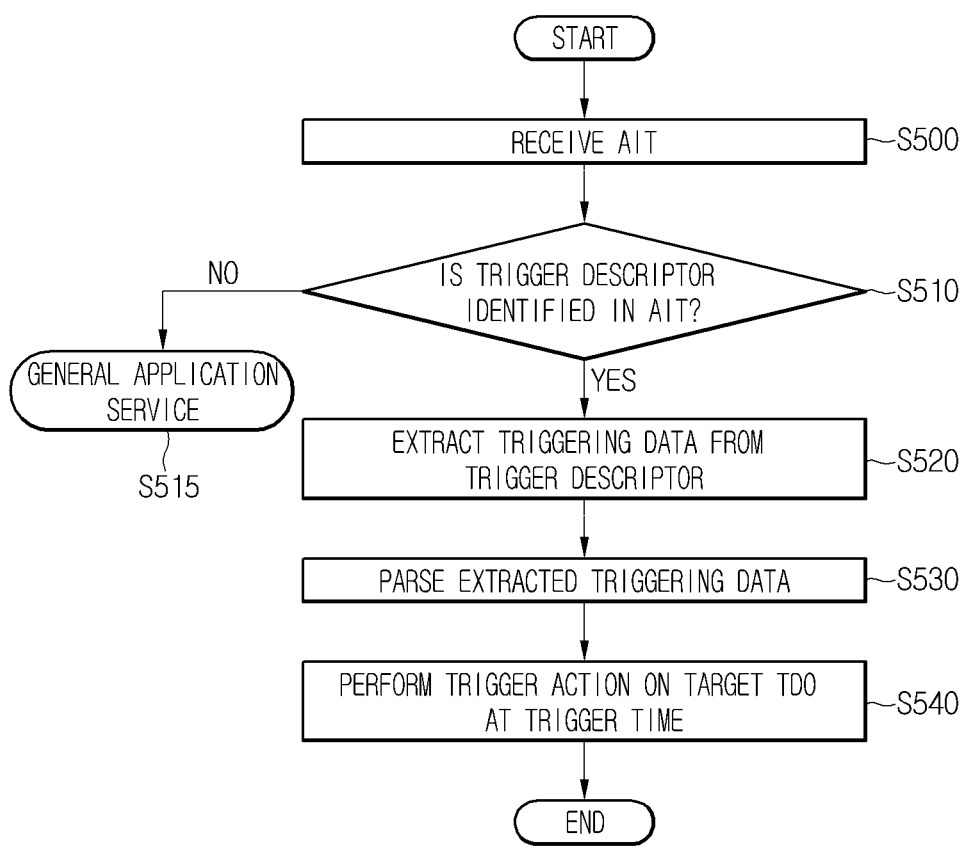
FIG. 41 is a flow chart of an operation of a receiver when transmitting a trigger by using an AIT according to an embodiment.

FIG. 41 is a flow chart of an operation of a receiver when transmitting a trigger by using AIT according to an embodiment.

The trigger signaling data receiving unit 332 receives an AIT by using the demodulating unit 310 and the demultiplexing unit 320 in step S500.

In addition, the trigger signaling data receiving unit 332 checks whether a trigger is being transmitted from an AIT. To that end, the trigger signaling data receiving unit 332 checks whether there is a trigger descriptor in an AIT, in step S510.

If it is determined that there is no trigger descriptor, a corresponding application does not include a trigger and thus the receiver 300 performs a proper operation according to a corresponding application service, in step S515.

In addition, if there is a trigger descriptor, the trigger receiving unit 332 extracts triggering data from a trigger descriptor, parses the extracted triggering data, and transmits the parsed data to the service manager 350, in step S5530.

Subsequently, the service manager 350 performs an action on a target TDO at a trigger time on the basis of the parsed triggering data, in step S540. Here, the target TDO may be an NRT service that is indicated by the parsed target TDO identifier. In addition, an action may be at least one of preparation, execution, extension, and termination instructions that are indicated by parsed trigger action information.

Figure 42:
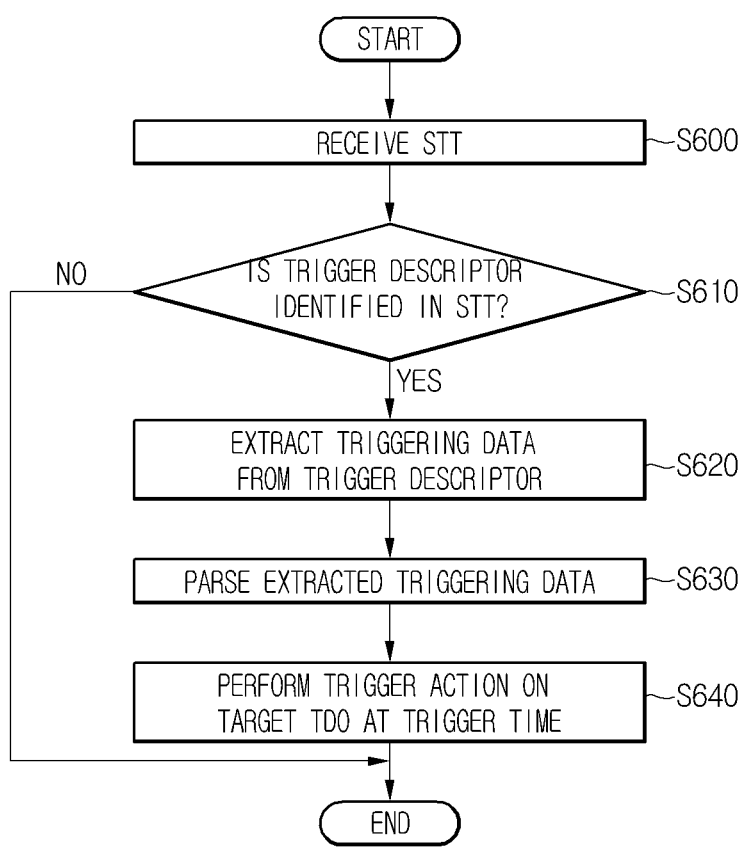
FIG. 42 is a flow chart of an operation of a receiver when transmitting a trigger by using an STT according to an embodiment.

FIG. 42 is a flow chart of an operation of a receiver when transmitting a trigger by using an STT according to an embodiment.

The trigger signaling data receiving unit 332 receives an STT by using the demodulating unit 310 and the demultiplexing unit 320 in step S600.

In addition, the trigger signaling data receiving unit 332 checks whether a trigger is being transmitted from an SST. To that end, the trigger signaling data receiving unit 332 checks whether there is a trigger descriptor in an STT, in step S610.

If it is determined that there is no trigger descriptor, a corresponding SST does not include a trigger and thus the receiver 300 performs a proper operation according to a broadcast signal, in step S615.

In addition, if there is a trigger descriptor, the trigger receiving unit 332 extracts triggering data from a trigger descriptor, parses the extracted triggering data, and transmits the parsed data to the service manager 350, in step S630.

Subsequently, the service manager 350 performs an action on a target TDO at a trigger time on the basis of the parsed triggering data, in step S540. Here, the target TDO may be an NRT service that is indicated by the parsed target TDO identifier. In addition, an action may be at least one of preparation, execution, extension, and termination instructions that are indicated by parsed trigger action information.

A pattern of transmitting triggering data according to an embodiment will be described below with reference to FIGS. 43 and 44. In particular, a pattern of transmitting activation triggering data (ATD) will be described.

In an embodiment, triggering data that includes a trigger action set as a value corresponding to activation may be activation triggering data. The ATD triggers the activation (execution) of an object corresponding to a target service identifier.

Figure 43:
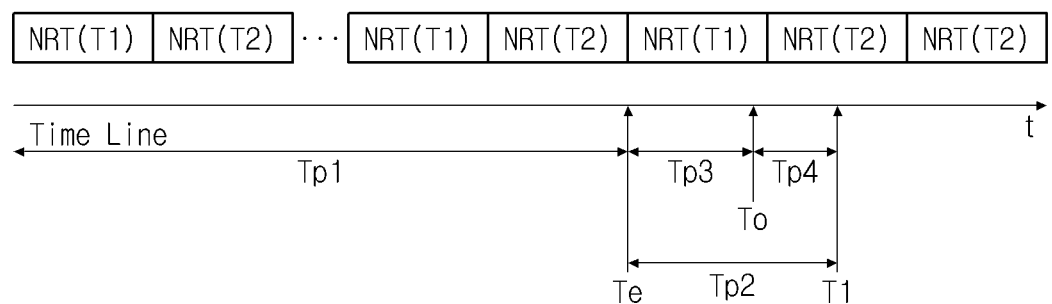
FIG. 43 shows a timing diagram according to an embodiment.

FIG. 43 shows a timing diagram according to an embodiment.

As shown in FIG. 43, since the transmitter 200 does not know when the receiver 300 changes a channel, is powered off, and selects a channel in which a corresponding NRT service is present, the transmitter 200 may transmit downloaded content transmitted by an NRT scheme through a terrestrial broadcast periodically and repetitively.

For this reason, the transmitter 200 may transmit also ATD periodically. However, if the ATD is transmitted in a very short period, a waste of a transmission band is caused and overhead may occur because the receiver 300 needs to periodically check ATD. On the other hand, if the ATD is transmitted in a very long period, the receiver 300 may not activate received NRT data even if it receives NRT data corresponding to the ATD. Thus, proper transmission timing for the ATD is needed.

In FIG. 43, an activation time T1 represents a time when the activation of an NRT (T1) service is triggered. An effective time Te represents a time when starting to transmit the NRT (T1) for the last time before the activation time T1. A transmission period change time To represents a time when an ATD transmission period changes. The transmission period change time To is a time parameter which the transmitter 200 may determine. A time window Tp1 represents a time before the effective time Te. A time window Tp2 represents a time between the effective time Te and the activation time T1. A time window Tp3 represents a time between the effective time Te and the transmission period change time To. A time window Tp4 represents a time between the transmission period change time To and the activation time T1.

In order for the NRT (T1) service to be performed at the activation time T1, the receiver 300 needs to complete receiving and storing the NRT (T1) service before the activation time T1 and to receive ATD for the NRT (T1) service. To that end, if the receiver 300 tunes a channel transmitting the NRT (T1) service before the effective time Te and maintains a corresponding channel until the reception of the NRT (T1) service is completed, the receiver 300 may store the NRT (T1) service before the activation time T1. Thus, even if ATD is transmitted in the time window Tp2, transmitting ATD in the time window Tp2 may be meaningless because the receiver 300 may not receive the NRT (T1) service.

However, when the receiver 300 tunes a channel transmitting the NRT (T1) service in the time window Tp1, completes the reception of the NRT (T1) service and then performs a channel change to another channel, the receiver 300 may have the NRT (T1) service if the receiver 300 performs a channel change to a channel transmitting the NRT (T1) service in the time window Tp2. Thus, the transmitter 200 needs to transmit ATD in the time window Tp2.

The transmitter 200 may distinguish the time window Tp3 from the time window Tp4 by the transmission period change time To and transmit ATD differently at each time window. Before the transmission period change time To, at least the time window Tp4 remains until the NRT (T1) service is performed, and thus the transmitter 200 transmits ATD in a long period. In this case, the transmitter 200 may transmit ATD in the n*Tp4 period.

On the other hand, since, less time remains between the transmission period change time To and the activation time T1 until the NRT (T1) service is performed, the transmitter 200 may transmit ATD in a short period. In this case, the transmitter 200 may transmit ATD as many times as the short period transmission number M. The short period P (Tp4) may be [Tp4/M]. [ ] represents a gauss symbol. The short period transmission number M may be designed in consideration of a channel change time of the receiver 300. Thus, if the receiver 300 performs a channel change to a channel that provides the NRT (T1) service P (Tp4) earlier than the activation time T1, the NRT (T1) service may be normally provided.

When the receiver 300 enters a channel providing the NRT (T1) service between T1−P (Tp4) and the activation time T1, the NRT (T1) service may not be normally provided but there is little probability that this occurs because the time is very short. In addition, it may be supplemented by maintenance triggering data as will be described.

Although the effective time Te is before the transmission period change time To above, the present invention is not limited thereto. That is, the transmission period change time To may be before the effective time Te.

Figure 44:
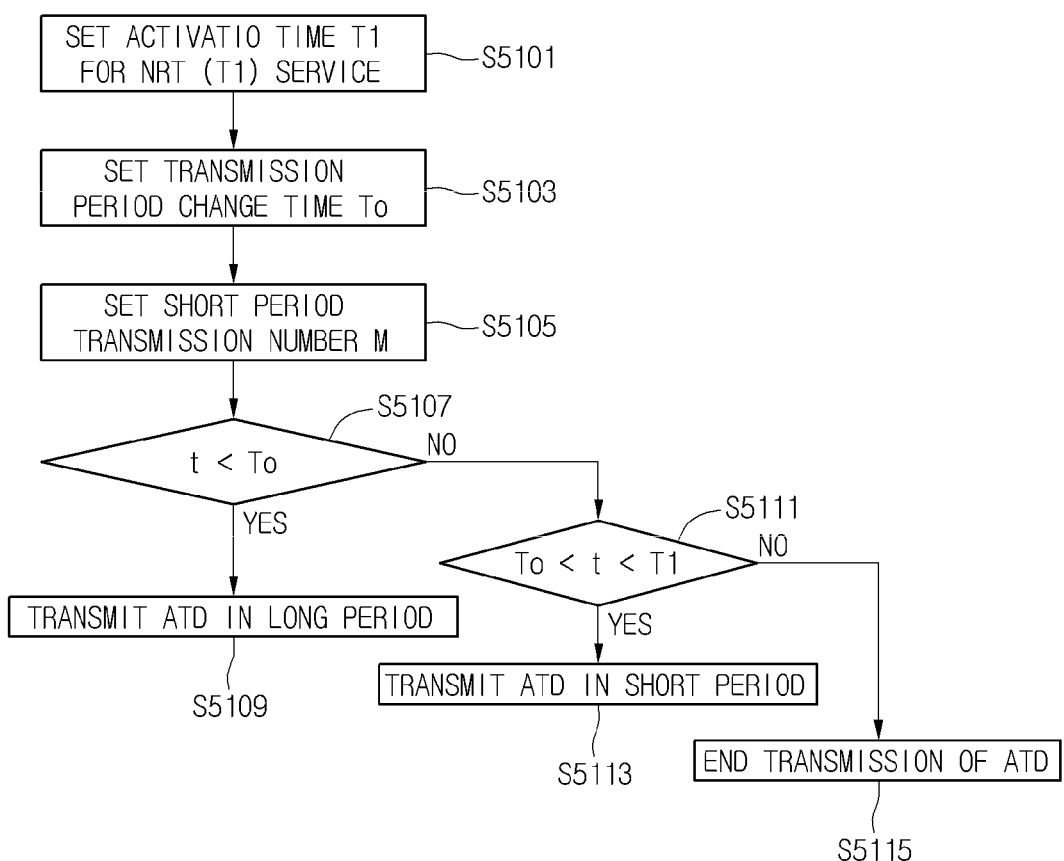
FIG. 44 is a flow chart of a method of transmitting activation triggering data according to an embodiment.

FIG. 44 is a flow chart of a method of transmitting ATD according to an embodiment.

Firstly, the trigger transmitting unit 220 sets an activation time T1 of an NRT (T1) service that is a target object, in step S5101, and sets a transmission period change time To in step S5103, and sets a short period transmission number M in step S5105.

If the current system time t is before the transmission period change time To in step S5107, the trigger transmitting unit 220 transmits ATD for the NRT (T1) service in a long period in step S5109. In this case, the trigger transmitting unit 220 may transmit ATD in an n*Tp4 period.

If the current system time t is after the transmission period change time To and before the activation time T1 of the NRT (T1) service in step S5111, the trigger transmitting unit 220 transmits ATD for the NRT (T1) service in a short period in step S5113.

If the current system time t is after the activation time T1 of the NRT (T1) service in step S5111, the trigger transmitting unit 220 ends the transmission of ATD for the NRT (T1) service in step S5115.

In FIG. 44, the current system time t is compared with the transmission period change time To or the activation time T1 of the NRT (T1) service. Thus, the current system time t, the transmission period change time To, and the activation time T1 of the NRT (T1) service need to have the same time reference. For example, the current system time t, the transmission period change time To, and the activation time T1 of the NRT (T1) service may be all UTC times. When the activation time T1 of the NRT (T1) service is provided as a PTS, the current system time t may correspond to an STC because the PTS uses PCR as a reference. Such a matter may be applied to time comparison as mentioned in the specification.

A pattern of transmitting triggering data according to another embodiment will be described below with reference to FIGS. 45 to 47. In particular, a pattern of transmitting maintenance triggering data (MTD) will be described.

In an embodiment, triggering data that includes a trigger action set as a value corresponding to maintenance may be maintenance triggering data.

If an object corresponding to a target service identifier of the maintenance triggering data is already activated in the receiver 300, the maintenance trigger information may trigger the maintenance of the activation of the object. In addition, if an object corresponding to a target service identifier of the maintenance triggering data is not activated in the receiver 300, the maintenance trigger information may trigger the activation of the object.

Figure 45:
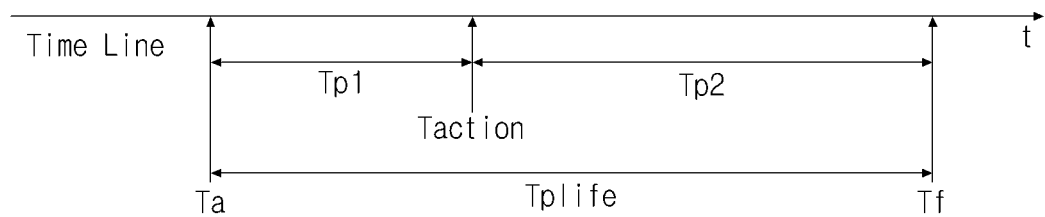
FIG. 45 shows a timing diagram according to another embodiment.

FIG. 45 shows a timing diagram according to another embodiment.

In FIG. 45, an activation time Ta represents an activation time of a TDO, and a finishing time Tf represents a finishing time of the TDO. A further action Taction represents a time when another further action is triggered (activated) for the TDO after the activation time Ta and before the finishing time Tf. A time window Tplife represents a time between the activation time Ta and the finishing time Tf and in particular represents a life time of the TDO. A time window Tp1 represents a time between the activation time Ta and the further action time Taction. The time window Tp2 represents a time between the further action time Taction and the finishing time Tf.

If the receiver 300 changes a tuning channel from channel A to channel B and then returns to channel A, the receiver 300 needs to re-execute a TDO that has been previously executed. Alternatively, if NRT content (TDO) corresponding to channel A is pre-stored in the receiver 300 and the receiver 300 returns to channel A after the activation time Ta of the TDO, the receiver 300 needs to execute the TDO. To that end, the transmitter 200 may transmit maintenance triggering data according to an embodiment.

If the receiver 300 previously downloads and stores corresponding NRT content, the receiver 300 may need MTD in the following cases. That is, if the receiver 300 returns to channel A within the time window Tplife after changing a tuning channel from channel A to channel B, the receiver 300 may need MTD. In addition, if the receiver 300 is powered off and then on in channel A and returns to channel A within the time window Tplife, the receiver 300 may need MTD. If the receiver 300 returns to channel A within the time window Tplife after changing a tuning channel from channel A to channel B within the time window Tplife, the receiver 300 may need MTD. If the receiver 300 is powered off and then on in channel A in the time window Tplife and returns to channel A within the time window Tplife, the receiver 300 may need MTD.

When the MTD is needed, the transmitter 200 continues to transmit the MTD in the time window Tplife so that a TDO related to the MTD may be re-executed. A transmission period of the MTD may be set in consideration of a time that is taken to power on/off the receiver 300 and a time when a channel change occurs.

FIG. 45 shows as an example a case where a TDO action occurs once at the time Taction within the time window Tplife. In this case, the transmitter 200 may configure and transmit MTD in the same type as ATD within the time window Tp1. In addition, the transmitter 200 may also configure and transmit MTD in a type that a specific further action is added to the ATD. The receiver 200 may configure and transmit MTD in the same type as triggering data corresponding to the TDO action in the time window Tp2 that is after the TDO action occurs, or may also configure and transmit MTD in a type that a specific further action is added to triggering data corresponding to the TDO action.

Figure 46:
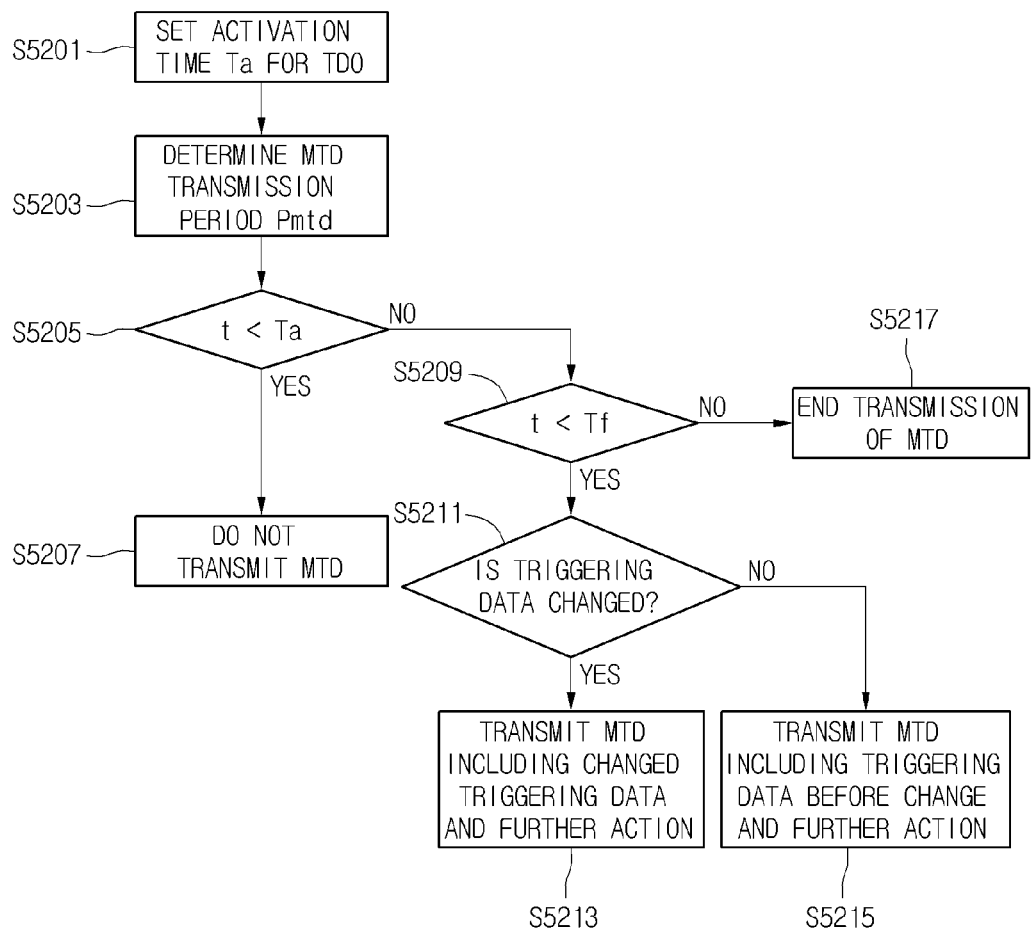
FIG. 46 is a flows chart of a method of transmitting maintenance triggering data according to an embodiment.

FIG. 46 is a flows chart of a method of transmitting a maintenance triggering data according to an embodiment.

The trigger transmitting unit 220 sets an activation time Ta for a TDO that is a target object.

The trigger transmitting unit 220 determines a transmission period Pmtd of MTD for a target object in step S5203. The transmission period Pmtd of MTD may be set to a predetermined value. In addition, the transmission period Pmtd of MTD may be set in consideration of a time when a channel of the receiver 300 is changed or a time that is taken to power on/off the receiver 300.

If the current system time t is before an activation time Ta of a target object in step S5205, the trigger transmitting unit 220 does not transmit MTD for the target object in step S5207.

If the current system time t is after the activation time Ta of the target object in step S5205 and is before a finishing time Tf of the target object in step S5209, the trigger transmitting unit 220 checks a change in triggering data in step S5211.

If the triggering data is changed, the trigger transmitting unit 220 transmits the changed triggering data and maintenance triggering data that includes a further action, instep S5213.

If the triggering data is not changed, the trigger transmitting unit 220 transmits triggering data before a change and maintenance triggering data that includes a further action, instep S5215.

If the current system time t is after the finishing time Tf of the target object in step S5209, the trigger transmitting unit 220 finishes transmitting the maintenance triggering data in step S5217.

Figure 47:
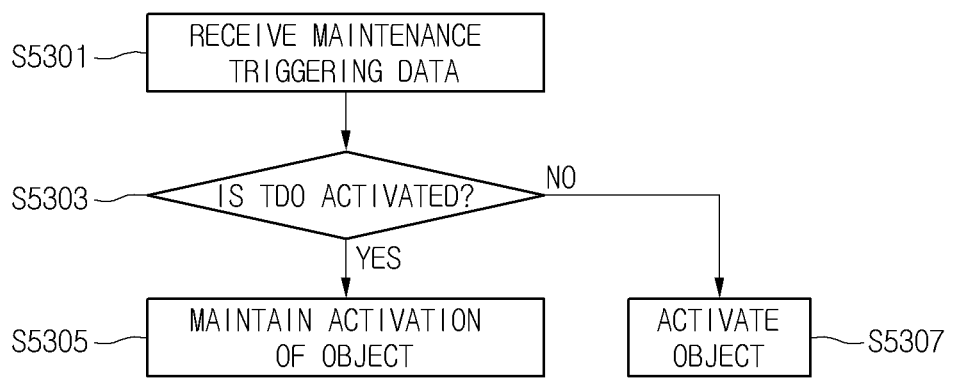
FIG. 47 shows a method of receiving a maintenance trigger according to an embodiment.

FIG. 47 shows a method of receiving a maintenance trigger according to an embodiment.

Firstly, the trigger receiving unit 331 of the receiver 300 receives maintenance triggering data in step S5301. The reception of the maintenance triggering data may be performed according to the above-described various embodiments.

If an object corresponding to a target service identifier of the maintenance triggering data is already activated in the receiver 300 in step S5303, the service manager 350 of the receiver 300 maintains the activation of the object in step S5305.

If the object corresponding to a target service identifier of the maintenance triggering data is not activated in the receiver 300 in step S5303, the service manager 350 of the receiver 300 activates the object in step S5307.

A reception timing of triggering data according to an embodiment will be described below with reference to FIGS. 48 to 50. In particular, the reception timing of preparation triggering data (PTD) will be described.

In an embodiment, triggering data that includes a trigger action set as a value corresponding to preparation may be preparation triggering data. A target service identifier for preparation and a preparation trigger time may be obtained through the parsing of the preparation triggering data. The preparation triggering data triggers preparation for an object corresponding to the target service identifier.

The transmitter 200 may provide preparation triggering data that is a trigger on the following priori operations for a TDO that needs a priori operation before the activation time.

If an operation of previously downloading downloadable content associated with the TDO as a result of checking an internet connection is needed before the activation time, the preparation triggering data may be transmitted.

In addition, if it takes a long time to create a user interface and thus activating the TDO on the background is needed, the preparation triggering data may be transmitted. It may correspond to a case where there is a lot of data such as image data used for creating the user interface and thus decoding is previously needed, or a case where it takes a long time when creating the user interface through metadata associated with the TDO. Moreover, it may correspond to a case where downloading a web-based TDO is previously needed.

Since a TDO to be activated is a TDO requiring a link with a server through a network, the preparation triggering data may be transmitted so that an access possibility to a server is previously checked or a connection to the server is previously performed.

The above priori operations may be combined.

Figure 48:
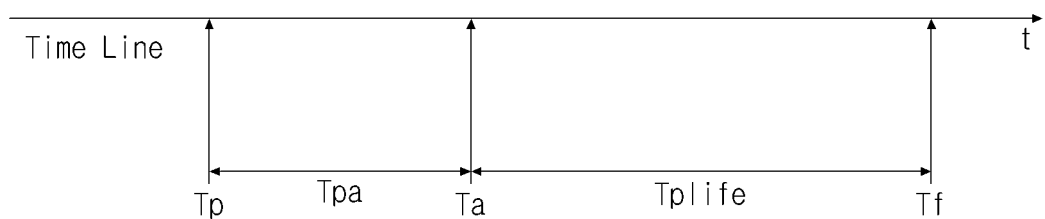
FIG. 48 shows a timing diagram according to an embodiment.

FIG. 48 shows a timing diagram according to an embodiment.

In FIG. 48, a preparation trigger time Tp represents a time when preparation for a TDO is triggered by PTD. An activation time Ta represents a time when the TDO is activated, and a finishing time Tf represents a time when the TDO finishes.

A time window Tpa represents a time between the preparation trigger time Tp and the activation time Ta and a time window Tplife represents a time between the activation time Ta and the finishing time Tf.

The time window Tpa may vary depending on a corresponding priori operation.

If the receiver 300 receives preparation triggering data related to content downloading, downloading content as soon as possible may be better. To that end, the transmitter 200 may transmit preparation triggering data having a preparation trigger time that is set to 0. That is, if the receiver 300 receives the preparation triggering data having a preparation trigger time that is set to 0, the receiver 300 may immediately initiate downloading content.

The receiver 300 may fail to receive PTD for a TDO requiring download content for activation or may trigger preparation for a TDO immediately before the activation time Ta. If download content is needed for the activation of a TDO but downloading is not performed, the receiver 300 may not activate a TDO at the activation time Ta or may perform downloading content after the activation. If a TDO action contains such information, the receiver 300 may determine the activation of a TDO on the basis of the TDO action.

The transmitter 200 may set a preparation trigger time Tp for a TDO requiring UI creation or a network check, according to a TDO type. The transmitter 200 may continue to transmit PTD having a trigger time that is set to Tp even in the time window Tpa.

If the receiver 300 compares the preparation trigger time Tp with the current system time and as a result, the current system time is after the preparation trigger time Tp, the receiver 300 initiates the preparation for a TDO on receiving PTD so as to be able to complete the preparation for the TDO as soon as possible before the activation time Ta.

Figure 49:
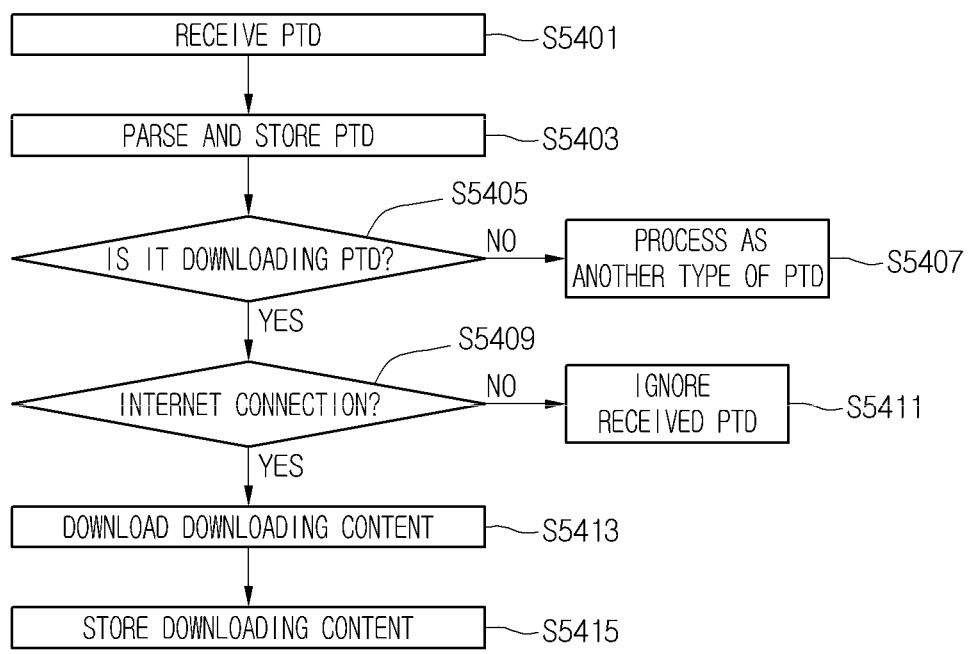
FIG. 49 is a flow chart of a method of receiving a preparation trigger according to an embodiment.

FIG. 49 is a flow chart of a method of receiving a preparation trigger according to an embodiment.

In particular, FIG. 49 shows a method of processing downloading preparation triggering data.

Firstly, the trigger receiving unit 331 of the receiver 300 receives preparation triggering data in step S5401, parses and stores the received preparation triggering data in step S5403. The reception of the preparation triggering data may be performed according to the above-described various embodiments of receiving triggering data.

If the received preparation triggering data is not downloading preparation triggering data in step S5405, the service manager 350 processes the received preparation triggering data as another type of preparation triggering data in step S5407.

If the received preparation triggering data is downloading preparation triggering data in step S5405, the service manager 350 checks an internet connection in step S5409.

If the internet connection is not normal, the service manager 350 ignores the received PTD in step S5411. The service manager 350 may store and ignore but not delete the received PTD so as to decrease a load for processing downloading TDP that is continuously received. If a TDO related to the downloading PTD finishes, the service manager 350 may delete the received PTD.

If the internet connection is normal, the service manager 350 initiates downloading download content at a trigger time for the received preparation triggering data, in step S5413. In this case, the service manager 350 may activate a TDO corresponding to a target service identifier of the received preparation triggering data on the background so that the activated TDO downloads the download content. Moreover, the service manager 350 may provide a target service identifier and a downloading URL to a download manager so that the download manager downloads the download content.

The activated TDO or the download manager stores the download content in step S5415. If the download manager downloads content, the download manager stores the download content in association with the target service identifier.

Figure 50:
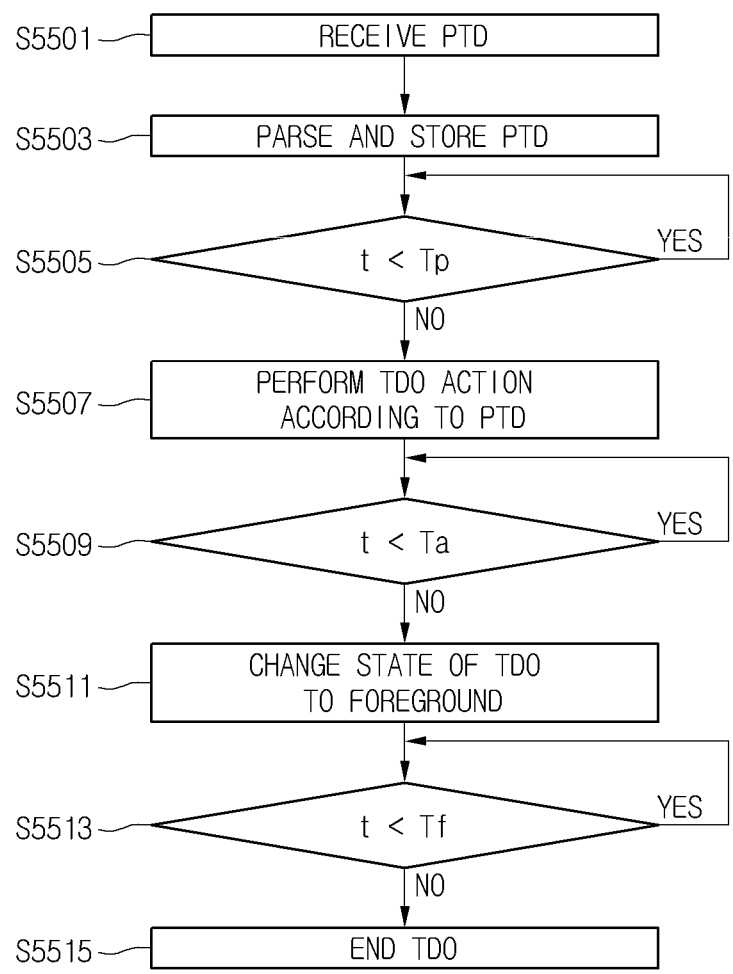
FIG. 50 is a flowchart of a method of receiving a preparation trigger according to another embodiment.

FIG. 50 is a flowchart of a method of receiving a preparation trigger according to another embodiment.

In particular, FIG. 50 shows a method of processing PTD needing the background activation of a TDO for preparation for the TDO.

Firstly, the trigger receiving unit 331 of the receiver 300 receives preparation triggering data in step S5501, parses and stores the received preparation triggering data in step S5503. The reception of the preparation triggering data may be performed according to the above-described various embodiments of receiving triggering data. A target service identifier and a preparation trigger time may be obtained through the parsing of the received preparation triggering data.

If the current system time t is after a preparation trigger time Tp in step S5505, the service manager 350 activates a TDO corresponding to a target service identifier of preparation triggering data on the background in step S5507. That is, if the reception time of PTD is before the preparation trigger time Tp, the service manager 350 activates the TDO on the background when reaching the preparation trigger time Tp. On the other hand, if the reception time of the PTD is after the preparation trigger time Tp, the service manager 350 immediately activates the TDO on the background. In this case, even if the tuning channel of the receiver 300 is changed, the service manager 350 maintains the background state without finishing the TDO.

If the current system time t is after the activation time Ta of the TDO in step S5509, the service manager 350 changes the state of the TDO to the foreground in step S5511. In particular, if the receiver 300 returns to a service channel of the TDO between the activation time Ta of the TDO and the finishing time Tf of the TDO, the service manager 350 changes the state of the TDO to the foreground.

If the current system time t is after the finishing time Tf of the TDO in step S5513, the service manager 350 finishes the TDO in step S5515. In particular, if there is a TDO that is activated in the background state and is not changed to have the foreground state, the service manager 350 finishes such a TDO. In this case, the service manager 350 needs to know when a corresponding TDO finishes. To that end, ATD may include when the corresponding TDO finishes.

Triggers may be classified into a preparation trigger, an activation trigger, and a maintenance trigger roughly according to their characteristics.

That is, the preparation trigger represents a pre-trigger that may allow the receiver 300 to prepare functions that are delivered to the receiver 300 before the activation trigger and are performed through the activation trigger. The receiver 300 may naturally perform a trigger action through the preparation trigger at an accurate time.

The activation trigger is a trigger that instructs the receiver to perform a specific function related to the state change of a TDO such as the execution or finishing of the TDO at a specific time.

The maintenance trigger is a trigger that may provide an instruction or a guide on how the receiver 300 processes a trigger when the receiver 300 misses a trigger performing timing designated at the activation trigger. In a broad sense, the maintenance trigger may have a meaning that collectively calls a trigger used for managing a life cycle of a trigger.

Through combinations of three types of triggers, the receiver 300 may complete preparation required for an action indicated by the activation trigger before a triggering timing which the activation trigger indicates, and may perform a natural action at an accurate timing. If the receiver 300 fails to enter a corresponding channel immediately before or after the triggering timing and perform a trigger, it may cope with this situation through the maintenance trigger. Thus, a trigger having such a configuration may provide a solution to be able to optimally perform a trigger in various actual viewing environments.

A way of identifying these three triggers and a way of performing cross reference between three triggers will be described below.

FIG. 51 shows bit stream syntax of a trigger according to another embodiment.

A trigger according to the syntax as shown in FIG. 51 further includes a trigger type field (trigger_type) and a reference target trigger identifier field (target_trigger_id ref) as compared to a trigger according to the syntax as shown in FIG. 25.

The trigger type field (trigger_type) represents a type of a trigger. For example, when a value of the trigger type field is 0x00, a trigger may represent "reserved for future use". The value of the trigger type field is 0x01, 0x02, and 0x03, triggers may represent a preparation trigger, an activation trigger, and a maintenance trigger, respectively.

In order to classify the preparation trigger, the activation trigger, and the maintenance trigger, solutions other than using the trigger type field may also be used.

For example, in an embodiment, triggering data may not have a trigger type field, and the preparation trigger, the activation trigger, and the maintenance trigger may be classified through a trigger_action field. That is, if the trigger_action field has a value corresponding to the preparation trigger, the receiver 300 may identify a received trigger as the preparation trigger. Moreover, if the trigger_action field has a value corresponding to the activation trigger, the receiver 300 may identify a received trigger as the activation trigger. If the trigger_action field has a value corresponding to the maintenance trigger, the receiver 300 may identify a received trigger as the maintenance trigger.

In another embodiment, triggering data may not have the trigger type field, and a trigger_action field value corresponding to the maintenance trigger and a trigger_action field value corresponding to the activation trigger may be the same. Instead, the activation trigger may be identified as the activation trigger or the maintenance trigger according to whether a target TDO is activated. For example, if a target TDO of a received activation trigger is not yet activated, the receiver 300 may identify the received activation trigger as an activation trigger and activate the target TDO at a trigger time designated by the received activation trigger. On the other hand, if the target TDO of the received activation trigger is already activated, the receiver 300 may identify the received activation trigger as a maintenance trigger and maintain the activation of the target TDO.

In another embodiment, the triggering data may not have the trigger type field, and a trigger_action field value corresponding to a maintenance trigger and a trigger_action field value corresponding to an activation trigger may be the same. Instead, the activation trigger may be identified as the activation trigger or the maintenance trigger according to whether a trigger time passed. For example, if a trigger time of a received activation trigger remains, the receiver 300 may identify the received activation trigger as an activation trigger and activate a target TDO at a trigger time designated by the received activation trigger. On the other hand, if the trigger time of the received activation trigger does not remain, the receiver 300 may identify the received activation trigger as a maintenance trigger. In this case, if the target TDO of a trigger is not yet activated, the receiver 300 may immediately activate the target TDO. If the target TDO of the received activation trigger is already activated, the receiver 300 may maintain the activation of the target TDO.

When a trigger including the reference target trigger identifier field (target_trigger_id_ref) is a preparation trigger or a maintenance trigger, the reference target identifier field may represent a trigger identifier (trigger_id) of an activation trigger that is associated with the preparation trigger or the maintenance trigger. If the trigger including the reference target trigger identifier field (target_trigger_id_ref) is an activation trigger, the reference target identifier field may represent a trigger identifier (trigger_id) of a preparation trigger or a maintenance trigger. Accordingly, the receiver 300 may refer to the activation trigger when processing the preparation trigger or the maintenance trigger. Moreover, the receiver 300 may refer to a preparation trigger or a maintenance trigger when processing an activation trigger. Accordingly, all metadata required or used for actually performing a trigger does not need to be included in an activation trigger and may be distributed through a preparation trigger. Accordingly, a stream for an activation trigger may be maintained as compactly as possible.

Likewise, in an embodiment, if three types of associated triggers have different trigger IDs, the receiver 300 may recognize a trigger associated with another trigger through the reference target trigger identifier field.

In another embodiment, if three types of associated triggers have the same trigger ID, the receiver 300 may recognize a trigger associated with another trigger through a trigger ID having the same value. For example, since the receiver 300 may identify a type of a trigger received through a trigger type field, it may recognize a preparation trigger associated with an activation trigger through a trigger ID of each trigger.

For a preparation trigger according to an embodiment, a meaning of a trigger action field will be described below.

A preparation trigger in which a value of a trigger action field is 0x00 may represent "reserved for future use".

A preparation trigger in which a value of a trigger action field is 0x01 may instruct the receiver 300 to prepare a content item for an activation trigger. In this case, preparation may represent downloading. The receiver 300 may previously download a content item that is designated by a preparation trigger. The content item may be obtained through a broadcast network or an IP network. In this case, content to be previously downloaded may be designated by a service identifier field of the preparation trigger and a content linkage field. Moreover, a list of content items to be previously downloaded may be designated by an SMT and an NRT-IT or by a descriptor in a trigger. Moreover, location information on content to be previously downloaded may be designated by an SMT, an NRT-IT, and an FDT or by a descriptor in a trigger. Details will be described below.

A preparation trigger in which a value of a trigger action field is 0x02 may instruct the receiver 300 to previously load a content item for an activation trigger. Accordingly, the receiver 300 may recognize that a timing to perform a trigger action instructed by an activation trigger is close, and may previously load a desired content item. In this case, content to be previously loaded may be designated by a service identifier field of a preparation trigger and a content linkage field. Moreover, a list of content items to be previously loaded may be previously downloaded may be designated by an SMT and an NRT-IT or by a descriptor in a trigger. Moreover, information on content to be previously downloaded may be designated by an SMT, an NRT-IT, and an FDT or by a descriptor in a trigger. Details will be described below.

A preparation trigger in which a value of a trigger action field is 0x03 may instruct the receiver 300 to preset a connection to a server. The receiver 300 may preset a connection to a server designated by the preparation trigger. An address of the server to be connected may be designated through an internet location descriptor in a trigger.

For an activation trigger according to an embodiment, a meaning of a trigger action field will be described below.

An activation trigger in which a value of a trigger action field is 0x00 may represent "reserved for future use".

An activation trigger in which a value of the trigger action field is 0x01 may instruct the receiver 300 to execute a target TDO of the activation trigger. In an embodiment, if the receiver 300 receives an activation trigger in which a value of the trigger action field is 0x00, it may immediately execute a target TDO. In another embodiment, if the receiver 300 receives an activation trigger in which a value of the trigger action field is 0x00, it may show a user that it is possible to execute the target TDO, and if the receiver 300 receives an instruction to execute the target TDO from a user, it may execute the target TDO.

An activation trigger in which a value of a trigger action field is 0x02 may instruct the receiver 300 to terminate the target TDO of the activation trigger. If the receiver 300 receives an activation trigger in which a value of the trigger action field is 0x02, it may unload or do not unload a resource according to the implementations of the receiver simultaneously with terminating the target TDO. When the resource is not returned, an execution speed may be enhanced if re-execution is performed within a short period.

An activation trigger in which a value of the trigger action field is 0x03 may instruct the receiver 300 to notify a user that the target TDO of the activation trigger may be executed. If the receiver 300 receives an activation trigger in which a value of the trigger action field is 0x03, it may perform such a guide only once or periodically such as every five minute.

An activation trigger in which a value of the trigger action field is 0x04 may instruct the receiver 300 to suspend the target TDO of the activation trigger. If the receiver 300 receives an activation trigger in which a value of the trigger action field is 0x04, it may stop the operation of the target TDO and leave the target TDO in a standby state. Moreover, the receiver 300 may hide all UIs of the target TDO. Suspension is different from termination and a TDO suspended by a separate trigger or a user instruction may be re-executed or terminated.

An activation trigger in which a value of the trigger action field is 0x05 may instruct the receiver 300 to wake up a suspended target TDO designated by the activation trigger. A trigger to instruct to wake up the suspended target TDO may be the same as a trigger that instructs to execute the target TDO.

An activation trigger in which a value of the trigger action field is 0x06 may instruct the receiver 300 to hide the target TDO of the activation trigger. If the receiver 300 receives an activation trigger in which a value of the trigger action field is 0x06, it hides the target TDO from a screen while maintaining the operation of the target TDO.

An activation trigger in which a value of the trigger action field is 0x07 may instruct the receiver 300 to show the target TDO of the activation trigger. If the receiver 300 receives an activation trigger in which a value of the trigger action field is 0x07, it shows the target TDO on the screen while maintaining the operation of the target TDO.

In an embodiment related to obtaining activation information, when performing an action designated by a preparation trigger, the receiver 300 may obtain, from a received NRT-IT, information required for the activation (execution, suspension, termination, informing a user of being able to perform a target TDO, wake up, showing a target TDO, etc.) of a target TDO designated by the preparation trigger, and may store a target TDO and store, in a local memory, activation information along with the target TDO. Any time in addition to when the receiver 300 performs an action designated by the preparation trigger, the receiver 300 may obtain activation information on the target TDO from a received NRT-IT, and store the activation information along with the target TDO in a local memory. The receiver that receives an activation trigger may obtain activation information for a target TDO designated by the activation trigger from the local memory, and activate the target TDO designated by the activation trigger with reference to the activation information.

In another embodiment related to obtaining the activation information, the receiver 300 that receives an activation trigger may obtain activation information for a target TDO from a received NRT-IT, and activate the target TDO designated by the activation trigger with reference to the activation information.

For a maintenance trigger according to an embodiment, a meaning of a trigger action field will be described below.

A maintenance trigger in which a value of a trigger action field is 0x00 may represent "reserved for future use".

A maintenance trigger in which a value of the trigger action field is 0x01 may instruct the receiver 300 to immediately execute a target TDO of the maintenance trigger. If the receiver 300 receives a maintenance trigger in which a value of the trigger action field is 0x01, it may immediately execute a target TDO in a case where the target TDO is not being executed, and it may maintain the execution of the target TDO in a case where the target TDO is already executed. The receiver 300 may immediately show a user that it is possible to execute the target TDO, and may execute the target TDO on further condition that an instruction to execute the target TDO is received from a user. If a TDO may be continuously used within a specific time window, a corresponding TDO may be immediately executed and used by this action.

A maintenance trigger in which a value of the trigger action field is 0x02 may instruct the receiver 300 to be ready to launch the execution of a target TDO of the maintenance trigger. If the receiver 300 receives a maintenance trigger in which a value of the trigger action field is 0x02, it may immediately perform the preparation of a target TDO in a case where the preparation of the target TDO is not yet performed, and may maintain the preparation of the target TDO in a case where the target TDO is already performed.

A maintenance trigger in which a value of a trigger action field is 0x03 may instruct the receiver 300 to notify a user of the target TOD availability of the maintenance trigger. If the receiver 300 receives a maintenance trigger in which a value of a trigger action field is 0x03, it immediately notifies the target TDO availability in a case where the target TDO availability is not yet notified to a user, and maintains notification on the target TDO availability in a case where the target TDO availability is already notified to a user. The receiver 300 may perform such a guide only once or periodically such as every five minute.

A maintenance trigger in which a value of a trigger action field is 0s04 may instruct the receiver 300 to unload all resources related to a target TDO of the maintenance trigger. If the receiver 300 receives a maintenance trigger in which a value of a trigger action field is 0x04, it immediately performs the unloading of a corresponding resource in a case where all resources related to the target TDO of the maintenance trigger are not yet unloaded, and maintains the unloading of a corresponding resource in a case where the unloading of the corresponding resource is already performed. Accordingly, if a designated TDO is not scheduled to be used for the time being, this trigger allows the receiver to unload all resources in use for the designated TDO so that the execution of another TDO is not be disturbed. If a corresponding TDO is being performed, the receiver 300 may terminate a target TDO and unload a resource.

A maintenance trigger in which a value of a trigger action field is 0x05 may instruct the receiver 300 to immediately terminate a target TDO of the maintenance trigger. If the receiver 300 receives a maintenance trigger in which a value of a trigger action field is 0x05, it may immediately terminate the target TDO in a case where the target TDO is not terminated, and maintain the termination of the target TDO in a case where the target TDO is already terminated. If the receiver 300 receives a maintenance trigger in which a value of a trigger action field is 0x02, it may or may not unload a resource simultaneously with terminating the target TDO according to the implementations of the receiver. When the resource is not unloaded, its execution speed may be enhanced if the resource is re-executed with a short period.

A maintenance trigger in which a value of a trigger action field is 0x06 may instruct the receiver 300 to ignore a trigger designated by the maintenance trigger.

A maintenance trigger in which a value of a trigger action field is 0x07 may instruct the receiver 300 to continue to execute a target TDO of the maintenance trigger. If the receiver 300 receives the maintenance trigger in which a value of a trigger action field is 0x07, it may maintain the execution of a target TDO in a case where the target TDO is already executed, and may not execute the target TDO in a case where the target TDO is not executed.

In an embodiment related to obtaining maintenance information, when performing an action designated by a preparation trigger, the receiver 300 may obtain, from a received NRT-IT, information required for the maintenance (immediate execution, preparation, notification on being able to execute a target TDO, resource unloading, termination, ignorance, continuous execution, etc.) of a target TDO designated by the preparation trigger, may store the target TDO and may store maintenance information along with the target TDO in a local memory. Any time in addition to when the receiver 300 performs an action designated by the preparation trigger, the receiver 300 may obtain maintenance information on the target TDO from a received NRT-IT, and store the maintenance information along with the target TDO in a local memory. The receiver 300 that receives a maintenance trigger may obtain maintenance information for a target TDO designated by the maintenance trigger from the local memory, and maintain the target TDO designated by the maintenance trigger with reference to the maintenance information.

In another embodiment related to obtaining the maintenance information, the receiver 300 that receives the maintenance trigger may obtain maintenance information for a target TDO from a received NRT-IT and maintain the target TDO designated by the maintenance trigger with reference to the maintenance information.

For a preparation trigger according to an embodiment, the meaning of a trigger time field (trigger_time) will be described below.

The delivery timing of the preparation trigger may be very earlier than the delivery timing of an activation trigger. The preparation trigger may provide approximate time information on the future trigging timing. Thus, time information on the preparation trigger may be consider to be set as an UTC time rather than referencing a PCR.

A trigger time of the preparation trigger may represent any one of a start time, an end time, and a scheduled activation time.

Firstly, the trigger time of the preparation trigger may represent the start time of an action of the preparation trigger. For example, when the preparation trigger instructs the receiver 300 to previously download content items for an activation trigger, the trigger time may represent the start time of downloading.

The trigger time of the preparation trigger may represent a closing time at which the action of the preparation trigger needs to be terminated. In this case, if the action of the preparation trigger is terminated by the trigger time of the preparation trigger, an activation trigger associated with the preparation trigger may be normally processed. Thus, the receiver 300 starts the action of the preparation trigger so that the action of the preparation trigger may be terminated before the trigger time of the preparation trigger.

The trigger time of the preparation trigger may represent a scheduled activation time. That is, the transmitter 200 may provide, to the receiver 300, a scheduled approximate triggering timing of an activation trigger associated with the preparation trigger. In this case, an actual accurate timing may be provided through the trigger time of the activation trigger.

Likewise, the trigger time of the preparation trigger may indicate a time window of a preparation action for ensuring timely activation of a target TDO designated by the preparation trigger rather than providing an accurate performing timing of an action of the preparation trigger.

If the preparation trigger does not include a trigger time, the receiver 300 may immediately perform the preparation trigger.

For a maintenance trigger according to an embodiment, the meaning of a trigger time field (trigger_time) will be described below.

A maintenance trigger may be delivered after the triggering timing of an activation trigger. Since it may be considered that the maintenance trigger provides a solution to process a corresponding trigger, a trigger time of the maintenance trigger may need lower timing accuracy as compared to a trigger time of the activation trigger. Thus, time information on the maintenance trigger may be considered to be set as an UTC time rather than referencing a PCR.

The trigger time of the maintenance trigger may represent any one of a start time and an end time.

The trigger time of the maintenance trigger may represent a time when the action of the maintenance trigger may start. If the current system time is after the trigger time of the maintenance trigger, the receiver 300 may immediately perform the action of the maintenance trigger. If the trigger time such as the start time is not designated in the maintenance trigger, the receiver 300 may consider that an execution time already passes, and immediately perform the action of the maintenance trigger.

The trigger time of the maintenance trigger may represent an end time at which the execution of the action of the maintenance trigger is valid. In this case, if the current system time is after the trigger time of the maintenance trigger, a corresponding trigger is not valid and the receiver 300 should not perform a designated action. If the end time is not designated, the receiver 300 may consider that the effective time of a corresponding trigger is designated to be limitless.

As such, the trigger time of the maintenance trigger may designate a time window in which the action of the maintenance trigger may be performed.

Ways of designating a content item for a preparation trigger and an activation trigger according to various embodiments of the present invention will be described in the following.

In an embodiment for designating a content item, the transmitter 200 may designate a content item for a preparation trigger and an activation trigger as an identifier for identifying a target TDO of a trigger. As previously described, the identifier for identifying a target TDO of a trigger may correspond to a combination of a service_id_ref field and a content_linkage field.

As previously described, the transmitter 200 may provide location information on a content item designated as a TDO identifier, through an SMT, an NRT-IT, and an FDT. In particular, the transmitter 200 provides information on a service channel corresponding to a service_id_ref field in a trigger, through an SMT. Information on the signaling channel may be provided through information on a destination address and a destination port in the SMT. The transmitter 200 provides a list of content items belonging to a service corresponding to the service_id_ref field, through an NRT-IT. The list of content items may be provided though a list of content_linkage fields in the NRT-IT. The transmitter 200 provides an FDT including information on at least one file for each content item, through a service channel corresponding to the service_id_ref in a trigger. Information on each file may include a TOI and a content-location field.

In another embodiment for designating a content item, the transmitter 200 may designate a list of content items for a preparation trigger and an activation trigger as a descriptor type. The content item descriptor may be included in a trigger_descriptor ( ) field in a trigger. The transmitter 200 may designate the list of content items for the preparation trigger and the activation trigger through a content item descriptor along with a target TDO identifier or designate it only through the content item descriptor without designating through the target TDO identifier. An example of such a descriptor will be described with reference to FIG. 52.

FIG. 52 shows syntax of a content item descriptor according to an embodiment.

As shown in FIG. 52, the content item descriptor includes a descriptor tag field (descriptor_tag), a descriptor_length field (descriptor_length), a service count field (service_count), a service identifier field (service_id), a content item count field (content_item_count), and a content linkage field (content_linkage).

The descriptor tag field (descriptor_tag) may be an 8-bit signless integer for identifying the descriptor as a content item descriptor.

The descriptor length field descriptor_length may be an 8-bit signless integer that regulates a length of a field immediately after this field to the end of the content item descriptor.

The service count field (service_count) represents the number of services that are included in the content item descriptor. The service identifier field (service_id) represents an identifier of a service that is included in the content item descriptor. Thus, the content item descriptor may include service identifier fields of which the number corresponds to that of the service count fields.

The content item count field (content_item_count) represents the number of content items for a service corresponding to the service identifier field (service_id). The content linkage field (content_linkage) represents an identifier of a content item. Thus, the content item descriptor may include content_linkage fields of which the number corresponds to that of the content item count fields in association with each service.

This method may be used when a content item used in a trigger is transmitted in an NRT type and in this case, each content item may be uniquely identified by a combination of NRT service ID and content linkage values. Similar to the previous embodiment, the transmitter 200 may provide location information on a content item designated as a TDO identifier, through an SMT, an NRT-IT, and an FDT.

In another embodiment for designating a content item, the transmitter 200 may designates a list of content items for a preparation trigger and an activation trigger as a descriptor type. The transmitter 200 may designate, as a content item for a trigger, contents transmitted through a broadcast network and an IP network by using such an internet location descriptor. Such an internet location descriptor may be included in a trigger_descriptor ( ) field in a trigger. The transmitter 200 may designate a list of content items for a preparation trigger and an activation trigger along with a target TDO identifier through the internet location descriptor or may designate the list only through the internet location descriptor without designating the list through the target TDO identifier. An example of such an internet location descriptor will be described with reference to FIG. 53.

FIG. 53 shows syntax of an internet location descriptor according to an embodiment.

As shown in FIG. 53, the internet location descriptor includes a descriptor tag field (descriptor_tag), a descriptor length field (descriptor_length), a URL count field (URL_count), a URL length field (URL_length), and a URL( ) field.

The descriptor tag field (descriptor_tag) may be an 8-bit signless integer for identifying this descriptor as the internet location descriptor. For example, this field may have a value of 0xC9.

The descriptor_length field (descriptor_length) may be an 8-bit signless integer that regulates a length of a field immediately after this field to the end of the internet location descriptor.

The URL count field (URL_count) may be an 8-bit signless integer that represents the number of URL length field and URL field pairs included in the internet location descriptor. That is, the internet location descriptor includes URL length fields of which the number corresponds to that of the URL count fields, and URL fields of which the number corresponds to that of the URL count fields.

The URL length field (URL_length) is an 8-bit signless integer that represents the length of the URL ( ) field immediately after this field.

The URL ( ) field is a character string that represents uniform reference locator (URL). When the URL ( ) field represents relative URL or absolute tag URI, a corresponding URL may be considered as content that is transmitted only through the FLUTE of an NRT. In other cases, a corresponding URL may be considered as content that is transmitted through a broadcast network, content that is transmitted through an IP network, or content that is transmitted through both the broadcast network and the IP network.

Figure 54:
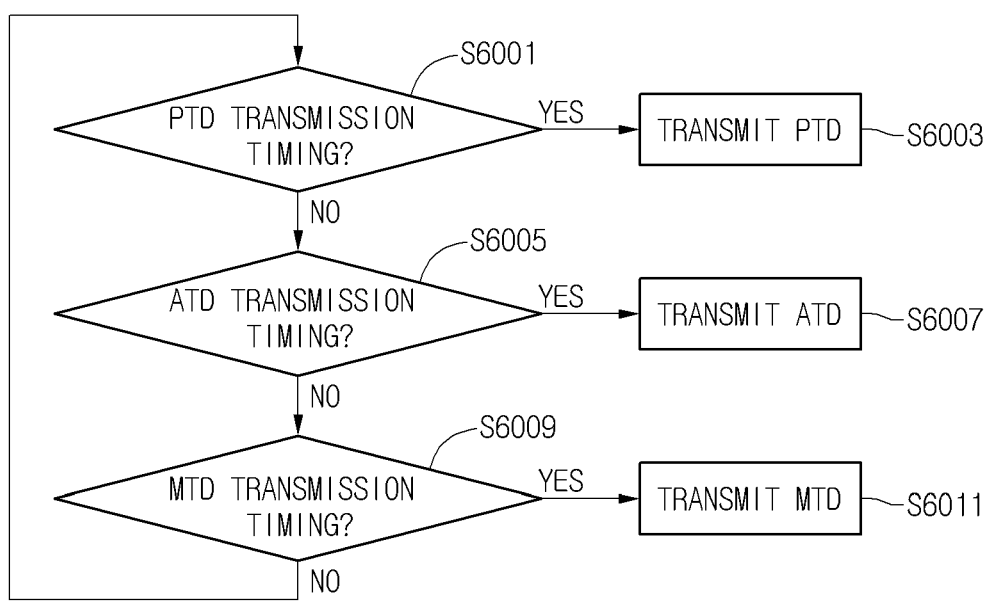
FIG. 54 is a flow chart of a method of transmitting a trigger according to another embodiment.

FIG. 54 is a flow chart of a method of transmitting a trigger according to another embodiment.

The transmitter 200 transmits a preparation trigger in step S6003 at a transmitting timing of the preparation trigger in step S6001, transmits an activation trigger in step S6007 at a transmission timing of the activation trigger in step S6005, and transmits a maintenance trigger in step S6011 at a transmission timing of the maintenance trigger in step S6009.

The trigger may be transmitted through a PSIP table or a synchronized data stream.

The transmission of the trigger through the PSIP table may be understood through FIGS. 37, 41, and 42. For example, in an embodiment, the trigger may be transmitted as a part of a 0x1FF stream that is a PSID base PID. In this case, the table ID of a trigger table may be uniquely assigned for distinguishing the table from another table. In another embodiment, a trigger may be delivered through a stream that corresponds to a PID assigned and identified through a master guide table. In this case, all tables in a corresponding stream may be considered as trigger tables.

A trigger transmission based on a synchronized data stream may be understood through FIGS. 38 to 40. Since the synchronized data stream provides accurate synchronization with another stream through a PTS, the trigger transmission based on the synchronized data stream may provide higher timing accuracy than the trigger transmission through a PSIP table.

Regarding a preparation trigger, an activation trigger, and a maintenance trigger, these triggers may be delivered as a part of a stream in an embodiment.

In another embodiment, the transmitter 200 may deliver the preparation trigger through a PSIP table, and transmit the activation trigger and the maintenance trigger through a synchronized data stream. The preparation trigger may be provided long before the activation trigger needs to be performed. Depending on the embodiment, the preparation trigger may be provided several hours, days or weeks before the activation trigger needs to be performed. The preparation trigger may be needed for enabling the receiver 300 to previously download a content item related to the activation trigger though a broadcast network or an IP network. Due to such a characteristic of the preparation trigger, the preparation trigger may not need scene based timing accuracy unlike the activation trigger. Thus, in order to ensure the scene based timing accuracy of the activation trigger, a solution to maintain a stream containing the activation trigger as compactly as possible may also be considered. For this purpose, the transmitter 200 may divide and deliver the preparation trigger by using a separate table through a typical PSIP signaling stream. A table containing the preparation trigger may include only the preparation trigger and be delivered through a PSIP stream, or a separate table id may be assigned to the preparation trigger.

In another embodiment, the transmitter 200 may transmit a preparation trigger and a maintenance trigger in a PSIP table type, and transmit an activation trigger on the basis of synchronized data streaming. Since a maintenance trigger plays a role of instructing or guiding a solution to a corresponding trigger, it may not need to be accurately performed at a specific timing. Thus, the maintenance trigger may need lower timing accuracy than the activation trigger. Thus, it may be considered that the maintenance trigger is also transmitted along with the preparation trigger separately from the activation trigger. In this case, the transmitter 200 may bind and transmit the preparation trigger and the maintenance trigger by using one table. Moreover, the transmitter 200 may assign different table IDs to a table for the preparation trigger and a table for the maintenance trigger, and transmit the preparation trigger and the maintenance trigger through two tables that are identified through the different table IDs.

A method of operating the receiver 300 according to an embodiment will be described with reference to FIGS. 55 to 57.

Figure 55:
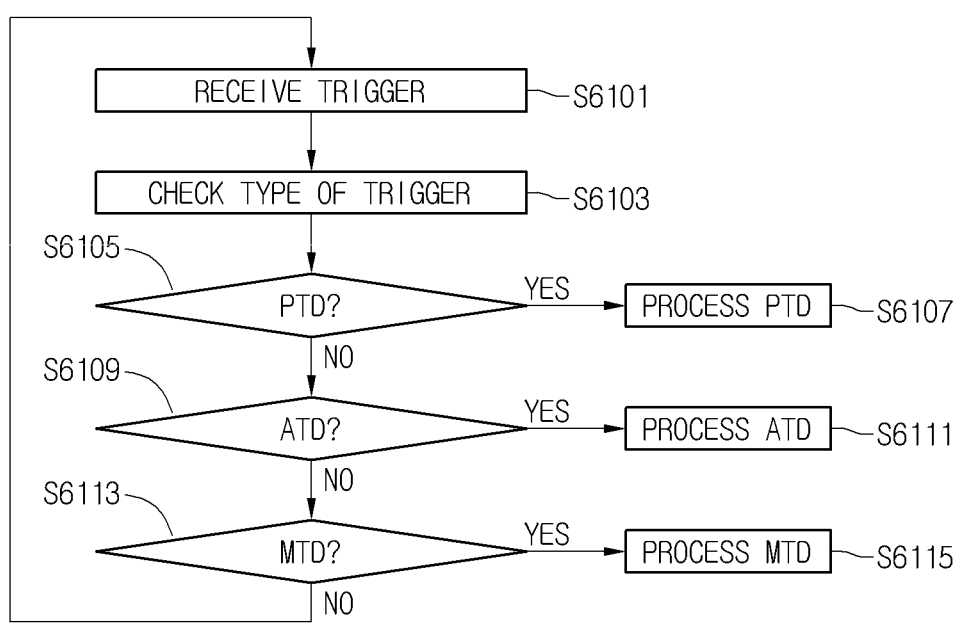
FIG. 55 is a flowchart of a method of operating a receiver according to an embodiment.

FIG. 55 is a flowchart of a method of operating a receiver according to an embodiment.

The receiver 300 receives a trigger in step S6101. In particular, the receiver 300 may receive a trigger in the same way as those shown in FIGS. 36 to 42.

The receiver 300 checks a type of a received trigger in step S6103. The receiver 300 may check the type of the received trigger in the same way as that described above. For example, the receiver 300 may check a type of a trigger through one or more of a trigger type field (trigge_type) and a trigger action field (trigger_action) in the trigger. Moreover, the receiver 300 may check a type of a trigger according to whether a target TDO is activated or whether a trigger time passes.

If the received trigger is a preparation trigger in step S6105, the receiver 300 processes the received preparation trigger in step S6107. A way of processing the preparation trigger of the receiver 300 has been described in relation to the trigger action field of the preparation trigger. The state of a TDO may change through the processing on the preparation trigger.

Figure 56:
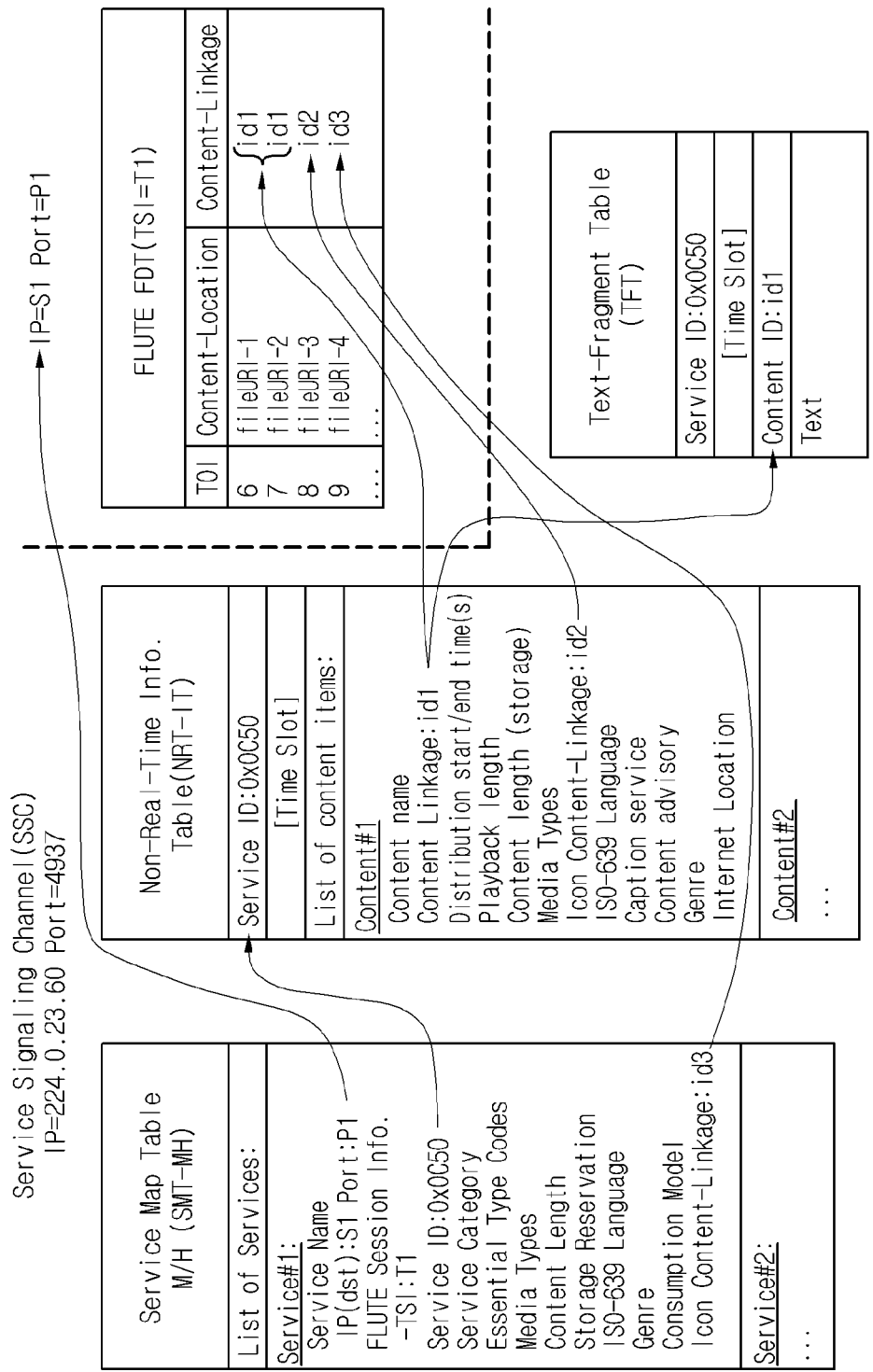
FIG. 56 shows a method of acquiring location information on a content item by a receiver according to an embodiment.

In an embodiment, if the preparation trigger triggers downloading a content item, the receiver 300 may acquire the location information on a content item through an SMT, an NRT-IT, and an FDT as shown in FIG. 56 and download the content item through the recognized location information. In particular, the receiver 200 may obtain, from the SMT, channel information corresponding to a service identifier in the preparation trigger. In this case, the channel information may include an IP address and a port number. Moreover, the receiver 200 may obtain from the NRT-IT a list of content linkages belonging to a service corresponding to a service identifier in the preparation trigger. The receiver 200 may recognize a content linkage field in a trigger, a content linkage field in a content_items_descriptor ( ) field in a trigger, or a plurality of content_linkage fields corresponding to a service identifier in the NRT-IT as an identifier of a content item to be downloaded. The receiver 200 may acquire content identifiers in the NRT-IT or content locations corresponding to a content identifier in a trigger from a FLUTE FDT that is received through a port number and an IP address of the SMT. If the NRT-IT has internet location information on a content item, the receiver 200 may also acquire location information on a content item through the NRT-IT.

In another embodiment, if the preparation trigger triggers downloading a content item, the receiver 300 may acquire, from an internet location descriptor in the preparation trigger, location information on a content item to be downloaded and may download the content item through the acquired location information.

FIG. 55 will be further described.

If the received trigger is an activation trigger in step S6109, the receiver 300 processes the received activation trigger in step S6111. Processing the activation trigger of the receiver 300 has been described in association with a trigger action field of the activation trigger. The state of a TDO may change through the processing on the activation trigger.

If the received trigger is a maintenance trigger in step S6113, the receiver 300 processes, in step S6115, the received maintenance trigger as shown in FIG. 47.

Figure 57:
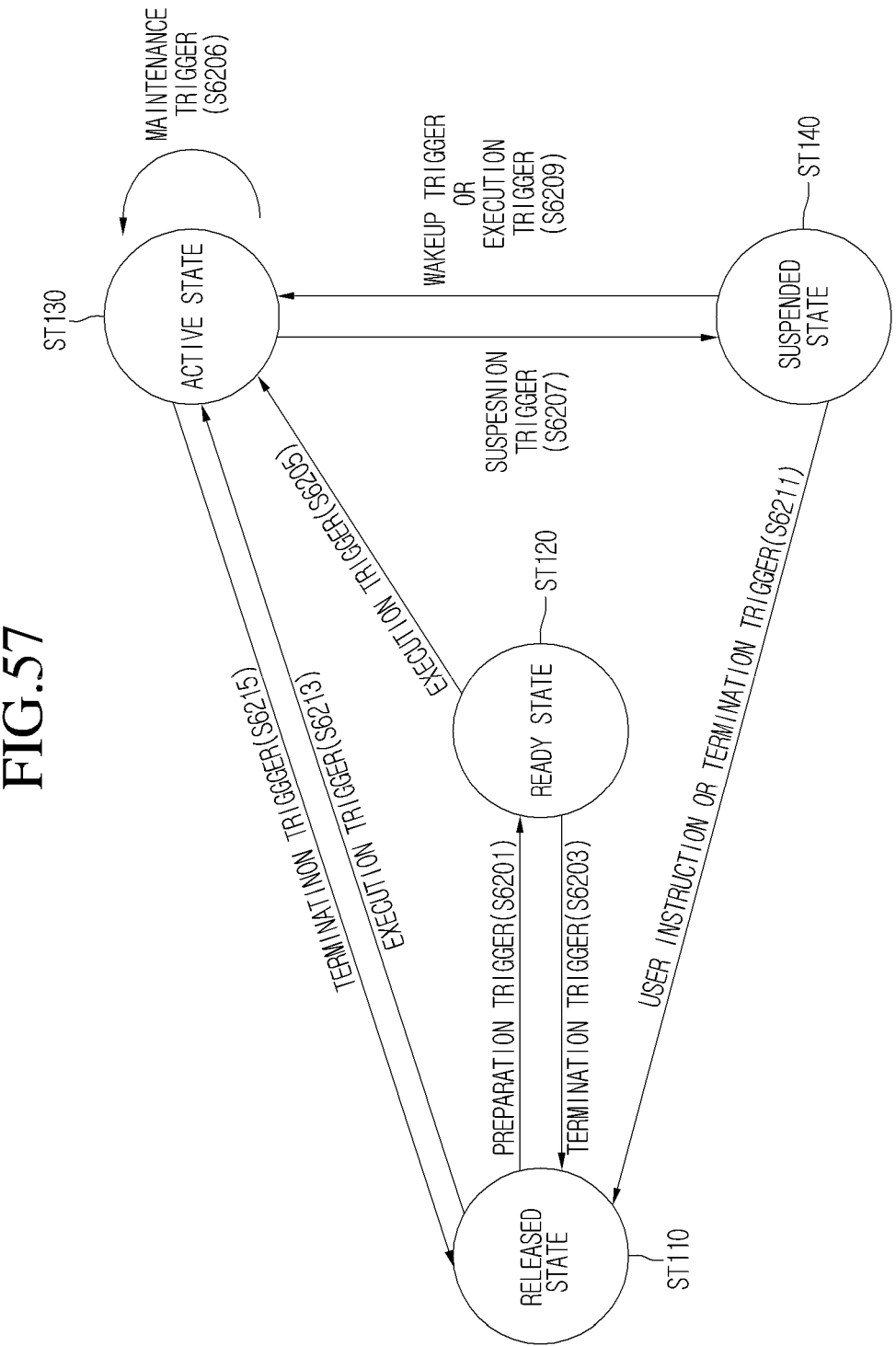
FIG. 57 is a TDO state transition diagram of a method of processing a trigger by a receiver according to an embodiment.

FIG. 57 is a TDO state transition diagram of a method of processing a trigger by a receiver according to an embodiment.

As shown in FIG. 57, a target TDO has any one of a released state ST110 such as a non-ready state, a ready state ST120, an active state ST130, and a suspended state ST140.

If the receiver 300 receives a preparation trigger and a target TDO of this preparation trigger is in the released state ST110, the receiver 300 prepares this target TDO to transit the target TDO into the ready state ST120, in step S6201.

If the receiver 300 receives a termination trigger in which a value of a trigger action field is 0x02, and a target TDO of this termination trigger is in the ready state ST120, the receiver 300 terminates this target TDO to transit the TDO into the released state ST110, in step S6203.

If the receiver 300 receives an execution trigger in which a value of a trigger action field is 0x01, and a target TDO of this execution trigger is in the ready state ST120, the receiver 300 executes this target TDO and leaves the target TDO in the active state ST130, in step S6205.

If the receiver 300 receives a maintenance trigger in which a value of a trigger action field is 0x01, and a target TDO of this maintenance trigger is in the active state ST120, the receiver 300 maintains this target TDO in the active state 5130 in step S6206.

If the receiver 300 receives a suspension trigger in which a value of a trigger action field is 0x04, and a target TDO of this suspension trigger is in the active state ST130, the receiver 300 suspends this target TDO and leaves the target TDO in the suspended station ST140, in step S6207.

If the receiver 300 receives a separate trigger such as a wakeup trigger or an execution trigger and a target TDO of this separate trigger is in the suspended state ST140, the receiver 300 re-executes this target TDO and leaves the target TDO in the active state ST130, in step S6209.

If the receiver 300 receives a termination trigger in which a value of a trigger action field is 0x02 and a target TDO of this termination trigger is in the suspended state ST140, the receiver 300 terminates this target TDO and leaves the target TDO in the released state ST110, in step S6211. Moreover, if the receiver receives a user instruction such as an instruction related to getting out of a channel related to a target TDO, the receiver 300 may terminate this target TDO and leave the target TDO in the released state ST110.

If the receiver 300 receives an execution trigger in which a value of a trigger action field is 0x01, and a target TDO of this execution trigger is in the released state ST110, the receiver 300 executes this target TDO and leaves the target TDO in the active state ST130, in step S6213.

If the receiver 300 receives a termination trigger in which a value of a trigger action field is 0x02, and a target TDO of this termination trigger is in the active state ST130, the receiver 300 terminates this target TDO and leaves the target TDO in the released state ST110, in step S6215.

The present invention according to the methods of receiving and transmitting a trigger can also be embodied as computer executable programs and stored on a computer readable recording medium. Examples of the computer readable recording medium include read-only memory (ROM), random-access memory (RAM), CD-ROMs, magnetic tapes, floppy disks, and optical data storage devices, and may be embodied in a carrier wave (such as data transmission through the Internet) type.

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Moreover, although exemplary embodiments have been illustrated and described above, the present disclosure is not limited specific embodiments described above but may be varied by those skilled in the art without departing from the subject matter of the present disclosure claimed in the following claims. Further, these variations should not be understood individually from the technical spirit or perspective of the present disclosure.

The invention claimed is:

1. A method for a broadcast receiving device to receive a broadcast, comprising:
  receiving a broadcast stream including audio or video;
  receiving a trigger action for a trigger, and the trigger including an identifier for identifying a triggered declarative object (TDO) and a trigger time,
  extracting the identifier from the trigger; and
  changing a state of the TDO identified by the identifier based on the trigger,
  wherein allowed values for the state of the TDO include a released state, a ready state, an active state and a suspended state,
  wherein changing the state of the TDO comprises:
  transiting the state of the TDO to the ready state in the trigger time, when the trigger action represents a preparation and a receiving time of the trigger is before the trigger time, and
  immediately transiting the state of the TDO to the ready state when the trigger action represents a preparation and a receiving time of the trigger is after the trigger time.

2. The method of claim 1, wherein changing the state of the TDO comprises:
  transiting the state of the TDO to the suspended state, when the trigger action represents a suspension and the state of the TDO is the active state.

3. The method of claim 1, wherein changing the state of the TDO comprises:
  transiting the state of the TDO to the active state, when the trigger action represents an execution and the state of the TDO is the released state,
  transiting the state of the TDO to the active state, when the trigger action represents an execution and the state of the TDO is the ready state, and
  transiting the state of the TDO to the active state, when the trigger action represents an execution and the state of the TDO is the suspended state.

4. The method of claim 1, wherein changing the state of the TDO comprises:
  transiting the state of the TDO to the released state, when the trigger action represents a termination and the state of the TDO is the active state, transiting the state of the TDO to the released state, when the trigger action represents a termination and the state of the TDO is the ready state, and transiting the state of the TDO to the released state, when the trigger action represents a termination and the state of the TDO is the suspended state.

5. The method of claim 1, wherein changing the state of the TDO comprises:

transiting the state of the TDO to the released state, when a user input for tuning another channel is received and the state of the TDO is the suspended state.

6. The method of claim 1, wherein the ready state is a state to which the state of the TDO is transited from the released state when the trigger action represents a preparation, from which the state of the TDO is transited to the released state when the trigger action represents a termination, and from which the state of the TDO is transited to the active state when the trigger action represents an execution.

7. The method of claim 1, wherein changing the state of the TDO comprises:

immediately changing the state of the TDO identified by the identifier when the trigger does not include information representing the trigger time.

8. The method of claim 1, wherein changing the state of the TDO comprises:

changing, in the trigger time, the state of the TDO identified by the identifier when the trigger includes the trigger time.

9. The method of claim 8, wherein the trigger time is synchronized with a time stamp in the audio or video.

10. The method of claim 9, wherein a header of the audio or video includes the identifier.

11. The method of claim 1, wherein the trigger includes information representing the trigger time, wherein the trigger time represents an end time of the period of the trigger action.

12. An apparatus for receiving a broadcast service, comprising:

a receiver to receive a broadcast stream including audio or video;

a trigger processor to receive a trigger action for a trigger, receive the trigger including an identifier for identifying a triggered declarative object (TDO), and extract the identifier from the trigger; and a service manager for changing a state of the TDO identified by the identifier based on the trigger, wherein allowed values for the state of the TDO include a released state, a ready state, an active state and a suspended state, wherein the service manager transits the state of the TDO to the ready state in the trigger time, when the trigger action represents a preparation and a receiving time of the trigger is before the trigger time, and immediately transits the state of the TDO to the ready state when the trigger action represents a preparation and a receiving time of the trigger is after the trigger time.

13. The apparatus of claim 12, wherein the service manager transits the state of the TDO to the suspended state, when the trigger action represents a suspension and the state of the TDO is the active state.

14. The apparatus of claim 12, wherein the service manager transits the state of the TDO to the active state, when the trigger action represents an execution and the state of the TDO is the released state, transits the state of the TDO to the active state, when the trigger action represents an execution and the state of the TDO is the ready state, and transits the state of the TDO to the active state, when the trigger action represents an execution and the state of the TDO is the suspended state.

15. The apparatus of claim 12, wherein the service manager transits the state of the TDO to the released state, when the trigger action represents a termination and the state of the TDO is the active state, transits the state of the TDO to the released state, when the trigger action represents a termination and the state of the TDO is the ready state, and transits the state of the TDO to the released state, when the trigger action represents a termination and the state of the TDO is the suspended state.

16. The apparatus of claim 12, wherein the service manager transits the state of the TDO to the released state, when a user input for tuning another channel is received and the state of the TDO is the suspended state.

17. The apparatus of claim 12, wherein the ready state is a state to which the state of the TDO is transited from the released state, when the trigger action represents a preparation, from which the state of the TDO is transited to the released state, when the trigger action represents a termination, and from which the state of the TDO is transited to the active state, when the trigger action represents an execution.

\* \* \* \* \*